TABULATION CONTROL MECHANISM FOR ACCOUNTING MACHINES

Filed Feb. 17, 1960 17 Sheets-Sheet 1

INVENTORS
RAYMOND A. CHRISTIAN
HERBERT C. JOHNSON
ARTHUR R. COLLEY Sr.
RALPH C. EIFORT

BY Louis A. Kline
Richard Van Busum

THEIR ATTORNEYS

INVENTORS—RAYMOND A. CHRISTIAN, HERBERT C. JOHNSON,
ARTHUR R. COLLEY Sr, RALPH C. EIFORT
BY Louis A Kline
Richard Van Busum
THEIR ATTORNEYS

TABULATION CONTROL MECHANISM FOR ACCOUNTING MACHINES

INVENTORS
RAYMOND A. CHRISTIAN
HERBERT C. JOHNSON
ARTHUR R. COLLEY &
RALPH C. EIFORT
BY Louis A Kline
Richard Van Deusen
THEIR ATTORNEYS

TABULATION CONTROL MECHANISM FOR ACCOUNTING MACHINES

Filed Feb. 17, 1960

INVENTORS
RAYMOND A. CHRISTIAN
HERBERT C. JOHNSON
ARTHUR R. COLLEY, SR.
RALPH C. EIFORT
BY Louis A Kline
Richard Van Busum
THEIR ATTORNEYS Dec. 15, 1964 R. A. CHRISTIAN ET AL 3,161,354

TABULATION CONTROL MECHANISM FOR ACCOUNTING MACHINES

Filed Feb. 17, 1960 17 Sheets-Sheet 5

INVENTORS
RAYMOND A. CHRISTIAN
HERBERT C. JOHNSON
ARTHUR R. COLLEY Sr.
RALPH C. EIFORT

BY Louis A Kline

Richard Van Busum

THEIR ATTORNEYS

TABULATION CONTROL MECHANISM FOR ACCOUNTING MACHINES

Filed Feb. 17, 1960 17 Sheets-Sheet 6

INVENTORS
RAYMOND A. CHRISTIAN
HERBERT C. JOHNSON
ARTHUR R. COLLEY Sr.
RALPH C. EIFORT
BY Louis A Kline
Richard Van Buren
THEIR ATTORNEYS

TABULATION CONTROL MECHANISM FOR ACCOUNTING MACHINES

Filed Feb. 17, 1960

INVENTORS
RAYMOND A. CHRISTIAN
HERBERT C. JOHNSON
ARTHUR R. COLLEY Sr.
RALPH C. EIFORT
BY Louis A Kline
Richard Van Busum
THEIR ATTORNEYS INVENTORS
RAYMOND A. CHRISTIAN
HERBERT C. JOHNSON
ARTHUR R. COLLEY, SR.
RALPH C. EIFORT BY Louis A Kline
Richard Van Buren

THEIR ATTORNEYS

TABULATION CONTROL MECHANISM FOR ACCOUNTING MACHINES

Filed Feb. 17, 1960

INVENTORS
RAYMOND A. CHRISTIAN
HERBERT C. JOHNSON
ARTHUR R. COLLEY Sr.
RALPH C. EIFORT

BY Louis A Kline
Richard Van Buren

THEIR ATTORNEYS

TABULATION CONTROL MECHANISM FOR ACCOUNTING MACHINES

Filed Feb. 17, 1960 17 Sheets-Sheet 10

INVENTORS
RAYMOND A. CHRISTIAN
HERBERT C. JOHNSON
ARTHUR R. COLLEY, SR.
RALPH C. EIFORT
BY Louis A Kline
Richard Van Busum
THEIR ATTORNEYS

TABULATION CONTROL MECHANISM FOR ACCOUNTING MACHINES

Filed Feb. 17, 1960 17 Sheets-Sheet 11

INVENTORS
RAYMOND A. CHRISTIAN
HERBERT C. JOHNSON
ARTHUR R. COLLEY, SR.
RALPH C. EIFORT
BY Louis A Kline
Richard Van Busum
THEIR ATTORNEYS

TABULATION CONTROL MECHANISM FOR ACCOUNTING MACHINES

Filed Feb. 17, 1960

INVENTORS
RAYMOND A. CHRISTIAN
HERBERT C. JOHNSON
ARTHUR R. COLLEY, SR.
RALPH C. EIFORT

BY Louis A Kline
Richard Van Bussum

THEIR ATTORNEYS

INVENTORS
RAYMOND A. CHRISTIAN
HERBERT C. JOHNSON
ARTHUR R. COLLEY, SR.
RALPH C. EIFORT
BY Louis A Kline
Richard Van Busum
THEIR ATTORNEYS Dec. 15, 1964 R. A. CHRISTIAN ETAL 3,161,354

TABULATION CONTROL MECHANISM FOR ACCOUNTING MACHINES

Filed Feb. 17, 1960 17 Sheets-Sheet 14

INVENTORS
RAYMOND A. CHRISTIAN
HERMAN C. JOHNSON
ARTHUR R. COLLEY, SR.
RALPH C. EIFORT

BY

THEIR ATTORNEYS

Dec. 15, 1964 R. A. CHRISTIAN ETAL 3,161,354

TABULATION CONTROL MECHANISM FOR ACCOUNTING MACHINES

Filed Feb. 17, 1960

17 Sheets-Sheet 15

INVENTORS
RAYMOND A. CHRISTIAN
HERBERT C. JOHNSON
ARTHUR R. COLLEY Sr.
RALPH C. EIFORT

BY Louis A Kline

Richard Van Busum

THEIR ATTORNEYS

INVENTORS
RAYMOND A. CHRISTIAN
HERBERT C. JOHNSON
ARTHUR R. COLLEY Sr.
RALPH C. EIFORT

BY Louis A. Kline
Richard Van Buren

THEIR ATTORNEYS

INVENTORS
RAYMOND A. CHRISTIAN
HERBERT C. JOHNSON
ARTHUR R. COLLEY, SR.
RALPH C. EIFORT
BY Louis A Kline
Richard Van Baesum
THEIR ATTORNEYS United States Patent Office 3,161,354

Patented Dec. 15, 1964

3,161,354

TABULATION CONTROL MECHANISM FOR ACCOUNTING MACHINES

Raymond A. Christian, Herbert C. Johnson, Arthur R. Colley, Sr., and Ralph C. Eifort, Dayton, Ohio, assignors to The National Cash Register Company, Dayton, Ohio, a corporation of Maryland Filed Feb. 17, 1960, Ser. No. 9,261

6 Claims. (Cl. 235—60.47)

This invention relates to accounting machines, and is directed more particularly to the traveling carriages of such machines, to control mechanism associated with said traveling carriages for controlling the various functions of the machines, and to the totalizer equipment of such machines.

It is a recognized fact that record-keeping in connection with present-day complex business systems is progressively becoming more difficult, complex, and involved, and, therefore, to meet these unusual conditions, it becomes desirable and necessary to improve the accounting machines used in the keeping of said records, so that the machines will provide a complete and comprehensive record of all transactions in connection with said business systems, in a fast, efficient, and economical manner.

With the above statement in mind, it is a general object of this invention to provide an improved accounting machine for use in keeping a complete record of all the transactions in connection with various complex business systems in a quick and efficient manner.

Another object is to provide a machine, of the type described above, with an improved mechanism controlled by the traveling carriage for controlling the various functions of said machine.

Another object is to provide an accounting machine with improved automatic mechanism operating under control of the traveling carriage in preselected columnar positions to control the various functions of the machine.

A further object is the provision of means controlled jointly by a particular totalizer when in a certain algebraic condition, and by the traveling carriage while tabulating, to terminate the tabulating movement of said carriage when it arrives in a predetermined columnar position.

Still another object is the provision of improved means, controlled by the traveling carriage in certain columnar positions, to cause said traveling carriage to be tabulated from said certain columnar positions to a different or predetermined columnar position.

Another object is to provide means controlled by the traveling carriage in a certain columnar position to cause said traveling carriage to tabulate selectively to either one of two predetermined columnar positions.

Still another object is the provision of means controlled by a single manipulative member to cause the traveling carriage to tabulate selectively in either of two directions.

Another object is the provision of improved means to shift the typewriter type members from one printing position to another, and vice versa.

Another object is to provide means to disable the automatic operating feature of the machine while the traveling carriage is tabulating in either forward or return directions.

A further object is the provision of means controlled jointly by a particular totalizer and by the traveling carriage in preselected columnar positions to cause the carriage to tabulate to a particular columnar position.

Still another object is to provide means controlled jointly by a particular totalizer when in a certain algebraic condition and by the traveling carriage when tabulating in a certain direction to cause the tabulating movement of said carriage to be terminated in a certain columnar position.

A further object of this invention is the provision of means controlled jointly by a particular totalizer, and by the traveling carriage when in a particular columnar position or while moving in a tabulating direction, to cause said traveling carriage to skip-tabulate to a preselected columnar position.

A still further object is to provide means controlled jointly by a particular totalizer and by the traveling carriage while moving in a return direction, or when in a certain columnar position, to cause said carriage to return to a particular columnar position.

A still further object is the provision of a novel automatic overdraft device continually coacting with the amount actuators, and rendered effective when any totalizer being read or reset is in a negative condition, or overdrawn, to transpose the complementary amount of the overdraft therein to a true negative amount and cause it to be recorded and registered.

With these and incidental objects in view, the invention includes certain novel features of construction and combinations of parts, a preferred form or embodiment of which is hereinafter described with reference to the drawings which accompany and form a part of this specification.

In the drawings:

FIG. 1 is a diagrammatic view of the keyboard of the machine embodying the present invention.

FIGS. 2A and 2B together constitute a longitudinal sectional view of the machine taken just to the right of one of the amount banks.

Figures 42, 43:
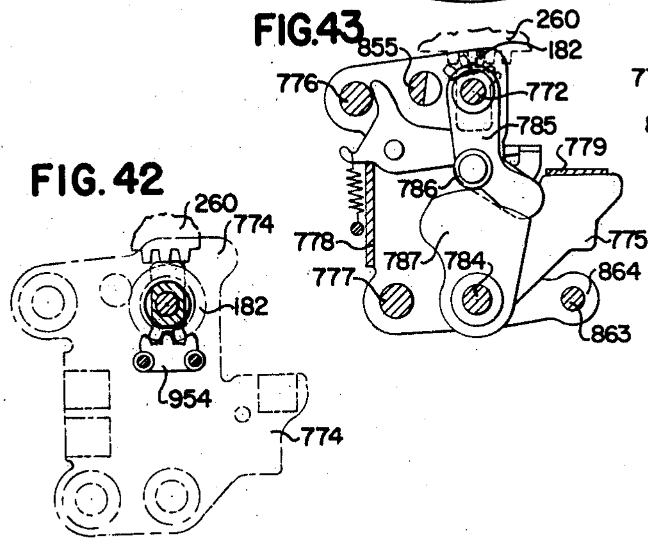
Figure 44:
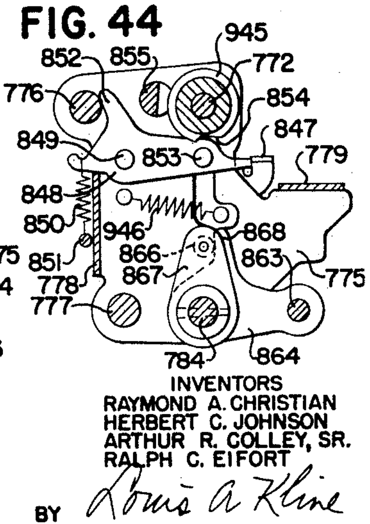

FIGS. 42, 43, and 44 are detail views, as observed from the right, of portions of the engaging and disengaging mechanism and the transfer mechanism for the overdraft device.

Figure 45:
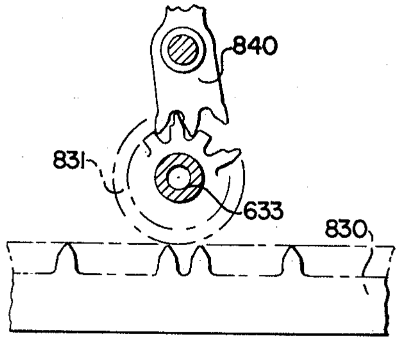

FIG. 45 is a detail view, as observed from the right, of the mechanism controlled by one of the interspersed totalizers for controlling the operation of the overdraft device.

Inasmuch as the following description of the present invention is necessarily of considerable length and is divided into a fairly large number of separate sections, the following index is provided to facilitate ready reference to the various portions of the specification.

| | Column |
|---|---|
| General Description | 4 |
| Detailed Description | 6 |
| Framework | 6 |
| Traveling Carriage in General | 7 |
| Accounting Machine Keyboard | 7 |
| Typewriter Keyboard | 9 |
| Typewriter Mechanism in General | 10 |
| Totalizers in General | 13 |
| Machine-operating Mechanism | 13 |
| Amount Differential Mechanism | 16 |
| Fluid Drive Mechanism for Traveling Carriage | 19 |
| Carriage Escapement Mechanism | 20 |
| Automatic Machine-Releasing Mechanism | 22 |
| "Off-Stop" Locking Mechanism | 25 |
| Disabling of Automatic Machine Release | 27 |
| Tabulating Mechanism | 29 |
| Carriage-Controlled Tabulation | 30 |
| Total-Controlled Tabulation | 33 |
| Total-Controlled Return Mechanism | 36 |
| Interspersed Totalizers | 39 |
| Overdraft Mechanism | 50 |
| Mode of Operation | 57 |

GENERAL DESCRIPTION

The machine chosen to illustrate the present invention is similar in many respects to the machine disclosed in United States Patents Nos. 2,626,749 and 2,851,218, issued, respectively, January 27, 1953, and September 9, 1958, to Raymond A. Christian et al., to which reference may be had for a full disclosure of mechanism not associated with the present invention and which, for that reason, will be described only in a general way herein. Mechanism pertinent to the present invention will be described in detail in the ensuing pages, with reference to the drawings, in the different views of which like reference numerals refer to like parts.

The machine chosen to illustrate the present invention is a modern type of accounting machine, having incorporated therein electric typewriter mechanism having a full keyboard, including a row of numeral keys from 0 to 9 inclusive, and a full complement of alphabet keys. In addition, the entire type mechanism of the typewriter is shiftable from lower-case position to upper-case position, for the printing of digits, fractions, and various other arithmetical signs used in accounting machines of this type.

The keyboard for the accounting machine includes a full complement of amount keys, several rows of date keys, and the required number of symbol keys. As in previous machines of this type, the machine embodying the present invention is provided with a laterally-shiftable traveling carriage, which is driven in forward and return tabulating directions by a fluid drive mechanism, which is in turn operated by a continuously-operating motor, which drives the accounting machine mechanism and the operating roller for the electric typewriter.

The tabulating movement of the traveling carriage, in either forward or return directions, may be controlled manually, by keys of the accounting machine and typewriter keyboards, or automatically, by the traveling carriage itself, in preselected columnar positions. The present machine also embodies mechanism which operates under control of certain of the totalizers for causing the traveling carriage to tabulate in either forward or return direction to a preselected columnar position, depending upon the algebraic condition of said totalizers.

As stated previously, the accounting machine mechanism and the typewriter mechanism are operated by a continuously-running motor, controlled by an on-and-off switch, located on the left-hand side of the machine. Operation of the machine may be initiated manually by means of three starting bars, located on the right-hand side of the keyboard, or automatically, by means of the traveling carriage in preselected columnar positions thereof. Mechanism is provided for preventing automatic operation of the machine when the traveling carriage is out of columnar position, or "Off-Stop," and said mechanism also functions, while the traveling carriage is tabulating in either forward or return directions, to prevent operation of the machine under these conditions. The traveling carriage is provided with the usual platen roll for presenting record material to the printing mechanism, and, in addition to the usual manner of feeding record material from the back of the traveling carriage around the platen roll, the traveling carriage is provided with a front-feed throat, which, when open, permits the insertion of different types of record material at the front of the platen. The front-feed throat mechanism includes a line-finding device, which permits the positioning of the inserted record material in proper relation to the printing mechanism.

The electric typewriter mechanism includes an electronic encoding mechanism operable by certain of the typewriter keys for entering alpha-numerical data into a tape-recording device, which may be readily attached to the accounting machine.

The totalizer equipment of the machine embodying the present invention includes twenty-one totalizers, including a balance totalizer, which is sometimes referred to as a crossfooter and which in this case will be referred to as totalizer A; a B line of shiftable totalizers comprising four sets of interspersed totalizer wheels; a C line of sliding totalizers comprising eight sets of totalizer wheels; and a D line of sliding totalizers, also comprising eight sets of totalizer wheels.

The machine is provided with an overdraft device, often and perhaps erroneously referred to as the "X totalizer," which functions automatically in connection with the A totalizer and any totalizer on the B, C, and D lines to transpose the complementary amount of an overdraft, contained in the selected one of said totalizers, to a true negative amount and to cause this true negative amount to be recorded.

As previously stated, the traveling carriage is driven by the main operating motor through the medium of a fluid or hydraulic drive device, which is fully disclosed in the Christian et al. patents referred to at the beginning of this specification, and said fluid drive mechanism forms a non-positive medium for driving the traveling carriage in either forward or return tabulating directions, which is superior in many respects to the usual spring-actuated tabulating means and the positive return means used in conjunction therewith. Originally, the reversing of the direction of travel of the traveling carriage was accomplished by purely mechanical means, but a recent development employs a solenoid for reversing the direction of travel of the traveling carriage, and this lends flexibility to the machine, as the solenoid may be controlled by switches in any manner desired; for example, by the traveling carriage while moving in either forward or return tabulating direction. Likewise, switches for controlling the reversing solenoid may be operated by any selected totalizer when in a certain algebraic condition to control the direction of travel of the carriage. Furthermore, it is a rather simple and convenient matter to connect the backspace key of the typewriter to the reversing mechanism, whereby the depression of said back-space key closes a switch which actuates the reversing solenoid to reverse the direction of travel of the carriage from forward to return direction. The usual typewriter space bar may be used in conjunction with the back-space key to cause the traveling carriage to letter-space in a return direction. Another recent development is the provision of means used in conjunction with the solenoid-operated reversing mechanism to cause an automatic operation of the machine to be initiated by the traveling carriage while it is moving in a return direction. Similar mechanism also permits automatic operation of the machine to be initiated by the traveling carriage while it is moving in a forward direction.

The solenoid-actuated carriage return mechanism, the back-spacing mechanism, and the automatic machine-releasing mechanism, under control of the traveling carriage, are fully disclosed in the Christian et al. Patent No. 2,851,218, to which reference may be had for a more complete disclosure of these mechanisms.

Figures 12, 13:
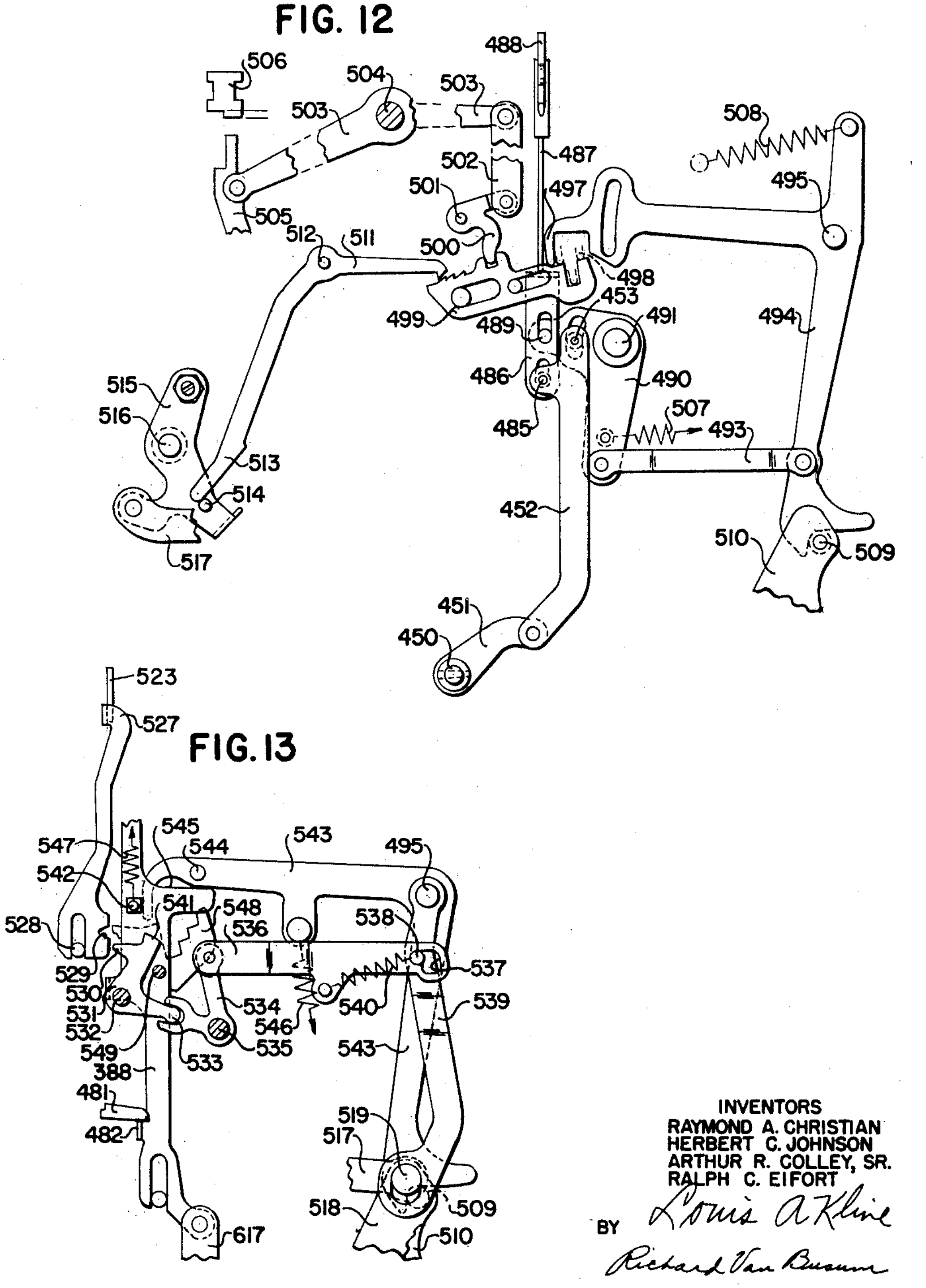
FIG. 12 is a right side elevation of mechanism controlled by the traveling carriage, in a predetermined columnar position, for causing said carriage to tabulate automatically to a particular columnar position.
FIG. 13 is a righ side elevation of a portion of the mechanism controlled by the traveling carriage, in preselected columnar positions, for causing said traveling carriage to return-tabulate to a preselected columnar position.

In the present adaptation, mechanism has been devised for expanding the control of the tabulating facilities of the traveling carriage in forward and return directions, and this includes the mechanism shown in FIG. 12, which utilizes the usual typewriter tabulating control mechanism for use in conjunction with mechanism controlled by the traveling carriage in preselected columnar positions, for causing said carriage to tabulate in a forward direction to predetermined columnar positions. Likewise, improved control of the movement of the traveling carriage in a return tabulating direction has been accomplished by means of the mechanism shown principally in FIG. 13, which operates under control of the traveling carriage in preselected columnar positions, to cause said carriage to be tabulated in a return direction to a preselected columnar position.

In former machines of this type, mechanism was provided for controlling the columnar positioning of the traveling carriage while traveling in a forward direction, depending upon the algebraic condition of a certain totalizer. In the present machine, this mechanism has been redesigned and improved to be operated by a solenoid, which in turn is controlled jointly by a certain totalizer and the traveling carriage, when at rest in or moving through a certain columnar position. A similar electrically operating and controlled mechanism has been provided for controlling the return tabulating movement of the traveling carriage to preselected columnar positions, depending upon the algebraic condition of a certain totalizer, and said mechanism is rendered operative by the traveling carriage while traveling in either a return or a forward tabulating direction.

In the ensuing pages, mechanism pertinent to the present invention will be described in detail. Mechanism shown herein but not pertinent to the present invention will be described in a general way only, and, if a more complete disclosure of such mechanism is required, reference may be had to the patents referred to above and to the co-pending application for Letters Patent of the United States filed November 2, 1954, by Raymond A. Christian et al., Serial No. 466,292, now United States Patent No. 2,930,523, issued March 29, 1960.

DETAILED DESCRIPTION

*Framework*

Figure 4:
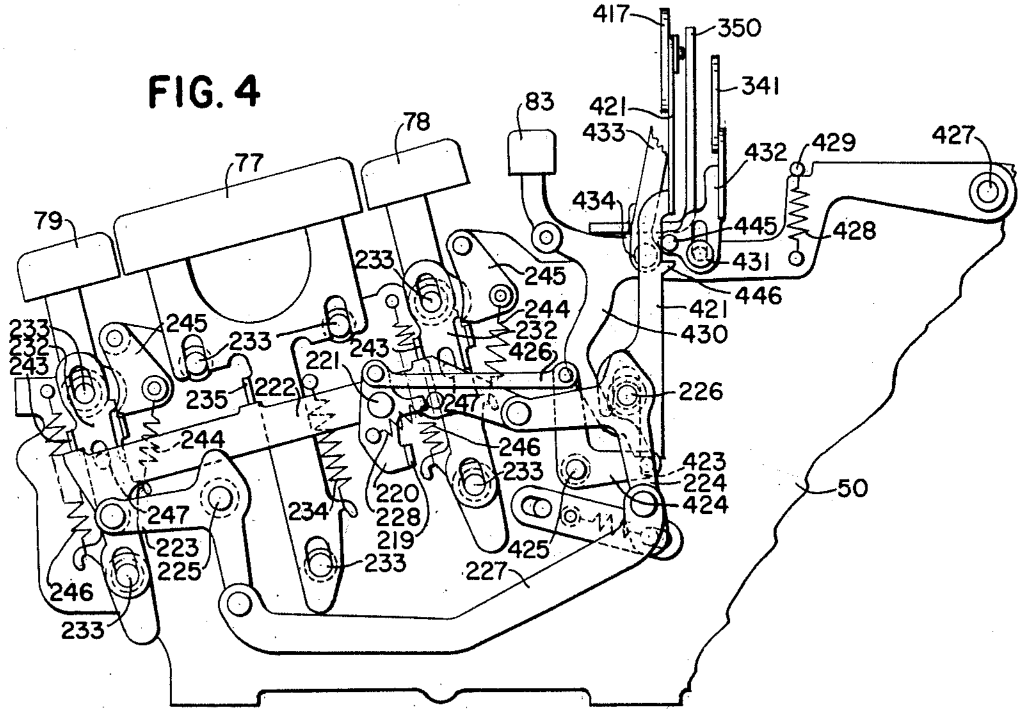
FIG. 4 is a right side elevation of the three release bars and a portion of the mechanism operating under control of the traveling carriage for controlling the operation of said bars.

The mechanism of the machine chosen to illustrate the present invention is supported by and between a right main frame 50 (FIG. 4) and a similar left main frame 49 (FIG. 17), said frames secured in proper spaced relationship to each other upon a machine base 51 (FIG. 2B) and maintained in rigid relationship to each other by various cross frames, rods, and bars, which in turn assist said frames in supporting the mechanism of the machine.

The mechanism of the machine, including the framework, is enclosed in a suitable case or cabinet 52, which is in turn secured to the machine base 51.

*Traveling Carriage in General*

The present machine is provided with a horizontally or laterally shiftable traveling carriage 53 (FIGS. 2A and 2B), mounted for horizontal shifting movement upon ways in turn secured to the machine framework. The traveling carriage 53 carries the usual platen roll 54, for presenting record material to the printing mechanism, said platen roll being rotatable automatically and/or manually to line-space the record material with respect to the printing mechanism.

The traveling carriage 53 is provided with a front-feed guide plate 55, which is shiftable from printing position to a front-feeding or open-throat position for the purpose of directing record material, presented at the front of the platen roll, around said platen roll, thus providing convenient means for the insertion of record material, such as ledger cards and statement slips, in front of the platen roll. The guide plate 55 also forms a line-finding device for locating any desired line of the record material in relation to the printing mechanism. Mounted on the front of the traveling carriage and extending substantially the full length thereof is a program or stop bar 56, having properly spaced thereon, in preselected columnar positions, a plurality of control elements or stops 57 for controlling the columnar positioning of said carriage and the various functions of the machine. The stop bar 56 is readily removable from the traveling carriage for replacement by other stop bars, arranged for different phases of the business system in which they are being used.

The traveling carriage is driven in forward tabulating and return tabulating directions by a fluid clutch device 58 (FIGS. 2B, 10 and 11), which is in turn operated by a so-called continuously-operating motor 59, of conventional construction, which is in turn connectable to the other mechanisms of the machine for operating them.

*Accounting Machine Keyboard*

Figure 1:
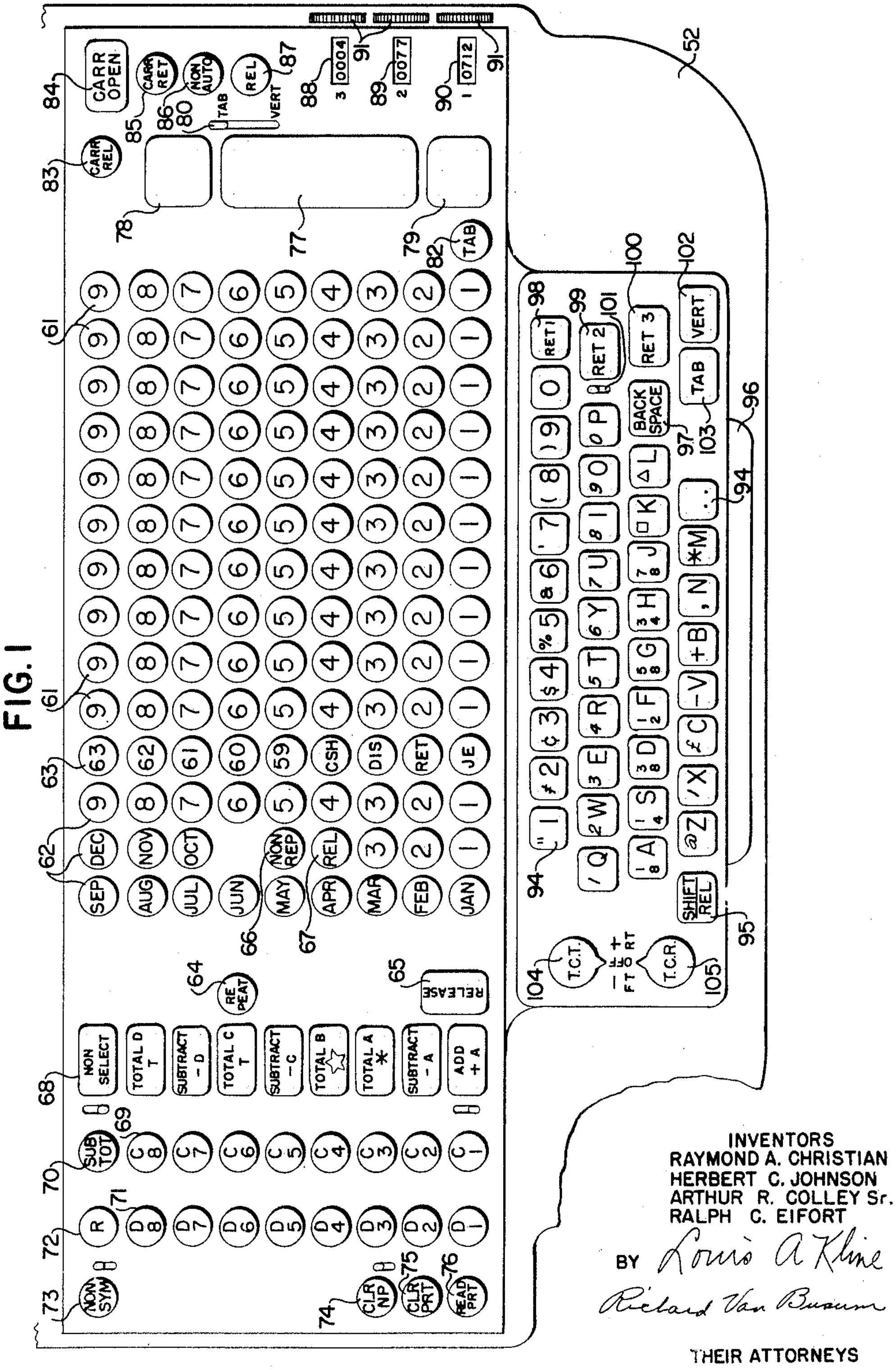
Figure 2A:
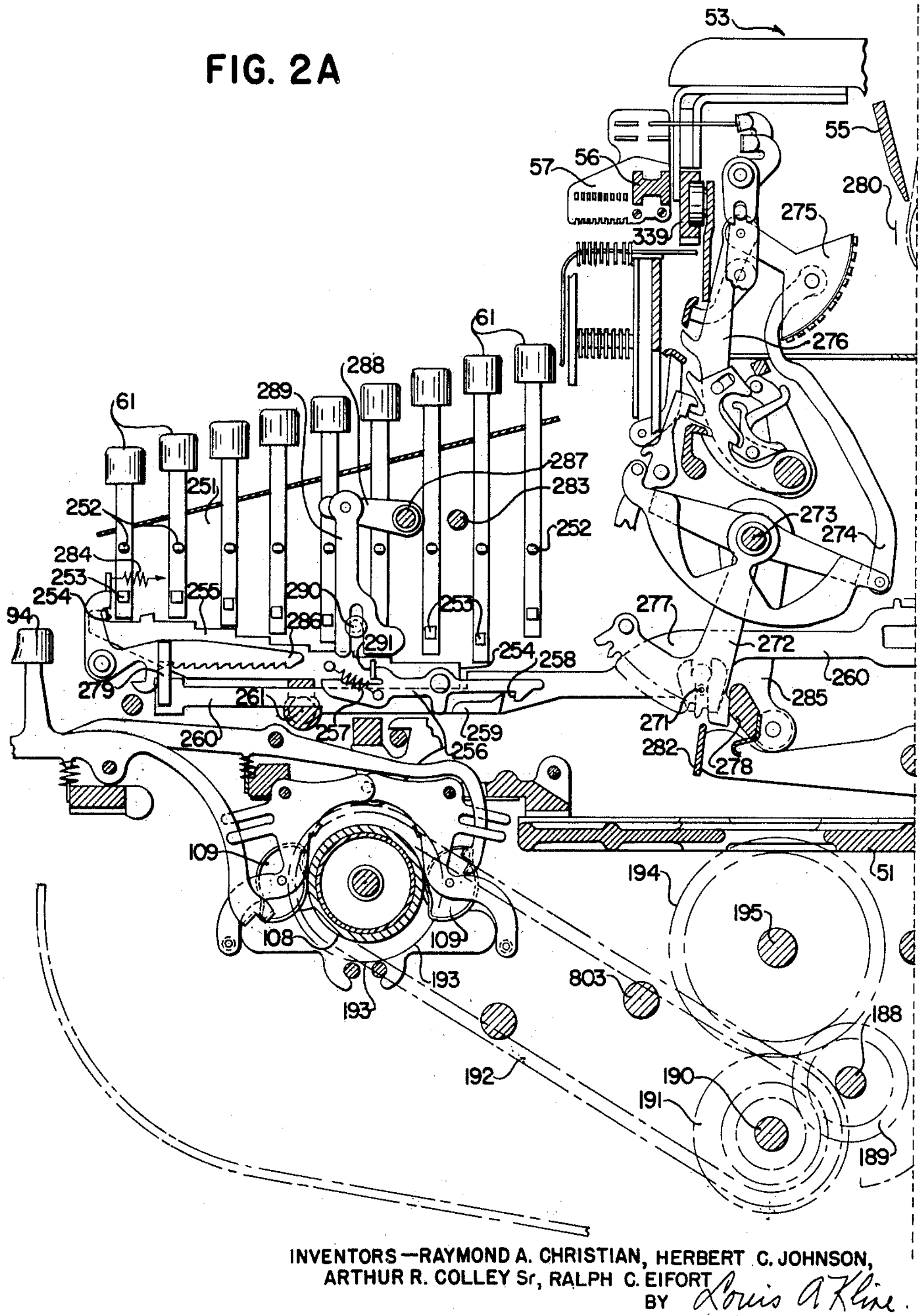
Figure 3:
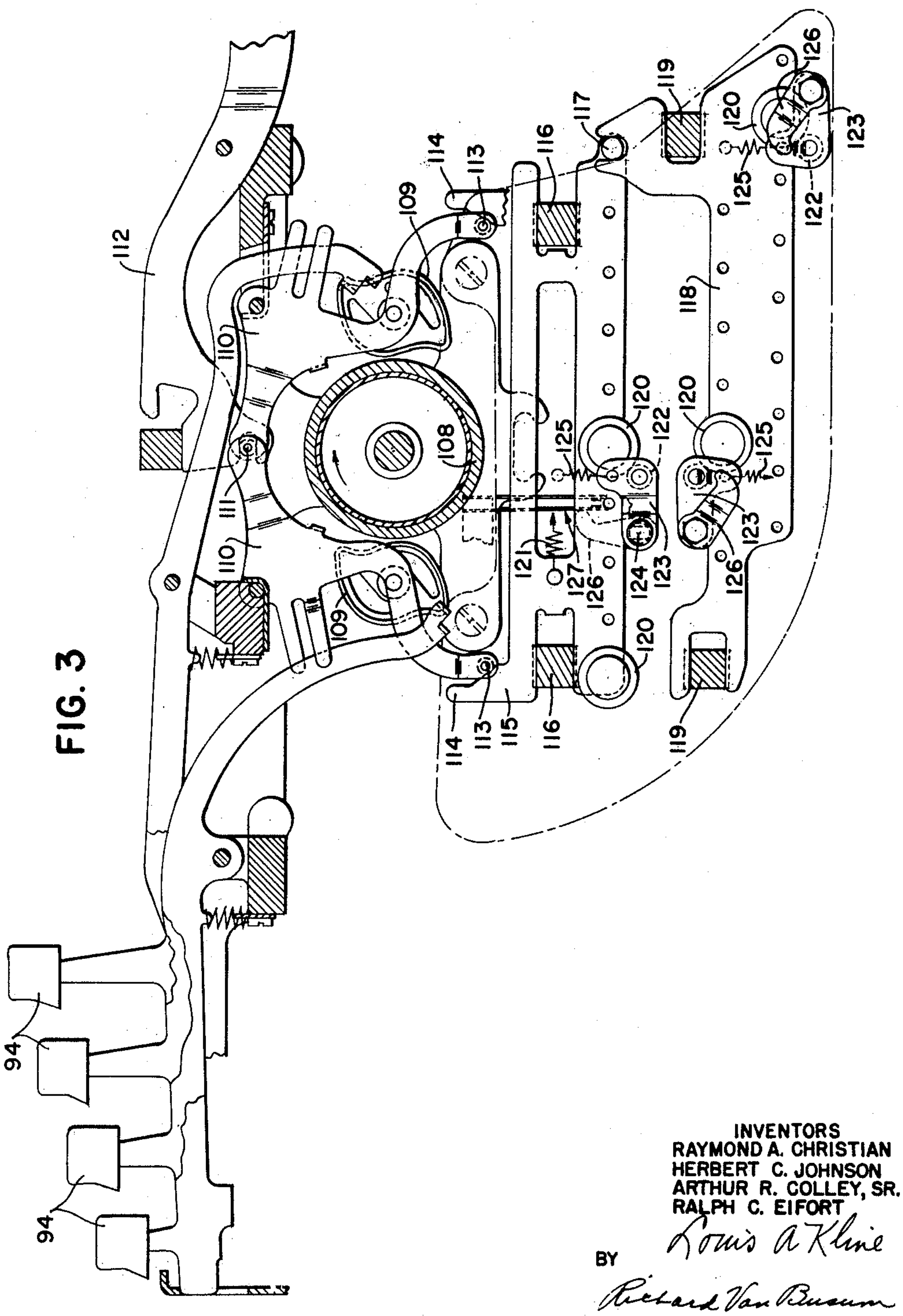
FIG. 3 is a full-scale cross-sectional view of a portion of the typewriter mechanism of the accounting machine, showing in particular the typewriter-operating roller and the slide members actuated thereby for closing switches corresponding to the depressed typewriter keys, to encode information corresponding thereto.

As previously stated, the present machine is a combined accounting machine and typewriter and, as such, has an accounting machine keyboard and a typewriter keyboard, both located at the front of the machine, as shown clearly in FIGS. 1, 2A and 3. The accounting machine keyboard includes ten rows of amount or value keys 61, three rows of date keys 62, located just to the right of the amount keys, and a combination row of year keys and symbol keys 63, located between the amount keys and the other date keys. Located immediately to the left of the date keys 62 is a repeat key 64, depression of which prevents automatic release of the amount keys 61 at the end of machine operation, so that the amount set up on said keys will be repeated in succeeding operations, and a release key 65, for manual release of any depressed amount key 61 and any of the control keys, as will be explained later.

Normally, the date keys 62 and 63 (FIGS. 1 and 2A) are stay-down keys, in that they are not automatically released at the end of each machine operation, and, therefore, in succeeding machine operations the date will be repeated unless a date-non-repeat key 66 is used in conjunction with said keys, which causes them to be automatically released at the end of machine operations, so that the date will not be repeated in subsequent operations. Likewise, a date release key 67 is provided for manual release of any depressed date key 62 or 63 prior to machine operation.

To the left of the repeat key 64 and the release key 65 is a row of control keys 68, for controlling the various functions of the machine, as will be explained more fully later. To the left of the row of control keys 68 is a row of totalizer-selecting keys 69 for selecting the different sets of totalizers on the C or No. 2 totalizer line. Immediately above the selecting key 69 is a sub-total key 70, which, when used in conjunction with said keys 69 and the corresponding total key, causes a sub-total operation to be preformed in the selected totalizer. To the left of the selecting keys 69 is a row of selecting keys 71 for selecting the different sets of totalizers on the D or No. 3 totalizer line. The keys 71 operate in conjunction with the sub-total key 70, the same as the selecting keys 69, to cause sub-total operations to be performed in the corresponding sets of totalizers on the D or No. 3 line.

Immediately above the row of selecting keys 71 is a Reverse key 72 for causing the adding and subtracting functions to be reversed in certain totalizers to correct erroneous entries previously made in said totalizers.

To the left of the selecting key 71 is a Non-Symbol key 73, which, when depressed, disables the symbol-printing function of the machine. A Clear Print key 75, when operated, causes all twenty-one totalizers of the machine to be automatically cleared in succession, and causes the totals and identifying symbols for each totalizer cleared to be printed upon record material carried by the traveling carriage. A Clear Non-Print key 74 functions similarly to the Clear Print key 75 only in that the printing mechanism will be rendered inoperative, so that results of the clearing operation will not be printed. A Read Print key 76 functions similarly to the Clear Print key 75, to cause reading or sub-total-printing operations to be performed in all of the totalizers, and the amounts read therefrom to be reentered in said totalizers for further computation.

Small finger levers, protruding through the keyboard and located adjacent the Non-Symbol key 73 and the Non-Select key 68 (FIG. 1), are operable to lock the corresponding key against depression. Likewise, a small finger lever, located immediately to the right of the Clear Non-Print key 74, is operable to lock said key, the Clear Print key 75, and the Read Print key 76 against depression. A small lever, located immediately to the left of the Add A key 68 (FIG. 1), is operable to lock this key against depression.

Located to the right of the amount keys 61 are three machine starting or release keys 77, 78, and 79, operation of any one of which initiates machine operation and causes other associated functions to be performed during machine operation. Each of the motor bars 77, 78, and 79 has two positions of operation; namely, a touch position and a hold position. Associated with the central motor bar 77 is a control lever 80, which is movable from Tabulating position to Vertical or paper feed position, and, when said lever 80 is in Tabulating position, the touch or normal operation of the motor bar 77 initiates machine operation and also causes the traveling carriage to tabulate to the next columnar position, or to a preselected columnar position. With the control lever 80 in Vertical position, normal or touch operation of the motor bar 77 initiates machine operation and simultaneously causes the platen to be rotated to line-space the record material wound therearound. Hold operation of the central motor bar 77, with the control lever 80 in Tabulating position, initiates machine operation and causes the traveling carriage to skip-tabulate to a predetermined columnar position. Hold operation of said central motor bar 77 with the control lever 80 in Vertical position initiates machine operation and, under control of the traveling carriage in preselected columnar positions, will cause the platen roll to be rotated to line-space the record material, or, selectively, will cause the traveling carriage to tabulate to a preselected columnar position. Operation of the upper motor bar 78, either touch or hold, initiates machine operation and simultaneously causes the platen roll to be rotated to line-space the record material wound therearound. Likewise, either touch or hold operation of the lower motor bar 79 initiates machine operation and simultaneously causes the traveling carriage to skip-tabulate selectively to a No. 2 or a No. 3 carriage stop.

It is well known that "touch operation" of the motor bars 77, 78, and 79 means to depress said motor bars and to immediately remove the pressure therefrom; and "hold operation" of said motor bars means to depress them and to retain pressure on said bars during machine operation. The usual non-repeat mechanism operates in conjunction with the motor bars 77, 78, and 79 to prevent repeat cycles of the machine when said motor bars are retained depressed at the end of machine operation.

Located between the units row of amount keys 61 and the lower motor bar 79 is a Tabulating key 82, depression of which releases the traveling carriage for tabulating movement from one columnar position to the next. Located above the upper motor bar 78 is a Carriage Release key 83, depression of which disengages the escapement mechanism to free the traveling carriage for movement in either forward or reverse tabulating direction. Located at the extreme right of the accounting machine keyboard are control keys 84, 85, 86, and 87. Operation of the Carriage Open control key 84 causes the front-feed throat of the traveling carriage to open or close, depending upon which position it is in when said key is operated. Operation of the Carriage Return key 85 causes the traveling carriage to be moved in a reverse tabulating direction, and operation of the Non-Auto control key 86 causes the automatic machine releasing mechanism, which operates under control of the traveling carriage in preselected columnar positions, to be disabled. The Non-Auto key 86 is a stay-down key, and the Release control key 87 is provided for restoring said key 86 to undepressed position, to reinstate the automatic operation feature of the machine.

Also located on the extreme right-hand side of the keyboard are three item or special counters, 88, 89, and 90, which operate under the control of preselected totalizers to count the number of times a particular function is performed in said totalizers. Each special counter is provided with a knurled thumb wheel 91 for resetting said counter to zero, whenever required.

*Typewriter Keyboard*

Located immediately in front of and slightly below the accounting machine keyboard (FIG. 1) is the typewriter keyboard, comprising a full complement of typewriter keys 94 for typing alpha-numeric information upon record material supported by the platen 54 of the traveling carriage. In the present machine, the entire type basket is shiftable from upper-case position to lower-case position, and vice versa, by the operation of a Shift key 95 for the printing of both upper-case characters and lower-case characters. In previous machines of this type, only the central portion of the type basket was shiftable between upper-case and lower-case positions. Directly in front of the typewriter keys 94 is a Space Bar 96, which operates in the usual manner to cause the traveling carriage to letter-space in a forward direction. The typewriter keyboard includes a Back-Space key 97, which, when operated in conjunction with the Space Bar 96, causes the traveling carriage to letter-space in a reverse tabulating direction.

Situated on the right of the typewriter keyboard are Traveling Carriage Return keys 98, 99, and 100, operation of which causes the traveling carriage to be return-tabulated to preselected columnar positions. Adjacent the Return key 99 is a small finger lever 101, operation of which causes the said Return key 99 to be coupled to a Vertical key 102 for simultaneous operation, to cause the platen roll to be rotated during return movement of said traveling carriage, to line-space the record material carried thereby. Operation of the Vertical key 102 alone causes the platen roll to be rotated to line-space the record material. Adjacent the Vertical key 102 is a Tabulating key 103, operation of which causes the traveling carriage to be tabulated in a forward direction from one columnar position to the next columnar position.

Located on the left-hand side of the typewriter keyboard (FIG. 1) are a TCT or Total Control Tabulation switch 104 and a TCR or Total Control Return switch 105. The TCT switch 104 is associated with the A totalizer and has three positions; namely, Off, Plus, and Minus. When the switch 104 is in its central, or Off, position, as shown here, the total control tabulation feature is inoperative. When the switch 104 is turned to its Plus position, a plus condition in the A totalizer will cause the traveling carriage to be tabulated in a forward direction to a predetermined columnar position, and, when said switch 104 is in its Minus position, a minus condition in said A totalizer will cause the traveling carriage to be tabulated to a predetermined columnar position. The TCR switch 105 has three positions; namely, Off, Forward Tabulating, and Return Tabulating. When the switch 105 is in is central, or "Off", position, as shown here, the TCR feature is inoperative. The TCR switch 105 is associated with the No. 1 totalizer on the B totalizer line, and, when said switch is turned to its FT position, a total operation on the B–1 totalizer will cause the traveling carriage to forward tabulate to a predetermined columnar position. When said switch 105 is turned to its RT position, a total operation performed in the B–1 totalizer will cause the traveling carriage to tabulate in a return direction to a predetermined columnar position.

*Typewriter Mechanism in General*

The typewriter attachment for the accounting machine is a so-called automatic typewriter, in that it is operated by a continuously-revolving operating roller 108 (FIGS. 2A, 2B, and 3), which is driven clockwise, as indicated by the arrow, by the operating motor 59. The operating roller 108 has a rubber face arranged to coact with cams 109 associated with each of the typewriter key levers 94, said cams being mounted in corresponding forward and rearward hangers 110, carrying studs 111, which engage type-bar-operating levers 112 in the usual and well-known manner. Depression of one of the keys 94 frees the corresponding cam 109 to spring action, which revolves said cam into engagement with the rubber face of the operating roller 108, whereupon said roller picks up said cam and its corresponding hanger 110 and imparts sharp clockwise movement to the forward hangers 110 and counter-clockwise movement to the rearward hangers 110, to move the corresponding stud 111 downwardly, thus carrying the associated lever 112 counter-clockwise to operate the corresponding type bar, to print data corresponding to the depressed typewriter key 94 upon record material carried by the traveling carriage.

Associated with each of the type key levers 94 (FIGS. 1 and 3) is a switch-operating mechanism for transmitting the alpha-numeric data represented by said key levers to some type of recording device, such as, perhaps a punched tape or magnetic tape recording device. Downward extensions of each of the hangers 110 carry studs 113, which coact with angular camming surfaces formed on upward extensions 114 of corresponding main switch-operating slides 115, mounted to slide horizontally upon square bars 116, supported by the machine framework. Each main slide 115 carries a stud 117, which engages a slot in an upward extension of an auxiliary slide 118, mounted to shift horizontally in unison with said main slide 115 by slots therein which engage square bars 119, supported by the machine framework.

Clockwise operation of the forward hanger 110 (FIG. 3), as explained above, causes the stud 113, in cooperation with the cam surface on the extension 114, to shift the slide 115 forwardly, against the action of a spring 121, said slide 115 in turn carrying forwardly in unison therewith its corresponding auxiliary slide 118. Forward movement of the slides 115 and 118 causes rollers 120, carried thereby, in cooperation with auxiliary rollers 122 mounted on cranks 123 secured on shafts 124 supported in the machine framework, to rock said cranks and said shafts clockwise and counter-clockwise, respectively (FIG. 3), against the action of springs 125. Clockwise movement of the crank 123, for the upper slide 115, carries a bent finger 126, integral therewith, also clockwise, causing said finger to engage the forward spring blade of a switch 127 and carry said blade rearwardly, in unison therewith, into engagement with a rear spring blade of said switch, to complete a circuit to the recording device, which causes the alpha-numeric data, represented by the operated key lever 94, to be entered in the tape recording device. Counter-clockwise movement of the crank 123 and the finger 126 for the slide 118 operates a switch (not shown) similar to the switch 127 for transferring data represented by the operated key lever 94 to the recording device.

Figures 17, 18, 19, 20, 21:
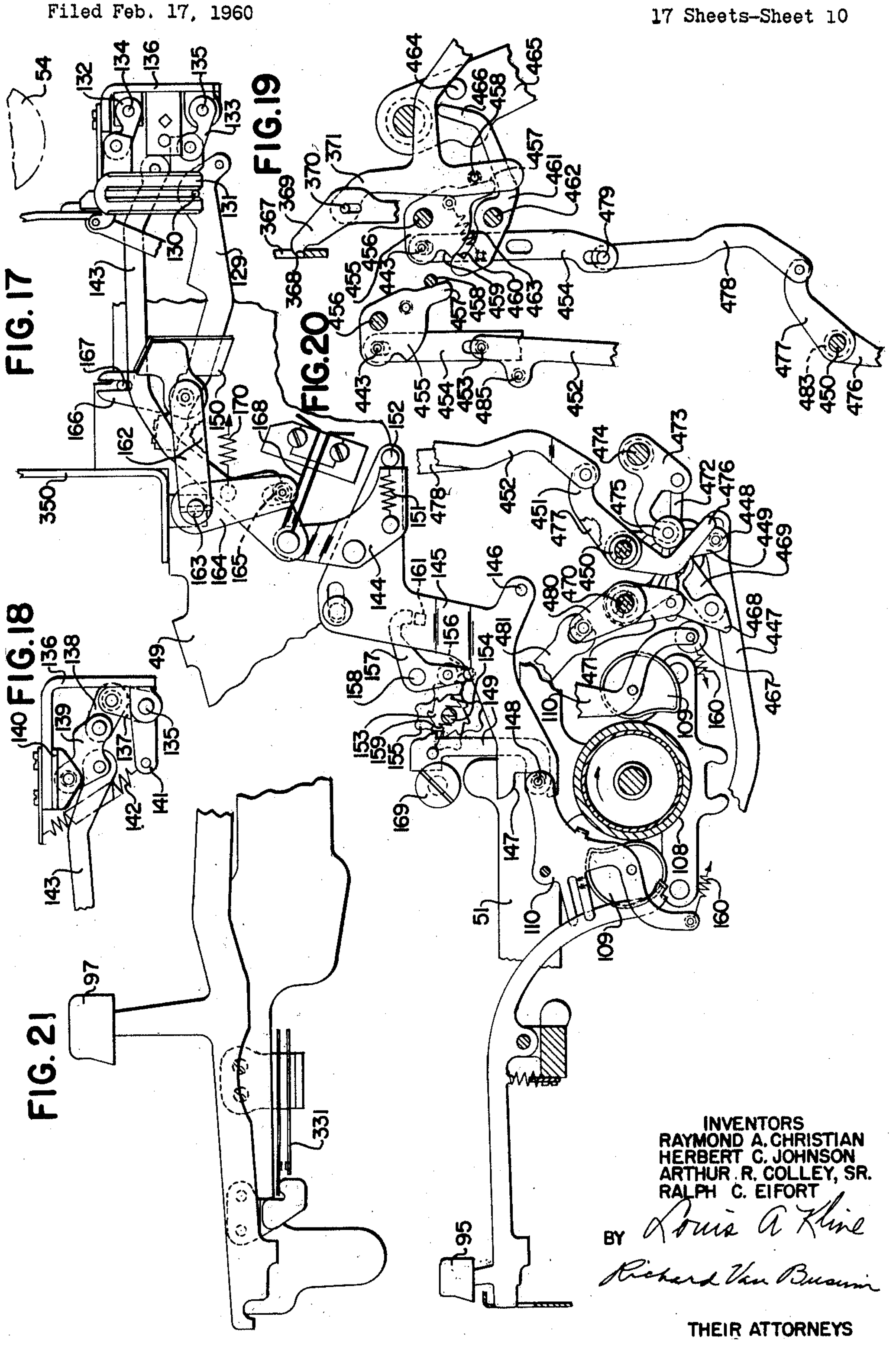
FIG. 17 is a right side elevation of the mechanism for shifting the typewriter type basket from lower-case printing position to upper-case printing position, and vice versa.
FIG. 18 is a detail view of a portion of the mechanism for shifting the typewriter type basket to either of its two printing positions.
FIG. 19 is a right elevation of a portion of the mechanism for disabling the automatic machine-releasing mechanism, when any forward or return tabulating key is operated.
FIG. 20 is a detail view of a portion of the mechanism shown in FIG. 19.
FIG. 21 is a fragmentary detail view of the typewriter back-space key, and the carriage-reversing switch associated therewith.

As previously explained in connection with FIG. 3, each of the typewriter keys 94, when depressed, controls the operation of its corresponding cam 109, hanger 110, and lever 112, which lever 112 is connected in the usual manner to the corresponding type bar 129 (FIG. 17). There is a type bar 129 for each typewriter key, and said bars are pivotally supported on a curved rod 130, retained in a curved slot formed in a segment 131, mounted for up-and-down shifting movement by means of ears formed thereon and pivotally connected to pairs of parallel arms 132 and 133, mounted on their respective shafts 134 and 135, in turn supported in ears formed inwardly from a bracket 136, secured to the left main frame 49. The type bars 129 are maintained in proper spaced relationship to each other by means of comb slots cut in the segment 131, there being a slot for each type bar 129. When in unoperated position, as shown in FIG. 17, the type bars 129 rest on a padded surface formed on a curved bar 150, mounted in the machine framework.

Secured on the shaft 135 (FIGS. 17 and 18) is a crank 137 pivotally connected by a short link 138 to an arm 139 pivoted on a downwardly-extending ear of a bracket 140 secured to the bracket 136. Also secured on the shaft 135 is an arm 141, having connected thereto one end of a spring 142, the other end of which is connected to a plate secured to the bracket 136, said spring tensioned to urge the arm 141, the shaft 135 the shaft 134, and the arms 133 and 132 clockwise, to in turn urge the type-bar-supporting segment 131 upwardly, to yieldingly maintain said segment and the type barrs 129 in their normal printing positions. A link 143 (FIGS. 17 and 18) pivotally connects the arm 139 to an arm 144, in turn pivotally mounted on a lever 145 pivoted on a stud 146 secured in the machine framework. A spring 151, tensioned between a stud in the arm 144 and a stop stud 152 in the lever 145, urges said arm 144 counter-clockwise into yielding engagement with said stop stud 152, to form a flexible or yielding connection between said arm 144 and the lever 145. A forward extension of the lever 145 has a notch 147, which coacts with a stud 148 in the hanger 110 for the case Shift key 95, said hanger carrying a cam 109, which coacts with the operating roller 108 in the usual and well-known manner.

Pivoted on the stud 148 in the hanger 110 is the lower end of an operating pawl 149, having on its upper end a tooth which coacts with eight ratchet teeth formed in a ratchet 153 on a stud 154 secured on the machine framework. Integral with the ratchet 153 is a latch-operating cam 155, having four equally-spaced camming projections thereon, separated by four equally-spaced undercut surfaces, said undercut surfaces and said camming projections arranged to coact with a roller 156 in a latch 157 free on a stud 158 secured in the machine framework. A spring 159, tensioned between the pawl 149 and the latch 157, urges said parts clockwise to normally maintain the tooth of the pawl 149 in coacting relationship with the teeth of the ratchet 153, and to maintain the roller 156 in engagement with the periphery of the operating cam 155.

Depression of the Shift key 95 frees the cam 109 for engagement with the periphery of the operating roller 108, causing said roller to rock the hanger 110 first clockwise and then back to normal position, against the tension of a spring 160 (FIG. 17). Initial movement clockwise of the hanger 110 shifts the pawl 149 downwardly, causing the tooth of said pawl to engage the teeth of the ratchet 153 and rotate said ratchet and the cam 155 counter-clockwise one eighth of a revolution, to move one of the equally spaced projections of said cam out of engagement with the roller 156 and to move one of the four equally-spaced low portions of said cam into engagement with said roller 156. Simultaneously, initial or clockwise movement of the hanger 110 causes the stud 148 to engage the bottom surface of the notch 147 to rock the lever 145 counter-clockwise on the stud 146, to move the arm 144 in unison therewith to shift the link 143 forwardly, which movement, through the mechanism shown in FIGS. 17 and 18, rocks the shafts 135 and 134, and the parallel arms 133 and 132 thereon, clockwise, to shift the segment 131 downwardly to alter the printing relationship between the type bars 129 and the platen roll 54, the lower characters on said type bars being moved out of printing relationship, and simultaneously the upper characters on said bars being moved into printing relationship with said platen 54. Initial movement-counter-clockwise of the lever 145 moves a square stud 161, carried thereby, beyond the hook-shaped rearward extension of the latch 157, whereupon clockwise movement of said latch, under influence of the cam 155 and the spring 159, causes the hook-shaped rearward extension to latch over the stud 161, to retain the lever 145 and, through the connecting mechanism shown in FIG. 17, the segment 131 and the type bars 129 in their moved positions, to maintain the upper characters on said type bars in printing relationship with the platen 54.

The cushioned bar 150 (FIG. 17), upon which rest the forward ends of the type bars 129, is arranged to shift in unison with the segment 131 through the medium of two parallel arms 162, pivotally connected to said segment and secured at their forward ends on a shaft 163, journaled in the machine framework. The bar 150 is guided in its shifting movement by means of an arm 166 secured thereto, having a vertical slot which engages a stud 167, secured in the machine framework. Secured on the shaft 163 is a crank 164, carrying a stud 165, which engages a slot in the forward end of the link 143. Forward movement of the link 143, upon initial movement counter-clockwise of the lever 145 (FIG. 17), through the stud 165, rocks the crank 164, the shaft 163, and the arms 162 clockwise, to shift the bar 150 downwardly in unison with the segment 131, to maintain the forward ends of the type bars 129 in proper spaced relationship during their shifting movements from lower-case position to upper-case position, and vice versa. Clockwise movement of the crank 164 and the stud 165 causes said stud to engage the upper spring blade of an encoder switch 168 (FIG. 17) and move said upper blade into contact with the lower blade of said switch to complete a circuit to the alpha-numeric encoding mechanism when the type bars 129 are in their upper-case printing positions.

Immediately after the high portion of the cam 109 (FIG. 17) moves beyond the periphery of the roller 108, the spring 160 returns the hanger 110 and the pawl 149 counter-clockwise to cause the tooth on said pawl to ratchet over the adjacent tooth of the ratchet 153, said ratchet and the cam 155 being maintained in position by the roller 156, carried by the latch 157, which functions under influence of the spring 159 as a retainer and aliner for said cam and said ratchet. The pawl 149 is guided in its up-and-down movement by a slotted screw 169, threaded in the machine framework. A second depression of the Shift key 95 (FIG. 17) frees the cam 109 for engagement with the operating roller 108, which immediately rocks said cam and the hanger 110 clockwise, as before, to shift the pawl 149 downward to advance the ratchet 153 and the cam 155 one eighth of a revolution to cause one of the four camming projections of said cam to engage the roller 156 and rock the latch counter-clockwise, against the action of the spring 159, out of engagement with the square stud 161, to free the lever 145 and the link 143 for return movement clockwise and rearwardly, respectively, under influence of a spring 170, which is tensioned to urge said link 143 rearwardly after the high portion of the cam 109 moves beyond the periphery of the roller 108. Rearward movement of the link 143, through the linkage shown in FIGS. 17 and 18, and assisted by the spring 142, returns the segment 131 and the bar 150 upwardly to normal position, where the lower characters on the type bar 129 are in proper position to be in proper printing relationship with the platen 54.

Rearward movement of the link 143 and concurrent counter-clockwise movement of the stud 165 and the crank 164 open the switch 168 to render the encoding mechanism ineffective when the type bars 129 are in upper-case printing position.

The mechanism for shifting the type bars from lower-case printing position to upper-case printing position, and vice versa, is similar in many respects to the mechanism disclosed in the Christian et al. Patent No. 2,851,218.

Figure 2B:
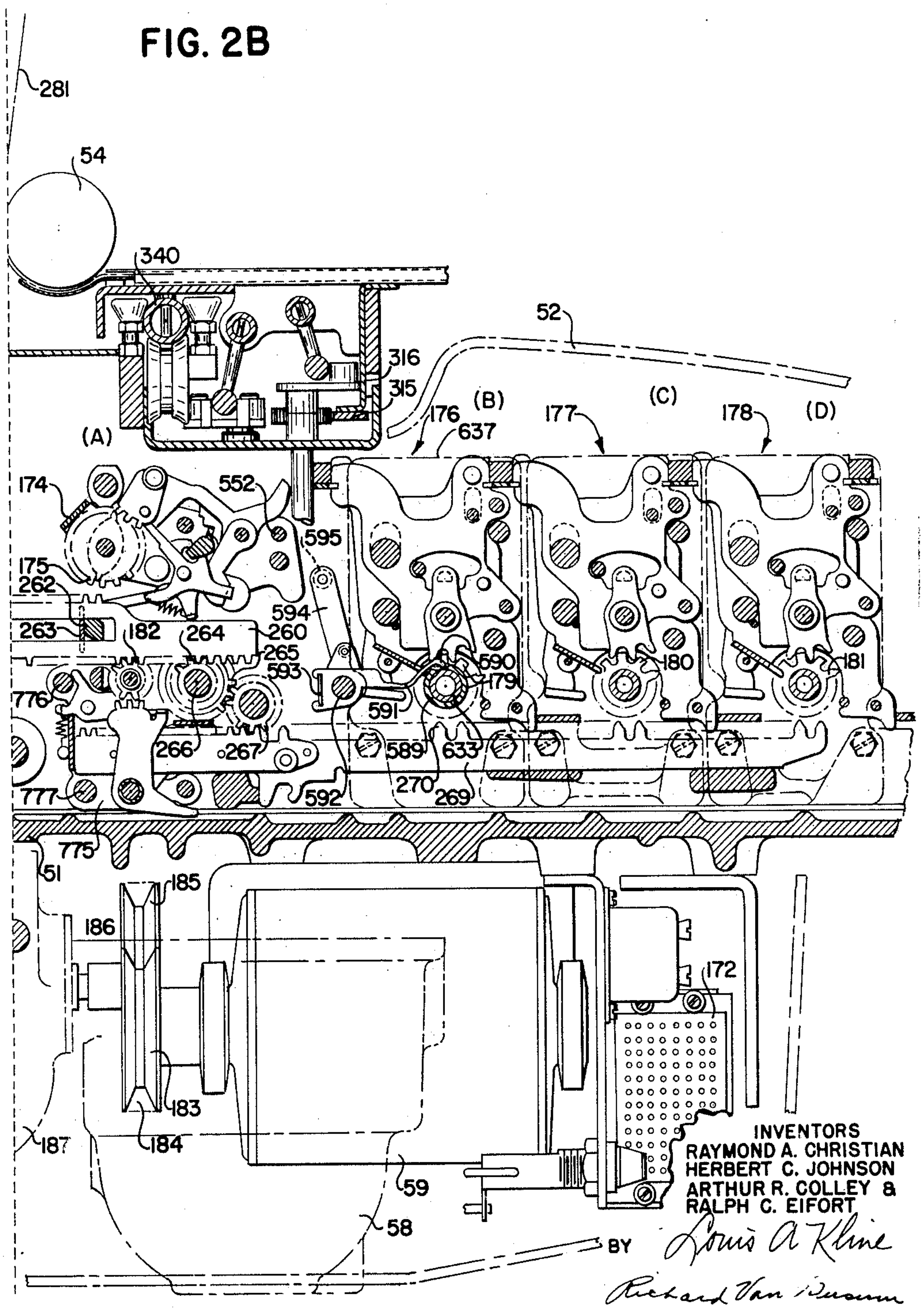

By reference to FIG. 2B, it will be seen that the machine is provided with a program board 172, for use in arranging different programs of the encoding mechanism. A multiple receptacle and plug mechanism (not shown) is provided for connecting the encoding mechanism to the recording mechanism.

*Totalizers in General*

The totalizer equipment of the machine comprises a balance or A totalizer 174, often referred to as a cross-footer (FIG. 2B), having one set of add-subtract wheels 175. The balance totalizer 174 is similar in construction and operation to the totalizers disclosed in the Christian et al. Patent No. 2,626,749, and said totalizer will be described herein only in a general way, as its construction and operation are well known in the art.

The totalizer equipment of the machine also includes three lines of interspersed totalizers 176, 177, and 178, located at the rear of the machine, and alternately referred to as totalizers B, C, and D. The B totalizer 176 comprises four sets of interspersed totalizer wheels 179, the C totalizer 177 comprises eight sets of interspersed totalizer wheels 180, and the D totalizer 178 comprises eight sets of interspersed totalizer wheels 181.

The general construction of the interspersed totalizers 176, 177, and 178 (FIG. 2B) is similar to the construction of the interspersed totalizers disclosed in the previously-referred-to United States Patent No. 2,930,523, Raymond A. Christian et al., inventors. However, the totalizer mechanism disclosed in the present application incorporates various important improvements which will be described in detail hereinafter.

An overdraft device 182 (FIG. 2B) is provided for transposing the complementary amount of an overdraft to a true negative amount, and said device may be used in connection with any of the totalizers, including the balance totalizer 174 and the three lines of interspersed totalizers 176, 177, and 178. The overdraft device 182 is alternately referred to as the X totalizer.

*Machine-Operating Mechanism*

Referring to FIG. 2, the operating motor 59, which, as previously explained, is secured to the lower surface of the base 51, has a pulley 183, secured on the forward end of its armature shaft, which is connected by a belt 184 to a similar pulley 185, secured on a shaft 186, journaled in a gear casing 187, secured to the machine base. The shaft 186 is connected by a worm and worm gear (not shown) to a cross shaft 188, journaled in the casing 187. A gear 189, secured on the right-hand end of the shaft 188, meshes with a gear secured on a shaft 190, journaled in the casing 187, said shaft 190 having secured thereon a pulley 191, connected by a belt 192 to a pulley 193, secured on the shaft for the typewriter-operating roller 108.

The gear 189 meshes with and drives a clutch drive gear 194, free on a main cam shaft 195, journaled in the machine framework. See FIGS. 2A and 7. Resiliently connected to the gear 194, through the medium of a rubber-bond, is a notched clutch-operating wheel 196, the notched periphery of which coacts with a clutch dog 197 secured on a short shaft 198 journaled in a hub in a disk 199 secured on the main cam shaft 195. Also secured on the shaft 198 (FIG. 7) is a segmental gear 200, the teeth of which mesh with companion teeth in a clutch-operating arm 201, free of a hub formed on the disk 199 and urged clockwise by a spring 202 to normally maintain an extension 203 thereon in yielding engagement with the end of a clutch operating pawl 204 secured on a short shaft 205 journaled in the machine framework. Also secured on the shaft 205 is an arm 206, having a slot which engages a stud 207 in the lower end of an arm 208, secured on a short shaft 209, journaled in the machine framework. Also secured on the shaft 209 is an arm 210, having in its upper end a slot which embraces a stud 211 in a slide 212 shiftably mounted by means of parallel slots therein, in cooperation with studs 213 and 214 secured in the machine framework. The slide 212 has a shoulder (FIG. 7) which engages a square stud 215 in a lever 216 free on a stationary stud 217. A spring 218, tensioned between the arm 208 and the lever 216, urges said parts counter-clockwise and clockwise, respectively, to in turn urge the slide 212 forwardly and the square stud 215 upwardly to maintain said stud and the shoulder on said slide 212 in yielding engagement with each other. An upward surface on the forward end of the lever 216 coacts with a bent-over ear 219 formed on an arm 220 pivoted on a bar 222 (FIGS. 4 and 7) mounted for parallel up-and-down movement by being pivotally connected to the forward extensions of bell cranks 223 and 224 free on studs 225 and 226 secured in the right frame 50. Downward extensions of the bell cranks 223 and 224 are pivotally connected by a link 227, which, together with said bell cranks and the bar 222, forms a parallelogram device for insuring parallel up-and-down movement of said bar 222. A spring 228 (FIG. 4) urges the arm 220 counter-clockwise to normally maintain a rearward extension thereof in yielding engagement with a stop stud in the bar 222.

The motor bars 77, 78, and 79 (FIGS. 4 and 7) are mounted for angular up-and-down movement by means of slots therein, in cooperation with studs 233 secured in the right frame 50. Depression of the motor bar 77 (FIGS. 4 and 7), against the action of a spring 234, causes a bent-over ear 235 thereon, in cooperation with a raised surface on the upper edge of the bar 222, to depress or lower said bar and the arm 220. Downward movement of the arm 220 causes the ear 219 to engage the forward end of the lever 216 and rock said lever counter-clockwise, against the action of the spring 218, to disengage the square stud 215 from the shoulder on the slide 212, to free said slide for forward movement under influence of the spring 218 and a spring 236 (FIG. 7) tensioned between the arm 208 and a stationary stud. This permits counter-clockwise movement of the arm 210, the shaft 209, and the arm 208, under influence of the springs 218 and 236. Counter-clockwise movement of the arm 208 rocks the arm 206, the shaft 205, and the pawl 204 clockwise, to disengage said pawl from the extension 203 of the release arm 201, to free said arm to the action of the spring 202, which immediately rocks said arm clockwise. Clockwise movement of the arm 201 rocks the segmental gear 200 and the clutch dog 197 counter-clockwise, to engage said clutch dog with one of the notches in the periphery of the clutch wheel 196, which wheel is continuously revolved clockwise by the operating motor, as previously explained, thus causing said wheel 196 to pick up the dog 197 and the disk 199 and rotate them clockwise in unison with said wheel 196. Inasmuch as the disk 199 is secured to the main cam shaft 195, said shaft revolves in unison with said disk to drive the machine mechanism through one cycle of operation. The main cam shaft 195 (FIG. 7) has secured thereon a plurality of cams which rotate one revolution clockwise in unison therewith to operate the various mechanisms of the machine.

As the main cam shaft 195 and the disk 199 near the end of their clockwise movement, a cam (not shown), integral with said disk, engages a roller (not shown) on an extension 237 (FIG. 7) of the arm 206 and restores said arm, the shaft 205, and the pawl 204 counter-clockwise, against the action of the springs 218 and 236, to move said pawl 204 into the path of the extension 203 of the arm 201, to obstruct further clockwise movement of said arm, whereupon continued rotation of said disk 199 rocks the dog 197 out of engagement with the notch in the wheel 196 to terminate rotation of said parts, after they have completed one clockwise revolution. A homing device is provided for urging and assisting the main cam shaft 195 and connected parts to home position, and for resiliently retaining them in said position. The homing mechanism includes a cam 238 (FIG. 7), secured on the main cam shaft 195, the periphery of which cam coacts with a roller 239 in one arm of a lever 240, free on a stationary stud 241 and urged clockwise by a comparatively strong spring 242 to yieldingly maintain the roller 239 in engagement with the periphery of said cam 238. As the main cam shaft 195 and connected parts, including the cam 238, revolve, the high portion or node of said cam 238 rocks said lever 240 counter-clockwise to apply added tension to the spring 242. As the high portion of the cam 238 moves beyond the roller 239, said roller, under influence of the spring 242, pushes against a declining surface of said cam, to assist said cam and the shaft 195 to home position, which is determined by said roller engaging a notched portion in the periphery of said cam, as shown here. Restoring movement clockwise of the arm 208, the shaft 209, the arm 210, and the slide 212 moves the shoulder on said slide beyond the square stud 215 in the lever 216, whereupon the spring 218 restores said lever and the stud 215 clockwise to move said stud into the path of the shoulder on the slide 212 to retain said slide in its right-hand or restored position, against the action of the springs 218 and 236.

A simple non-repeat mechanism is provided for preventing unintentional repeat operations or cycles of the machine caused by retaining the motor bar 77 depressed at the end of the machine operation.

Counter-clockwise movement of the arm 210 (FIG. 7) under influence of the springs 218 and 236, after downward movement of the arm 220 has disengaged the square stud 215 from the shoulder on the slide 212, causes the upper end of said arm 210, in cooperation with the ear 219 on said arm 220, to rock said arm clockwise out of engagement with the upper surface formed on the forward end of the lever 216, thus freeing said lever to the action of the spring 218, which immediately restores said lever partially in a clockwise direction until the square stud 215 engages the lower surface adjacent to the shoulder in the slide 212. If the starting bar 77 is retained depressed at the end of machine operations, the slide 212 and the arm 220 are consequently maintained in their downward or depressed positions, thus holding the ear 219 beneath the coacting surface on the forward extension of said lever 216, so as not to interfere with clockwise movement of said lever by the spring 218 to re-engage the square stud 215 with the shoulder on the slide 212, thus preventing an unintentional repeat cycle of the machine.

Associated with each of the upper and lower motor bars 78 and 79 (FIGS. 4 and 7) is a corresponding slide 232, shiftably supported on the studs 233, each slide having a bent-over ear 243, which coacts with corresponding raised surfaces formed on the upper edge of the release bar 222. Springs 244, tensioned between the slides 232 and corresponding latches 245, normally maintain said slides in their upward positions, where the bottoms of the slots therein engage the studs 233 and simultaneously urge the corresponding latches 245 clockwise into yielding engagement with the rear edges of said slides 232. Depression of either of the motor bars 78 or 79, against the action of their corresponding springs 246, causes studs 247, carried thereby, in cooperation with slots formed in the corresponding slides 232, to carry the corresponding one of said slides downwardly in unison therewith, against the tension of the springs 244. Downward movement of either of the slides 232 causes its ear 243, in cooperation with the corresponding raised surface on the bar 222, to shift said bar and the arm 220 downwardly in unison therewith to engage the clutch mechanism shown in FIG. 7 and thus to initiate a machine operation exactly as explained in connection with the central or main motor bar 77. Downward movement of either of the slides 232 (FIG. 4), upon depression of the corresponding motor bar 78 or 79, causes a notch in the rear edge of said slide to be engaged by the corresponding latch 245, to retain said slide in its downward position while the corresponding motor bar 78 or 79 is free to be restored upwardly by the corresponding spring 246. Restoring movement rearwardly of the slide 212 (FIG. 7), near the end of machine operation, as explained before, causes upward extensions 248 and 249 of said slide, in cooperation with studs in the latches 245, to disengage said latches from the notches in the operated slide 232, to free said slide to the action of the spring 244, which restores it upwardly to normal, or undepressed, position.

*Amount Differential Mechanism*

Inasmuch as the amount differential mechanism is substantially duplicated in each denominational order of the machine, it is believed that the explanation of one such order, shown in FIGS. 2A and 2B, will be sufficient for the present purpose.

The amount keys 61 of the order being described are mounted for vertical sliding movement upon their partition plate 251, forming a part of the keyboard framework, and each key 61 is spring-urged upwardly to normal, or undepressed, position, as shown here. Each of the amount keys 61 has secured therein a key pin 252, which coacts with a corresponding control plate, detent plate, and lock plate, mounted for horizontal shifting movement on the partition plate 251, said plates not shown herein, but fully disclosed in the Christian et al. Patent No. 2,626,749. Each of the keys 61, with the exception of the "nine" key, carries a stud 253, which coacts with a corresponding shoulder of graduated step 254 formed on the upper edge of a key stop slide 255 mounted for horizontal shifting movement by means of two studs therein, which cooperate with horizontal slots in the partition plate 251. The slide 255 has pivotally mounted thereon a latch 256 urged clockwise by a spring 257 to normally maintain a shoulder 258 on its rear end in the path of a tooth 259 secured to an upper rack 260 mounted for horizontal shifting movement at its forward end in a corresponding slot in a bar 261, and having in its rear end a slot which engages a bar 262 (FIG. 2B), said bars being supported by the machine framework. A slotted rear portion of the rack 260 engages a corresponding slot formed in a comb 263, secured to the bar 262, to assist the forward bar 261 in maintaining proper side-spacing relationship of said rack 260.

The rear end of the rack 260 has, formed on its upper edge, teeth which are arranged to be engaged by the corresponding denominational wheel 175 of the balance or a totalizer 174. Teeth formed on the downward edge of the rear end of the upper rack 260 are arranged to be engaged by the corresponding order wheel 182 of the overdraft or X totalizer storage device. The teeth in the downward edge of the rack 260 also mesh with a gear 264 integral with a gear 265 free on a shaft 266 supported in the machine framework, said gear 265 in turn meshing with and driving a gear 267 free on a shaft 268 supported in the machine framework. The teeth of the gear 267 mesh with teeth formed on the upper forward edge of a corresponding lower rack 269 to form an operating connection between the upper rack 260 and its companion lower rack 269. The rack 269 is mounted for horizontal shifting movement in corresponding slots formed in bars secured to the machine framework. Large teeth 270 (FIG. 2B), formed on the upper edge of the lower rack 269, are arranged to be engaged by wheels 179, 180, and 181 of the B, C, and D totalizers 176, 177, and 178 for the purpose of actuating said totalizers.

The upper rack 260 has a vertical slot (FIG. 2A) engaged by a stud 271 in a printer-positioning segment 272 rotatably supported on a shaft 273 journaled in the machine framework. A link 274 pivotally connects a rearward arm of the segment 272 with a corresponding printing sector 275, pivotally connected to a corresponding operating arm 276. The printing sector 275 has, formed on its face, numerals corresponding to the amount keys 61 for recording the values of said keys upon the record material supported by the platen roll 54. A spring 277 (FIG. 2A) forms a yieldable connection between the segment 272 and a leading frame bail 278, extending between two substantially parallel arms 285 (only one shown), which are in turn rotatably supported by the shaft 273, journaled in the main frames.

Each denominational order is provided with a zero latch 286 (FIG. 2A) having, in its lower edge, teeth which engage a stop block 279, secured to the forward end of the corresponding upper rack 260, to retain said rack and its companion lower rack 269 (FIG. 2B) in zero position, when no amount key is depressed. Depression of one of the amount keys 61 causes the pin 252 to shift the corresponding control plate forwardly, said plate in turn rocking the latch 286 counter-clockwise, against the action of a spring 284, to move the teeth on the lower edge of said rack out of engagement with and out of the path of the stop block 279, to free the racks 260 and 269 for positioning movement under influence of the leading frame bail 278. Likewise, upon depression of an amount key 61, the pin 252 by-passes the corresponding latch hook formed on the flexible detent plate, whereupon said hook latches over said pin to retain the key 61 in depressed position.

Depression of any one of the amount keys 61 (FIG. 2A), with the exception of the "nine" key, moves the square stud 253 in its lower end into the path of the corresponding step 254 on the slide 255, after which operation of the machine may be initiated by depression of one of the starting bars 77, 78, or 79 (FIG. 7) in the manner explained before. During operation of the machine, the bail 278 moves first in a counter-clockwise or rearward direction, to the position shown in dot-and-dash lines, and the spring 277 carries the racks 260 and 269 and the slide 255 rearwardly in unison therewith until the step on said slide 255 engages the stud 253 of the depressed amount key to determine rearward movement of said parts and thus to position them in accordance with the value of the depressed amount key 61. After the rack 260 has been positioned by the depressed amount key 61, as explained above, the leading frame bail 278 completes its rearward movement independently thereof, tensioning the spring 277. The positioning of the rack 260 is transmitted to the segment 272 and, through the link 274, to the printing sector 275 to position said sector in accordance with the value of the depressed amount key, whereupon operation of the arm 276 imparts a hammer-like blow to the printing sector 275 to cause said sector, in cooperation with an inking ribbon 280 (FIGS. 2A and 2B), to print the value of the depressed key upon record material 281 supported by the platen roll 54.

After the rack 260 and the segment 272 have been positioned under influence of the depressed amount keys, as explained above, an aligning bar 282 is moved inwardly, or clockwise, to engage teeth formed in the periphery of said segment 272, to maintain said segment 272 and connected parts in said position during printing movement of the sector 275 and during engagement of the wheels of the selected totalizer with the corresponding teeth in the racks 260 and 269.

It should be observed, by reference to FIGS. 1 and 2A, that the "nine" key 61 has no stud 253 which coacts with a corresponding step on the slide 255; however, said key does have a pin 252, which disengages the zero latch 286 and frees the slide 255 and connected parts for full movement rearwardly, under the influence of the leading frame bail 278, to position said parts in "nine" position, which is determined by a shoulder, formed on the lower edge of the rack 260, coming into contact with the forward edge of the bar 261.

Upon release of the machine for operation, a key lock shaft 283 (FIG. 2A), journaled in the keyboard framework, operates to shift the locking plate for the key 61 rearwardly to cause hooks formed on said plate to latch over the studs 252 of the undepressed keys 61, to lock said keys in their undepressed positions, and, at the same time, said shaft obstructs shifting movement of the flexible detent, to lock the depressed amount key 61 against release during machine operation. Near the end of machine operation, the key lock shaft 283 restores the locking plate to unlocking position, and, simultaneously, a key release shaft 287, journaled in the keyboard framework, operates to shift the flexible detent rearwardly to unlatch the depressed key and free it to the action of its spring, which immediately restores said key upwardly to undepressed position.

The key release shaft 287 functions in the manner explained above in adding and subtracting operations to release the depressed amount key 61 near the end of such operations. However, in sub-total-taking and total-taking operations, the key release shaft 287 receives movement at the beginning of such operations to release any unintentionally or inadvertently depressed amount key 61 and, at the same time, shifts the control plate forwardly to rock the zero latch 286 to ineffective position to free the rack 260 and the slide 255 for positioning movement under influence of the corresponding wheel of the selected totalizer.

Secured on the release shaft 287 (FIG. 2A) is an arm 288, having pivotally connected thereto the upper end of a latch release bar 289, the lower end of which is slotted to receive a guide stud 290, secured in the partition plate 251. Initial movement counter-clockwise of the key release shaft 287 and the arm 288, at the beginning of sub-total-taking and total-taking operations, shifts the bar 289 downwardly, causing a bottom surface thereon to engage an ear 291, bent outwardly from a forward extension of the latch 256, to rock said latch counter-clockwise, against the action of the spring 257, to move the locking shoulder 258 thereon out of the path of the tooth 259 to disconnect the slid 255 from the rack 260, so that rearward positioning movement of said rack will not be interfered with, in case one of the amount keys 61 is unintentionally retained in depressed position by the operator. Return movement forwardly of the rack 260 causes the tooth 259 to by-pass the shoulder 258 of the latch 256, whereupon said shoulder latches over said tooth to again connect the slide 255 to said rack 260.

In subtracting operations, the corresponding wheels of the selected totalizer or totalizers are engaged with the racks 260 and 269 prior to their initial movement, which movement rotates said wheels in a reverse direction to subtract therefrom the value of the depressed amount key 61. In adding operations, the corresponding wheels of the selected totalizers are engaged with the racks 260 and 269 after said racks have completed their initial movements rearwardly and prior to their return movements forwardly, which return movement rotates said wheels in an additive direction to add thereto the value represented by the depressed amount key 61. In totalizing operations, including both sub-total-taking and total-taking operations, the corresponding wheel of the selected totalizer is engaged with the corresponding rack 260 or 269 prior to its initial movement rearwardly, which movement rotates said wheel in a reverse direction from its preset position to zero position, which is determined by a long tooth on said wheel coming into contact with a zero stop. This positions the racks 260 and 269 according to the value standing on the selected wheel, and said rack 260 simultaneously positions the printing sector 275 (FIGS. 2A and 2B), so that the amount of the total or sub-total will be printed upon the record material supported by the platen roll.

In total-taking operations, the wheel of the selected totalizer is disengaged from the racks 260 or 269 prior to their return movement forwardly, so that said wheel will remain in a zeroized condition. In sub-total operations, the selected totalizer wheel remains in engagement with the rack during its return forward movement and is restored thereby to its original position, to preserve the amount for further computation or reference.

*Fluid Drive Mechanism for Traveling Carriage*

As previously explained, the traveling carriage 53 (FIGS. 2A, 10, and 11) is driven in forward and return tabulating directions by the fluid clutch 58, which is contained in a pot-shaped casing secured to the bottom surface of the machine base 51. The shaft 188, which, as previously explained, is driven by the operating motor 59, is connected by a tenon-and-slot clutch mechanism to a shaft 292 (FIG. 10) journaled in brackets (not shown) depending from the machine base 51. The shaft 292 carries a worm wheel (not shown), which meshes with and drives a worm (not shown) secured to a shaft 293, journaled in the fluid clutch casing 58 (FIG. 11). The shaft 293 is connected by bevel gears to a vertical shaft 294, journaled in the casing 58 and having secured thereto a bushing which is in turn integral with a fluid clutch driving member 295. Similar in outline to the driving member 295, and located immediately above said member, is a fluid clutch driven member 296, integral with a bushing free on the shaft 294, said bushing having in its upper end a slot which engages a tenon formed on the hub of a gear 297, said parts also free on the shaft 294. The gear 297 meshes with and drives a companion gear 298, journaled on a hub 299, secured in a cover 300 for the fluid-containing sump of the fluid casing 58. The sump formed by the casing 58, and containing the driving and driven members 295 and 296, contains a sufficient amount of fluid, such as oil, for properly covering the clutch members to form an efficient fluid coupling therebetween.

Gears (not shown) connect the gear 298 (FIG. 11) to a companion gear 301 for reverse rotation for driving the traveling carriage in either forward or return directions. The gear 301 is rotatably supported on a bushing 302, secured in a bracket 303, integral with the cover 300. The gears 298 and 301 carry, respectively, clutch studs 304 and 305 arranged to be engaged by a clutch finger 306 secured on the downward end of a vertical shaft 307 supported for rotation and vertical shifting movement in central borings in the bushings 299 and 302, and by a bushing secured in a top plate 308, which forms a cover for the fluid drive mechanism, said bushings being in axial alinement. Also secured on the shaft 307 (FIG. 11) is a gear 309, which meshes with a wide-faced gear 310, secured on a shaft shaft 311, the upper end of which is journaled in a bushing in the plate 308 and the lower end of which is journaled in a boring in a stud secured to the cover 300. The upper end of the shaft 311 has a clutch cut engaged by a tenon formed on the lower end of a companion shaft 312, supported in axial alignment with said shaft 311 by a bushing in the top plate 308, and by a bracket 313, secured to the machine framework. Secured on the upper end of the shaft 312 (FIG. 11) is a pinion 314, which meshes with a rack 315, extending lengthwise of the traveling carriage and secured to said carriage by brackets 316.

Figure 10:
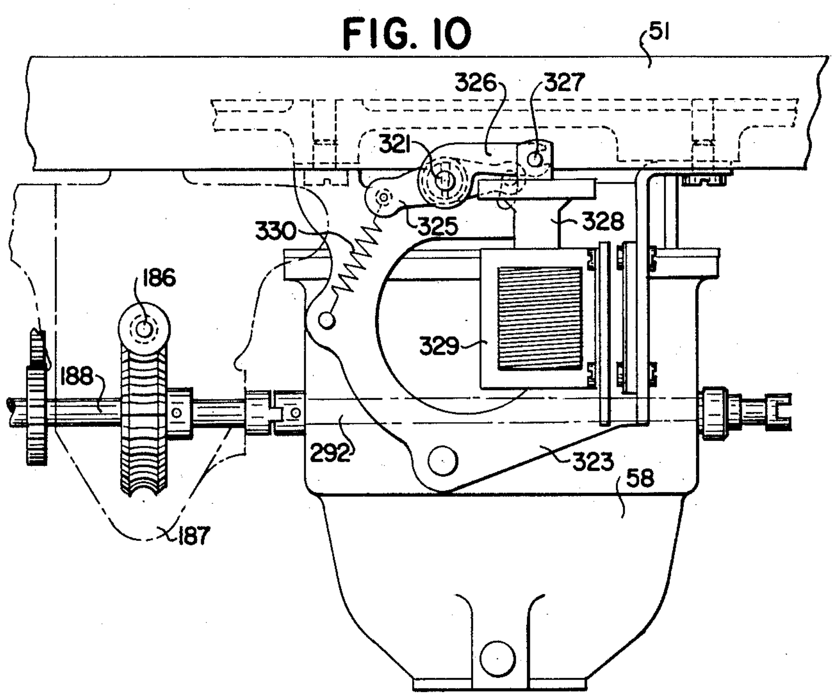
FIG. 10 is a rear detail view of the fluid drive mechanism for the traveling carriage and the reversing solenoid associated therewith.
Figure 11:
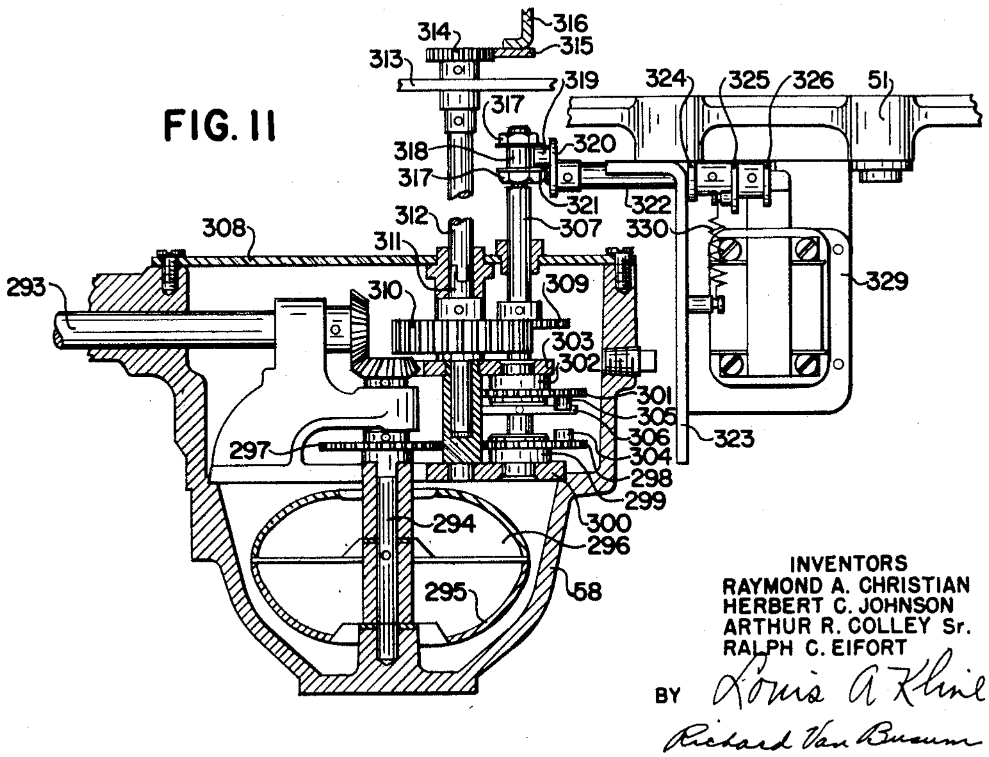
FIG. 11 is a cross-sectional view of the traveling carriage fluid drive mechanism, as observed from the left.

The upper end of the shaft 307 is threaded to receive nuts 317, between which is clamped a spool-shaped collar 318 snugly embracing between its flanges a roller 319 carried by an arm 320 secured on a shaft 321 journaled in a bushing 322 in a bracket 323 secured to the lower surface of the machine base 51 (FIGS. 10 and 11). Also secured on the shaft 321 is an arm 324, carrying a stud which operates in a slot formed in the bracket 323 to limit the rocking movement of the shaft 321 and the parts mounted thereon. Also secured on the shaft 321 is a crank 325, to which is connected one end of a spring 330, the other end of which is connected to a stud in the bracket 323 and tensioned to urge said arm and the shaft 321 counter-clockwise, as viewed in FIG. 10, to maintain the stud in the arm 324 in yielding engagement with the top end of the slot in the bracket 323, as shown here. Secured on the rear end of the shaft 321 is an arm 326, slotted to receive a stud 327 in a displaceable armature 328 of a solenoid 329, secured to the bracket 323.

Under normal conditions, the spring 330 (FIGS. 10 and 11) maintains the shaft 307 in its upward position, where the clutch finger 306 is in engaging relationship with the studs 305 in the gear 301, whereby operation of the fluid clutch mechanism normally urges the traveling carriage in a forward tabulating direction, or from right to left, as viewed from the front of the machine. Energization of the solenoid 329 pulls the armature 328 downward, to rock the shaft 321 clockwise (FIG. 10), against the action of the spring 330, to shift the shaft 307 (FIG. 11) downwardly to move the clutch finger 306 out of engaging relationship with the studs 305 and into engaging relationship with the studs 304 in the gear 298, which gear is being rotated by the fluid clutch mechanism in a reverse direction to the direction of the gear 301 and, through said clutch finger 306, drives the shaft 307, the gear 309, the gear 310, the shaft 312, and the pinion 314 opposite to the direction in which said parts were revolved by the gear 301, to urge the traveling carriage in a return tabulating direction, or from left to right, as viewed from the front of the machine.

The reversing solenoid 329 is operated by a plurality of switches in its circuit, which are in turn operated by the carriage return keys 85, 98, 99, and 100 (FIG. 1) and by the Back-Space key 97. The switch 331 for the Back-Space key 97 is shown in FIG. 21, and depression of said key closes said switch to operate the solenoid, to reverse the action of the carriage-driving mechanism, whereupon operation of the Space Bar 96 (FIG. 1) causes the traveling carriage to letter-space in a reverse tabulating direction.

*Carriage Escapement Mechanism*

The traveling carriage is normally held against the urgency of the fluid drive mechanism disclosed in FIGS. 10 and 11 by an escapement mechanism (FIG. 5) comprising coacting sets of escapement pawls 334 and 335 and 336 and 337 pivotally mounted on studs secured in the machine framework, said companion sets of pawls being connected by springs 338, which urge teeth formed on the upper edges of said pawls into yielding engagement with escapement teeth formed on the lower edge of a rail 339 secured to the front of the traveling carriage (see also FIG. 2A) and extending substantially the full length thereof. The rail 339 has, formed in its rear face, a raceway engaged by rollers mounted on upward extensions of a plate in turn secured to the machine framework, and supports the front portion of the traveling carriage for horizontal shifting or tabulating movement, while the rear portion of said carriage is supported for tabulating movement by a hollow shaft or tube 340 (FIG. 2B), secured to said carriage, in cooperation with rollers mounted on a crossbar secured to the machine framework. The escapement pawls 334 and 336 prevent movement of the traveling carriage in a forward or left-hand direction (FIG. 5), while their companion pawls 335 and 337 prevent movement of said carriage in a return, or right-hand, direction. It will be noted that the teeth of the pawls 334 to 337 inclusive are staggered, so that, when operated alternately, they permit escapement of the traveling carriage the equivalent of one half of a tooth space, which is proper for letter-spacing movement of said traveling carriage under influence of the typewriter keys 94 and the typewriter Space Bar 96.

Mechanism (not shown), operated by the universal bar of the typewriter each time a typewriter key 94 or the Space Bar 96 is depressed, functions rapidly in an up-and-down movement and coacts with the left-hand ends of the pawls 334 and 336, to disengage the engaged ones of said pawls and to permit the other ones of said pawls to engage the next adjacent tooth of the rail 339, to cause the traveling carriage to letter-space. Under normal conditions, the letter-spacing of the traveling carriage will be in a forward, or left-hand, direction (FIG. 5), as that is the way the fluid drive mechanism is arranged to normally urge the traveling carriage. However, as previously explained, depression of the Back-Space key 97 (FIGS. 1, 5, and 21) reverses the action of the fluid drive mechanism, which then urges the traveling carriage in a return, or right-hand, direction, with the result that maintaining said Back-Space key 97 depressed and simultaneous operation of any of the typewriter keys 94 or the typewriter Space Bar 96 would cause the traveling carriage to letter-space in a return, or right-hand, direction, and thus accomplish back-spacing movement of said traveling carriage.

Release of the traveling carriage for return tabulating movement requires the rocking of an escapement control lever 341 (FIG. 5) clockwise on its pivot stud 342, secured in the machine framework, causing a bent-over left-hand portion of said lever 341, which underlies the left-hand extensions of the escapement pawls 334 and 336, to rock said pawls clockwise, against the action of their springs 338, to disengage the teeth in said pawls from the teeth of the escapement rail 339. Disengaging movement of the pawls 334 and 336, through right-hand extensions thereof which overlie corresponding left-hand extensions on the companion pawls 335 and 337, rocks said pawls counter-clockwise, out of engagement with the escapement teeth of the rail 339, to free the traveling carriage for tabulating movement in return direction.

Releasing or freeing the traveling carriage for tabulating movement in a forward, or left-hand, direction (FIG. 5) involves the rocking of a tabulating control lever 343 (FIGS. 5 and 22) counter-clockwise on its pivot stud 344, secured to a cross plate 350, in turn secured to the machine framework, causing a stud 345, in a downward extension of said lever, to engage a downward extension of an escapement control lever 346, also pivoted on the stud 344, and rocks said lever counter-clockwise. Counter-clockwise movement of the lever 346, through a right-hand extension thereof which underlies an undercut portion of the lever 341, rocks said lever clockwise, to disengage the escapement pawls 334 to 337, in the manner explained above in connection with the return control lever 341, to free the traveling carriage for tabulating movement in a forward, or left-hand, direction.

When the traveling carriage reaches the terminus of its movement while traveling in a forward, or left-hand, direction, the layer 343 is restored clockwise to free the escapement pawls 334 to 337 to the influence of their springs 338, which immediately re-engage the teeth of said escapement pawls with the teeth in the escapement rail 339, to terminate movement of the traveling carriage under influence of the fluid drive mechanism, and thus to locate said carriage in the selected columnar position. Likewise, when the traveling carriage reaches the selected columnar position while traveling in a return, or right-hand, direction, the lever 341 is restored counter-clockwise, to free the escapement pawls for engagement with the teeth in the rail 339 to locate and hold the traveling carriage in the selected columnar position, against the action of the fluid drive mechanism.

If a more complete description of the traveling carriage escapement mechanism is required, reference may be had to the Christian et al. United States Patent No. 2,626,749.

*Automatic Machine-Releasing Mechanism*

Mechanism controlled by the traveling carriage, when traveling in either forward or return directions to a predetermined columnar position, operates the machine-releasing mechanism to initiate an automatic operation of the machine.

Figures 14, 15, 16:
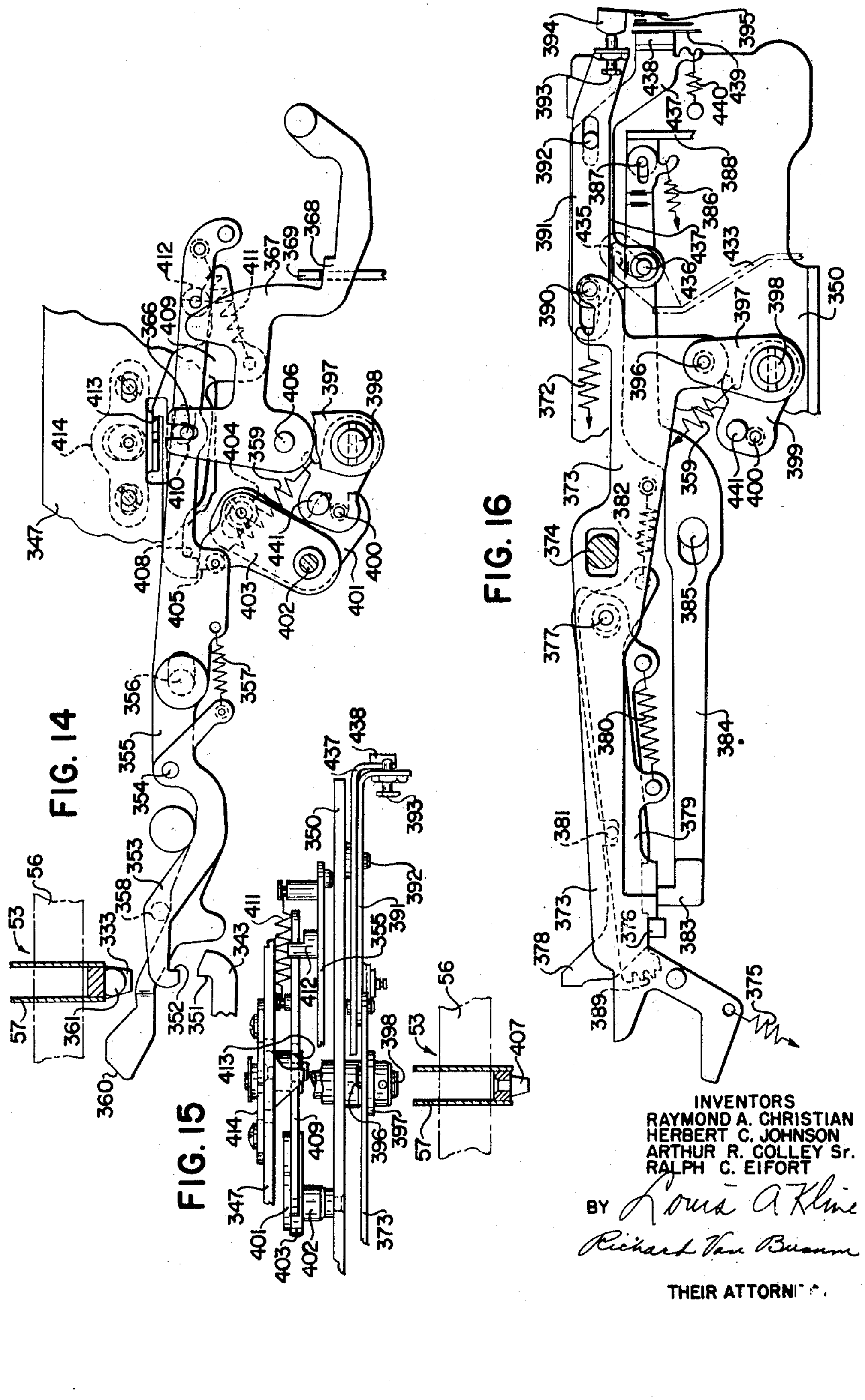
FIG. 14 is a front elevation of a portion of the mechanism operated by the traveling carriage in predetermined columnar positions for initiating automatic operation of the machine.
FIG. 15 is a fragmentary side-spacing view, as observed from above, of a portion of the mechanism shown in FIG. 14.
FIG. 16 is a front elevation of a portion of the mechanism for controlling return tabulating movement of the traveling carriage.
Figure 22:
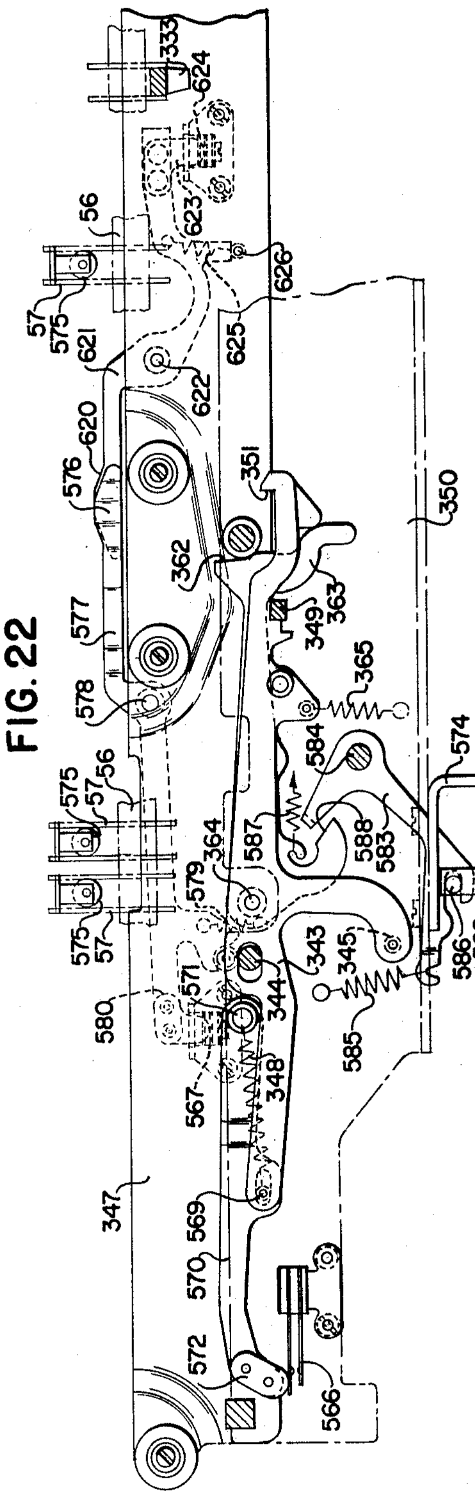
FIG. 22 is a front elevation of a portion of the forward-tabulating mechanism for the traveling carriage and the switches controlled thereby for energizing the solenoid which causes the traveling carriage to be skip-tabulated to a particular columnar position.

The mechanism whereby the traveling carriage initiates an automatic machine operation while traveling in a forward, or left-hand, direction is shown principally in FIGS. 14 and 22 and includes the tabulating control lever 343, having a slot which rotatably engages the stud 344 in the plate 350. A spring 348 urges the lever 343 toward the right (FIG. 22) to normally maintain a shoulder near its right-hand end in yielding contact with a square stud 349, secured in the plate 350, secured to the machine framework.

To initiate forward tabulating movement of the traveling carriage, the lever 343 is raised upwardly, in the known manner disclosed in the above-referred-to Christian et al. patent, until the shoulder on its right-hand end moves above the square stud 349, whereupon the spring 348 shifts said lever toward the right (FIG. 22) to move a shoulder 351, formed on its extreme right-hand end, into engaging relationship with a hook 352 (FIG. 14), formed on the left end of a lever 353, pivoted on a stud 354 in a machine-releasing lever 355, having therein a slot which pivotally engages a stud 356, secured in the plate 350 (FIG. 22).

A spring 357 (FIG. 14), tensioned between the levers 353 and 355, urges said lever 353 counter-clockwise to normally maintain a stop stud 358, secured therein, in engagement with the top surface of the lever 355. A spring 359 urges the lever 355 clockwise to normally maintain a camming projection 360, on the left-hand end thereof, in coacting relationship with a stud 361, carried by one of the program stops 57 which is mounted on the program bar 56 in a columnar position in which it is desired to have an automatic operation of the machine initiated. Arrival of the traveling carriage in the selected columnar position causes the stud 361 to engage the extension 360 and depress the lever 355 counter-clockwise (FIG. 14) to move the hook 352 into the path of the shoulder 351. The program stop 57 which carries the stud 361 likewise has thereon a forward tabulating stop lug 333, which engages an upward extension 362 (FIG. 22) on a stop arm 363, pivoted on a stud 364 in the lever 343, which extension 362 was moved into the path of said tabulating stop lug 333 upon counter-clockwise movementof said lever 343 to disengage the shoulder from the square stud 349. At approximately the same time that the stud 361 (FIG. 14) engages the extension 360, the tabulating stop lug 333 engages the extension 362 to shift the stop arm 363 and the lever 343 toward the left (FIG. 22) until the shoulder by-passes the stud 349, whereupon a spring 365, which is tensioned to urge said lever 343 clockwise, moves said shoulder into the path of the stud 349 to maintain said lever 343 in its restored, or normal, position, as shown here.

Left-hand shifting movement of the lever 343 by the tabulating stop lug causes the shoulder 351 to engage the hook 352 and shift the levers 353 and 355 also toward the left, against the action of the spring 359. Left-hand shifting movement of the lever 355 causes a stud 366, carried thereby, which engages a slot in an upward extension of a machine-release lever 367 pivoted on a stud 406 secured in the machine framework, to rock said lever 367 counter-clockwise. Counter-clockwise movement of the lever 367 causes a shoulder 368 thereon, which underlies a coacting shoulder on a machine-release hook 369 (FIG. 7), pivotally connected to the rear end of the lever 216, to lift said hook to in turn rock the lever 216 counter-clockwise, against the action of the spring 218, to initiate machine operation in the manner explained before.

Figures 7, 8, 9:
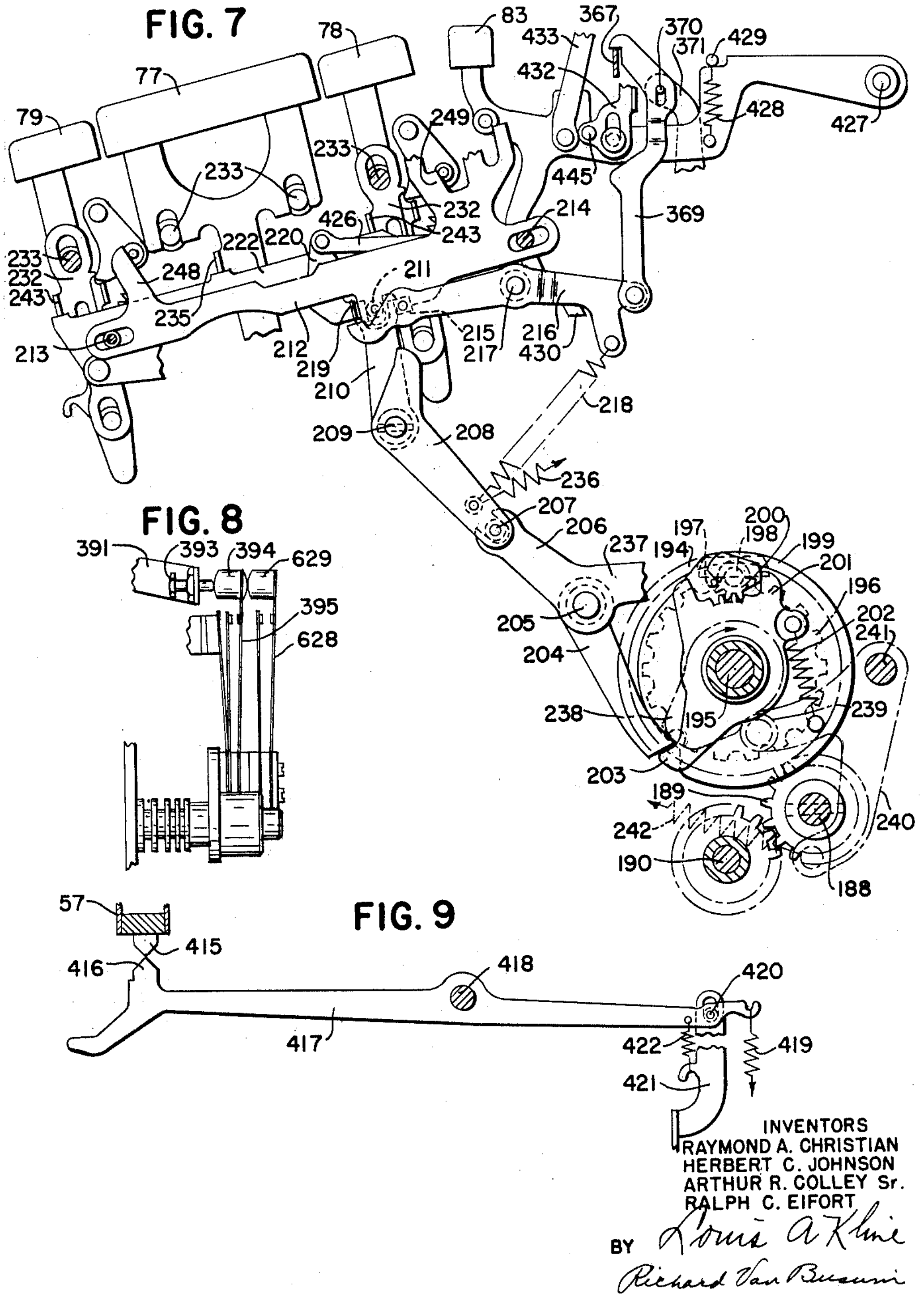
FIG. 7 is a right side elevation of the machine-releasing mechanism and the clutch device actuated thereby for connecting the operating motor to the machine-driving mechanism.
FIG. 8 is a detail view of the switch mechanism for reversing the direction of travel of the traveling carriage.
FIG. 9 is a detail view of a portion of the mechanism controlled by the traveling carriage, for preventing release of the machine for operation when said traveling carriage is out of columnar position, or "Off-Stop."

The mechanism disclosed in FIGS. 7, 14, and 22 and explained above, for initiating automatic operations of the machine under control of the traveling carriage while it is tabulating in a forward direction to predetermined columnar positions, is substantially the same as that disclosed in the Christian et al. United States Patent No. 2,626,749, to which reference may be had if a more detailed description of this mechanism is required.

The upper end of the hook 369 (FIG. 7) has a slot through which extends a stud 370 in a lever 371 (FIG. 19), said lever being connected to the Non Auto key 86 (FIG. 1), depression of which shifts said lever 371 rearwardly to rock the hook 369 clockwise to move the shoulder on its upper end out of coacting relationship with the corresponding shoulder on the lever 367, to disable the automatic releasing function, upon depression of said Non Auto key 86. Through the lever 371, the hook 369 may be operatively connected to the overdraft device 182 (FIG. 2B), whereupon the occurrence of an overdraft in any selected totalizer will cause the shoulder on the upper end of the hook to be moved out of coacting relationship with the lever 367, to disable the automatic release feature when a selected totalizer is overdrawn.

Mechanism, operating in conjunction with the return tabulating mechanism for the traveling carriage, is provided for initiating automatic operations of the machine when said carriage arrives in a preselected columnar position while moving in a return tabulating direction.

The return tabulating mechanism for the traveling carriage includes a return tabulating lever 373 (FIG. 16), having a slot which pivotally engages a stud 374, secured in the plate 350. A spring 372 urges the lever 373 toward the left and counter-clockwise and is assisted by another spring 375, connected to the left-hand end of said lever 373, to normally maintain a shoulder, formed on the left-hand end of said lever 373, in engagement with a square stud 376, secured in the plate 350. The lever 373 (FIG. 16) carries a stud 377, which pivotally supports a stop arm 378, having an upward extension arranged to coact with different-length stopping lugs 407 mounted on the program stops 57 properly spaced in selected columnar positions along the program bar 56. A spring 380, tensioned between the arm 378 and an arm 379 free on the stud 377, urges said arms toward each other to normally maintain a stud 381, carried by the arm 379, in yielding engagement with an undercut portion of the arm 378. A spring 382 urges the arms 378 and 379 counter-clockwise to normally maintain a heel, formed on said arm 379, in yielding engagement with an extension 383 of a lever 384.

The lever 384 has a slot which pivotally engages a stud 385, secured in the plate 350, and a spring 386 urges said lever toward the left and clockwise (FIG. 16) to normally maintain the right-hand end of the slot in engagement with the stud 385, and to maintain the extension 383 in yielding engagement with the heel formed on the arm 379 and a similar heel formed on the lever 373. The right-hand end of the lever 384 (FIG. 16) has a slot engaged by a stud 387 in a link 388, which link is shifted downwardly, as will be explained later, to lift the lever 384 clockwise to initiate operation of the tabulating mechanism. Clockwise movement of the lever 384 (FIG. 16), through the extension 383, rocks the lever 373 also clockwise to disengage the shoulder from the stud 376 to free said lever to the action of the spring 372, which immediately shifts said lever toward the left. At the same time, the lever 384 rocks the arms 378 and 379 clockwise the required extent to move the left-hand end of said arm 378 into the path of the desired return tabulating stop 407. After the arms 378 and 379 have been positioned, as explained above, a pawl (not shown) is engaged with teeth 389 in the left-hand end of said arm 379 to retain it and its companion arm 378 in proper elevated positions for proper coaction of the upward extension of said stop arm 378 with the desired carriage return stop 407.

A stud 390 in the right hand end of the lever 373 (FIG. 16) pivotally connects said lever to the left-hand end of a slide 391, said slide being further supported by a slot therein which engages a stud 392 secured in the plate 350. A bent-over ear on the right-hand end of the slide 391 is threaded to receive an adjusting screw 393, secured in adjusted position by a lock nut, said screw arranged to engage an insulating block 394 on one blade of a reversing switch 395, which is electrically connected to the reversing solenoid 329 (FIGS. 10 and 11) for the fluid drive mechanism for the traveling carriage. Left-hand movement of the lever 373, as explained before, to initiate return tabulating movement of the traveling carriage 53, shifts the slide 391 in unison therewith to withdraw the adjusting screw 393 from the block 394 to close the switch 395 to activate the reversing solenoid 329 to cause the fluid drive mechanism to urge the traveling carriage in a return, or right-hand, direction.

A downward extension of the lever 373 (FIGS. 14 and 16) is pivotally connected to a stud 396, secured in the upper end of a crank 397, secured on a short shaft 398, journaled in a bushing in the plate 350. Also secured on the shaft 398 is an arm 399, carrying a stud 400, which engages a slot in an extension arm 401 (FIG. 14) free on a stud 402 secured in the plate 350. The arm 401 is adjustably connected to a companion arm 403 by means of a slot therein and a screw 404, which threads into said arm 403. A projection 405, on the upper end of the arm 403, coacts with a hook 408, formed on the left-hand end of a lever 409, having a slot which pivotally engages a stud 410, fast in a cross plate 347 (FIG. 22), secured to the machine framework. A spring 411 urges the lever 409 counter-clockwise to normally maintain the end of the hook 408 in yielding engagement with the projection 405 (FIG. 14) and also to maintain a shoulder, formed on the right-hand end of the lever 409, in yielding engagement with a flatted stud 412, secured in the lever 355.

Left-hand shifting movement of the lever 373 (FIG. 16), upon release of the return tabulating mechanism by clockwise movement of the lever 384, as explained before, rocks the crank 397, the shaft 398, and the arm 399 counter-clockwise, against the action of the spring 359, causing said arm 399 in turn to rock the companion arms 401 and 403 clockwise to move the projection 405 from beneath the hook 408 and to the right of said hook, whereupon depression of the lever 355 by one of the studs 361, when the traveling carriage arrives in a preselected columnar position in which it is desired to initiate an automatic operation of the machine, moves said hook 408 into the path of said projection 405. When the traveling carriage arrives in the preselected columnar position (FIGS. 14 and 16), the return stop lug 407 (FIG. 14) engages the upper end of the arm 378 and shifts said arm, its companion arm 379, and the lever 373 toward the right until the shoulder on said lever 373 by-passes the square stud 376, whereupon the spring 375 moves said shoulder into the path of said stud 376 to retain said lever 373 and the arms 378 and 379 in restored position.

Inasmuch as the stud 361 (FIG. 14) has depressed the lever 355, the hook 408 is in the path of the projection 405 during right-hand restoring movement of the lever 373, which movement rocks the arm 403 counter-clockwise, causing said projection 405, in cooperation with said hook 408, to shift the lever 409 toward the left (FIG. 14). Left-hand movement of the lever 409 causes the shoulder on its right-hand end to engage the flat portion of the stud 412 and move the lever 355 toward the left in unison therewith. Left-hand movement of the lever 355, as explained before, rocks the lever 367 counter-clockwise to lift the hook 369 to rock the lever 216 also counter-clockwise (FIG. 7) to initiate an automatic operation of the machine, as explained before. As the levers 355 and 409 (FIG. 14) near the terminus of their left-hand movement, a shoulder 413, formed on the upper edge of said lever 409, engages a right-angle extension of a bracket 414, adjustably secured to the plate 347, to rock said lever 409 clockwise to disengage the hook 408 from the projection 405 to prevent excessive overthrow of said lever 355 and connected parts during their restoring movements. When the hook 408 (FIG. 14) is disengaged from the projection 405, as explained above, the spring 359 restores the lever 355 and connected parts toward the right to the position shown here, where said hook 408 overlies the upper end of said projection 405. When the stud 361 moves out of engagement with the camming projection 360, the lever 355 and connected parts are returned clockwise to normal position through the urgency of the spring 411.

*"Off-Stop" Locking Mechanism*

In a machine of the character disclosed in the present application, it is desirable that the machine-releasing mechanism be locked against operation by the release bars 77, 78, and 79 when the traveling carriage is "off stop," or out of columnar position, and, to this end, each of the program stops 57 (FIG. 9) is provided with a camming lug 415, which coacts with a similar angular camming projection 416 on a lever 417 pivotally supported on a stud 418, secured in the plate 350 (FIG. 16). The lever 417 carries, in its right-hand end, a stud 420, which engages a slot in the upper end of a link 421, the lower end of which has an enlarged portion with a slot therein which engages the stud 226 (FIG. 4) to support said link for up-and-down shifting movement. A surface formed on a downward extension of the link 421 cooperates with a stud 423 in one arm of a bell crank 424, pivoted on a stud 425, secured in the right frame 50. The other arm of the bell crank 424 is pivotally connected by a link 426 to the release-lever-operating arm 220. A spring 422 (FIG. 9) forms a yieldable connection between the lever 417 and the link 421, so that under certain conditions said link can be shifted downwardly independently of said link, as will be explained presently.

When the travelling carriage is properly located in a columnar position, the lug 415 (FIG. 9) engages the projection 416 and rocks the lever 417 counter-clockwise, against the action of a spring 419, to lift the link 421. Lifting the link 421 withdraws the downward surface on said link from the stud 423 to permit the spring 228 (FIGS. 4 and 7) to maintain the latch-operating arm 220 in effective position, as shown here, where it is in the path of the left-hand end of the lever 216, so that downward movement of said arm and the bar 222, upon operation of one of the starting bars 77, 78, or 79, will engage the clutch mechanism, to initiate an operation of the machine. When the traveling carriage is "off stop," or out of columnar position, the lug 415 is out of alignment with the projection 416, permitting the spring 419 to rock the lever 417 clockwise to shift the link 421 downwardly to rock the bell crank 424 (FIG. 4) clockwise and, through the link 426, the release-lever-operating arm 220 also clockwise, to move the ear 219 out of the path of the left-hand extension of the lever 216 (FIG. 7), so that downward movement of the bar 222 and the arm 220, upon depression of one of the motor bars, will not operate the release lever 216 and thus prevent operation of the machine when the traveling carriage is not properly located in columnar position.

The Carriage Release key 83 (FIGS. 4 and 7) perform several functions, and partial depression of said key disengages the escapement mechanism to permit the traveling carriage to tabulate in a forward, or left-hand, direction, and full or complete depression of said key closes the switch for the carriage-reversing solenoid to cause the direction of the movement of the traveling carriage to be reversed, so that said carriage will be returned in a return direction. Likewise, depression of the Carriage Release key 83 disables the release mechanism, so that machine operation may not be initiated while said key is depressed by operation of any one of the starting bars 77, 78, or 79.

Figures 5, 6:
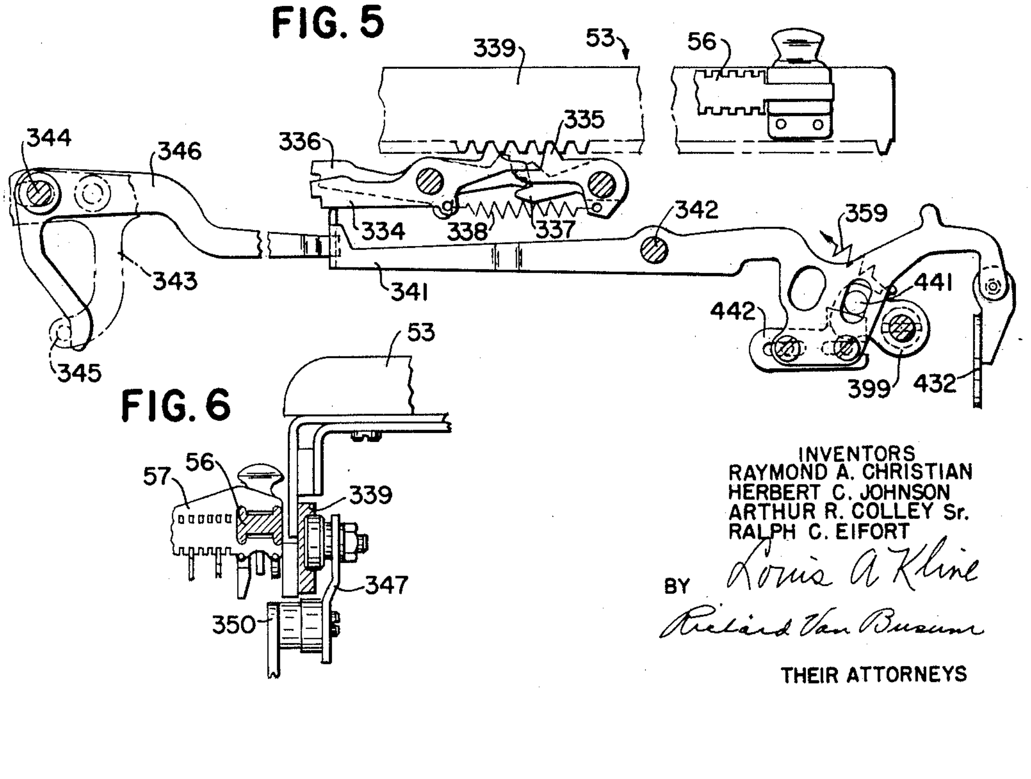
FIG. 5 is a fragmentary front view of a portion of the traveling carriage escapement mechanism and a portion of the means for disengaging said escapement mechanism.
FIG. 6 is a right elevation of a fragmentary portion of the traveling carriage, showing in particular the program stop bar and the manner in which the program stops are arranged thereon.

The Carriage Release key 83 is in the form of a lever which is pivotally supported on a stud 427, secured in the right frame 50. A spring 428, tensioned between a stud in the Carriage Release key lever and a stop stud 429, secured in the frame 50, urges said key lever clockwise to normally maintain an undercut portion of its upper surface in yielding engagement with said stop stud 429. Depression of the key 83 causes a downward extension 430 thereof, in cooperation with the stud 423 (FIGS. 4 and 7), to rock the bell crank 424, the link 426, and the arm 220 clockwise, to render the releasing mechanism ineffective upon operation of any one of the motor bars 77, 78, or 79. The Carriage Release key 83 (FIG. 4) carries a stud 431, which engages a slot in the lower end of a link 432, the upper end of which is pivotally connected to a right-hand extension of the escapement release lever 341 (FIG. 5), whereby depression of said Carriage Release key 81, through the link 432, rocks the lever 341 clockwise to release the escapement pawls 334 to 337 to free the traveling carriage 53 for tabulating movement. Inasmuch as the traveling carriage is normally urged to the left, or in a forward tabulating direction, by the fluid drive mechanism, release of the escapement pawls, as explained above, by depression of the Carriage Release key 83, frees said carriage for such movement as long as said key is retained depressed. Removal of pressure from the Carriage Release key 83 permits the spring 428 to return said key upwardly to undepressed position, which simultaneously, through the link 432, restores the lever 341 counter-clockwise to ineffective, or normal, position, as shown in FIG. 5, whereupon the escapement pawls again become effective to engage the teeth of the escapement rail 339 to terminate forward tabulating movement of the traveling carriage.

In addition to releasing the escapement mechanism, as explained above, full depression of the Carriage Release key 83 closes the switch for the traveling carriage reversing solenoid to cause the direction of travel of the carriage to be reversed, so that it is moved in a return, or right-hand, direction.

The Carriage Release key 83 (FIG. 4) carries a stud 434, to which is pivotally connected the lower end of a pitman 433, a bent-over upward extension of which has a cam slot 435 (FIG. 16) engaged by a stud 436 in a downward extension of a slide 437 mounted for horizontal shifting movement by slots therein which engage the studs 390 and 392. A bent-over right-hand portion of the slide 437 has secured thereto a block of insulating material 438, which is engaged by a spring blade 439 of the switch 395. A spring 440 urges the slide 437 toward the left (FIG. 16) to normally maintain the carriage-reversing switch 395 open, as shown here.

Full depression of the Carriage Release key 83 (FIG. 4) shifts the pitman 433 downwardly, causing the cam slot 435, coacting with the stud 436, to shift the slide 437 toward the right, against the action of the spring 440, to cause the spring blade 439 to engage and close the switch 395 to energize the reversing solenoid 329 (FIGS.

10 and 11) to cause the direction of travel of the traveling carriage to be changed from forward to reverse tabulating movement. Removal of full pressure from the Carriage Release key 83 permits the pitman 433 to be restored upwardly, which in turn permits the spring 440 to restore the slide 437 toward the left to open the switch 395 to de-energize the carriage-reversing solenoid to again cause the fluid drive mechanism to urge the traveling carriage in a forward tabulating direction. Removal of all pressure from the Carriage Release key permits the escapement pawls to again engage the teeth in the lower edge of the escapement rail to terminate movement of the traveling carriage, as explained in connection with the forward tabulating movement thereof.

The arm 399 (FIGS. 5 and 16), which is operated by the lever 373, carries a stud 441, which extends through a slot in the lever 341 (FIG. 5) and coacts with an angular surface formed on an upward extension of a plate 442, adjustably connected to said lever 341 by means of horizontal slots therein in cooperation with screws threaded into said lever.

As explained before, to initiate normal reverse tabulating movement of the traveling carriage, the lever 384 (FIG. 16) is rocked clockwise by the link 388, to free the lever 373 to the action of the spring 372, which shifts said lever toward the left to rock the arm 399 counter-clockwise, thus causing the stud 441, in cooperation with the plate 442 (FIG. 5), to rock the escapement release lever 341 also clockwise to disengage the escapement pawls 334 to 337 from the escapement rail 339, to free the traveling carriage for tabulating movement. Termination of reverse tabulating movement of the traveling carriage, as explained before, by engagement of the tabulating stop 407 (FIG. 16) with the upper extension of the arm 378, restores the lever 373 toward the right, to normal position, to return the arm 399 and the stud 441 clockwise to normal position, which in turn permits the lever 341 to be restored counter-clockwise to normal position. This frees the escapement pawls for engagement with the escapement rail 339 to terminate tabulating movement of the traveling carriage and to hold said carriage in selected columnar position.

Clockwise movement of the escapement lever 341 (FIGS. 5 and 16) by the levers 343 and 346 in forward tabulating operations, and by the lever 384, the arm 399, and the stud 441 in return tabulating operations, to release the escapement pawls 334 to 337 prior to tabulating movement of the traveling carriage, causes said lever 341 to shift the link 432 downwardly. Downward movement of the link 432 causes a stud 445 therein (FIG. 4) to engage a rearward extension 446, formed on the link 421, and shift said link also downwardly, to rock the bell crank 424, the link 426, and the arm 220 clockwise. This moves the ear 219 on the arm 220 out of engaging relationship with the forward end of the lever 216 (FIG. 7) to disable operation of the machine-releasing mechanism by the release bars 77, 78, and 79 during tabulating movement of the traveling carriage, in either forward or return directions.

*Disabling of Automatic Machine Release*

Mechanism controlled by the typewriter forward Tabulating key 103 (FIG. 1) and by the Return Tabulating keys 98, 99, and 100 is provided for disabling automatic release of the machine for operation by means of the traveling carriage in preselected columnar positions.

The typewriter forward Tabulating key 103 coacts with the corresponding type-operating cam, similar to the cam 109 (FIGS. 2A and 17), which cam is in turn connected to its corresponding hanger 110, which has pivotally connected to its lower end the forward end of a link 447 (FIG. 17) having in its rear end a slot which engages a stud 448 in the downward end of a crank 449 secured on a shaft 450 journaled in brackets (not shown) secured to the lower surface of the machine base 51. Also secured on the shaft 450 is an arm 451, having pivotally connected thereto the lower end of a link 452 (FIGS. 17, 19, and 20), the upper end of which carries a stud 453, which engages a slot in the lower end of a pitman 454, in turn slotted at its upper end to receive a stud 443 in a latch plate 455 free on a stud 456 secured in the machine framework.

Depression of the typewriter Tabulating key 103 frees the corresponding cam 109 (FIG. 17) for engagement with the operating roller 108, which, in the usual manner, rocks the corresponding hanger 110 clockwise, against the action of its spring 160, to shift the link 447 forwardly to rock the crank 449, the shaft 450, and the arm 451 clockwise. Clockwise movement of the arm 451 shifts the link 452 and the pitman 454 downwardly in unison, to rock the latch plate 455 counter-clockwise. Counter-clockwise movement of the latch plate 455 (FIGS. 19 and 20), through the medium of a finger 457 formed thereon, in cooperation with a stud 458 in a downward extension of the lever 371, shifts said lever toward the right, or rearwardly, which, through the stud 370, rocks the hook 369 clockwise to move its upper end out of coacting relationship with the shoulder 386 (see also FIGS. 7 and 14) on the lever 367 to prevent operation of the automatic machine-releasing mechanism by the traveling carriage in preselected columnar positions thereof.

During counter-clockwise movement of the latch plate 455 to disable the machine release hook 369, as explained above, a shoulder 459 (FIG. 19), formed on said plate, by-passes a coacting shoulder 460 on a latch 461 pivotally supported on a stud 462 secured in the machine framework. A spring 463, tensioned between said latch 461 and the plate 455, causes the shoulder 460 to latch over the shoulder 459 to retain the plate 455 and the hook 369 in their ineffective positions until the racks 260 and the printing sectors 275 (FIGS. 2A and 2B) have been positioned, whereupon a stud 464 (FIG. 19) in a printer-operating arm 465 engages a tail 466, extending from said latch 461, to rock said latch counter-clockwise, against the action of the spring 463, to disengage the shoulder 460 from the shoulder 459, to free the plate 455 and connected parts for restoring movement to normal positions.

Depression of the typewriter Return key 98 (FIG. 1) frees the corresponding cam 109 (FIG. 17) for engagement with the operating roller 108, to rock the corresponding hanger 110 counter-clockwise, against the action of its spring 160. Counter-clockwise movement of the hanger 110 causes a roller 467, mounted on a downward extension thereof, to engage an operating surface on a plate 468 adjustably mounted on an arm 469 secured on a shaft 470 journaled in brackets extending downwardly from the base 51, to rock said parts and a crank 480, secured on said shaft 470, counter-clockwise. Counter-clockwise movement of the crank 480 (FIG. 17), through the medium of a stud carried thereby, in cooperation with a slot in a downward extension of an arm 481, pivoted on a stud in the machine framework, rocks said arm 481 clockwise, whereupon a rearward extension of said arm 481 (FIG. 13), in cooperation with an ear 482 formed on the downward end of the link 388, shifts said link downwardly to initiate return tabulating movement of the traveling carriage, as explained in connection with FIG. 16.

Also secured on the shaft 470 (FIG. 17) is a crank 471, pivotally connected by a link 472 to an arm 473 free on a shaft 474, journaled in brackets extending downwardly from the base plate 51. Counter-clockwise movement of the shaft 470 and the crank 471 rocks, through the link 472, the arm 473 also counter-clockwise causing a roller 475, carried thereby, to engage a downward extension of an arm 476 and rock said arm clockwise. The arm 476 is connected in fixed relationship to a companion arm 477 (FIG. 19) by a hub 483 free on the shaft 450. The arm 477 (FIGS. 17, 19, and 20)

has pivotally connected thereto the downward end of a link 478, the upper end of which carries a stud 479, which engages a slot in the pitman 454, whereby clockwise movement of the arms 476 and 477 shifts said link 478 and said pitman 454 downwardly to rock the latch plate 455 counter-clockwise, to shift the hook 369 out of coacting relationship with the shoulder 368 formed on the lever 367, to prevent automatic operation of the machine under control of the traveling carriage during the time that said traveling carriage is return-tabulating from one columnar position to another.

As previously explained in connection with FIG. 16, the return-tabulating stop lugs 407 are of several different lengths, and the adjustable connection between the plate 468 and the arm 469 (FIG. 17) provides means for controlling the extent of clockwise movement of the lever 384 and the tabulating stop arm 378, to adjust said stop arm in relation to the desired length of the stop lug 407.

The Return keys 99 and 100 (FIG. 1) control the operation of mechanism similar to that described for the Return key 98, to cause the traveling carriage to be returned to preselected columnar position and to cause the automatic machine-releasing function controlled by the traveling carriage in preselected columnar positions to be rendered inoperative while the traveling carriage is tabulating in a return direction from one columnar position to another.

The forward tabulating link 452 (FIGS. 12 and 17) carries, near its upper end, a stud 485, which engages a slot in the lower end of a plate 486, connected to the lower end of a rod 487, the upper end of which rod is pivotally connected to the right-hand end of a typewriter tabulating control lever 488, which is the equivalent of the lever 1502 disclosed in FIGS. 89 and 121 of the Christian et al. United States Patent No. 2,626,749, which controls the adjustment of the typewriter tabulating stop arm 1514 in relation to typewriter tabulating stops 1518 located in preselected columnar positions on the stop bar 1375 of the traveling carriage of said Christian et al. patent.

Clockwise movement of the arm 451, upon depression of the typewriter forward Tabulating key 103 (FIG. 1) and downward movement of the link 452, carries the plate 486 and the rod 487 downwardly in unison therewith, to rock the lever 488, to disengage the carriage escapement mechanism, in the well-known manner, and to move the typewriter tabulating stop arm into the path of the typewriter tabulating stops in exactly the same manner as explained in connection with FIGS. 89 and 121 of said Christian et al. United States Patent No. 2,626,749.

*Tabulating Mechanism*

In order to expand the forward tabulating function of the traveling carriage of the machine disclosed herein, the above typewriter tabulating mechanism was reconstructed to provide for automatic operation of said mechanism under control of the traveling carriage in preselected columnar positions thereof. This mechanism is illustrated best in FIG. 12 and will now be described.

The plate 486 (FIGS. 12 and 13) has a slot engaged by a stud 489 in the forward arm of a bell crank 490 pivoted on a stud 491 secured in the machine framework, said bell crank having a clearance slot for the stud 453 in the link 452. A downward arm of the bell crank 490 is pivotally connected by a link 493 to the downward arm of a sensing lever 494 pivoted on a stud 495 secured in the machine framework. The lever 494 has a forwardly-extending arm with a downwardly-extending sensing finger 497, which senses a control surface 498 on the upper edge of a control slide 499, mounted for angular shifting movement by means of slots therein in cooperation with stationary studs. A notch formed in the upper edge of the slide 499 is engaged by a downwardly-extending finger of an arm 500, pivoted on a stationary stud 501 and pivotally connected by a link 502 to the right-hand arm of a lever 503 (FIG. 12), pivoted on a stud 504, secured in the machine framework. A left-hand arm of the lever 503 is pivotally connected to a sensing plunger 505, having an upward extension which senses a control surface formed on a control plate 506 mounted in program control stops 57 located in preselected columnar positions upon the stop bar 56 (FIG. 2A). Springs 507 and 508 urge the bell crank 490 and the lever 494 clockwise to normally maintain a shoulder, formed on the downward end of said lever 494, in yielding engagement with a stud 509, carried by an operating lever 510, arranged to oscillate first clockwise or toward the right (FIG. 12) and then back to normal position, to free the lever 494 to the action of the springs 507 and 508, which causes the finger 497 of said lever to engage the control surface 498 and position said lever and the bell crank 490 accordingly.

When an A length control plate 506 is in position to be sensed by the plunger 505, as shown here, it permits said plunger to move upwardly until it strikes said plate, to rock the lever 503 and, through the link 502, the arm 500 clockwise, to shift the slide 499 toward the left, to locate the undercut portion of the control surface 498 in alignment with the finger 497. After the slide 499 has been positioned by the control plate 506, as explained above, retaining teeth, formed on its upper edge, are engaged by the teeth of a retaining pawl 511, pivoted on a fixed stud 512, to retain said slide in set position during machine operation. The pawl 511 is operated through the medium of a downward extension thereof, which coacts with a stud 514 and a lever 515 pivoted on a stationary stud 516, and pivotally connected by a link 517 (FIGS. 12 and 13) to a cam lever 518, which, like the lever 510, oscillates first clockwise and then back to normal position. Initial movement clockwise of the lever 518, through the link 517, rocks the lever 515 counter-clockwise, causing the stud 514, in cooperation with the extension 513, to rock the pawl 511 clockwise to engage said pawl with the proper one of the teeth in the upper edge of the slide 499 to retain said slide in set position for the length of time required for the mechanism to function properly. After the slide 499 has been positioned, under control of an A length control plate 506, the sensing lever 494 and the bell crank 490 are operated, by the associated cam lever 510, in a counter-clockwise direction under influence of the springs 507 and 508, as the finger 497 moves into the undercut portion of the control surface 498 on said slide 499. Counter-clockwise movement of the bell crank 490 causes the stud 489 therein to shift the plate 486 and the rod 487 downward to rock the lever 488, to free the traveling carriage for automatic forward tabulating movement to a preselected columnar position, which is determined by the location of typewriter tabulating stops (not shown) on the program stop bar 56.

There are four lengths of control plates 506; namely, the shortest length, which is non-add, or NA; the next shortest length, which is add, or A; the second shortest length, which is subtract, or S; and the longest, which is total, or T (FIG. 12). When other than an add, or A, length control plate 506 is located in position to coact with the plunger 505, said plunger positions the slide 499 so that a high portion of the control surface 498 is opposite the finger 497. Consequently, counter-clockwise movement of the lever 494 and the bell crank 490 is obstructed, and in this case the typewriter tabulating mechanism does not function.

After the sensing lever 494 has properly controlled the automatic tabulation of the traveling carriage, and near the end of machine operation, return movement counter-clockwise of the lever 510 (FIG. 12) restores said lever 494 and the bell crank 490 clockwise to normal position, as shown here, where the end of the finger 497 is slightly above the high portion of the control surface 498. After the lever 494 has been restored to normal position, the lever 518 (FIGS. 12 and 13) is restored counter-clockwise to normal position and, through the link 517, restores the lever 515 clockwise, to withdraw the stud 514 from the extension 513 of the pawl 511, to permit the tooth of said pawl to move out of engagement with the retaining teeth in the upper edge of the slide 499, to free said slide and connected parts for return movements to normal position upon downward restoration of the plunger 505 to normal position, as fully explained in the Christian et al. United States Patent No. 2,626,749.

*Carriage-Controlled Tabulation*

Mechanism controlled by the traveling carriage, when in a preselected columnar position, is provided for causing said traveling carriage to automatically return tabulate from said position to another predetermined columnar position, in this case referred to as a No. 2 return stop position.

Located on the program stop bar 56 (FIGS. 2A, 13, and 29) in the particular columnar position in which it is desired to have the traveling carriage start its automatic return tabulating movement is a program stop block 57, having therein one of the A length control plates 506, having a downward control projection which coacts with the upper end of a sensing plunger 520, mounted to shift vertically in the machine framework. Pivotally connected to the plunger 520 is the left-hand end of a lever 521, pivotally supported on a stud 522, secured in the plate 350, on which stud 522 is also pivoted the left-hand end of a companion lever 523. Downward extensions of the levers 521 and 523 have tensioned therebetween a spring 524, which urges said levers clockwise and counter-clockwise, respectively, to normally maintain the downward extension of said lever 521 in yielding contact with a stud 525, secured in said lever 523. The right-hand end of the lever 523 carries a stud 526, to which is pivotally connected a bent-over upper portion of a link 527, the lower end being enlarged to include a vertical slot which slidably engages a stud 528 (FIG. 13) secured in the machine framework. The inward or right-hand portion of the enlarged lower end of the link 527 has a V-shaped notch 529 arranged to be engaged by a tooth 530 formed on a pawl 531 pivoted on a stud 532 secured in the machine framework. A rearward extension of the pawl 531 has a rounded nose 533, which engages a slot formed in a forward arm of a bell crank 534 pivoted on a stud 535 secured in the machine framework. Pivotally connected to an upward arm of the bell crank 534 is the forward end of a pitman 536, having, in its right-hand, or rearward, end, an irregularly-shaped opening 537, through which extends a stud 538 in a lever 539, the upper end of which is pivotally supported on the stud 495 and the lower end of which lever 539 has a slot which engages a stud 519 in the upper end of the cam lever 518. A spring 540, tensioned between the pitman 536 and the stud 538, urges said pitman rearwardly to normally maintain a narrow forward portion of the opening 537 in engagement with the stud 538, as shown here.

If, during a machine operation, one of the control plates 506 (FIGS. 13 and 29) is located in proper position to be sensed by the plunger 520, such sensing movement of said plunger will cause said plunger, the levers 521 and 523, and the link 527 to be positioned accordingly, to align the notch 529 with the tooth 530 of the pawl 531. Subsequent initial movement counter-clockwise of the lever 539, through the spring 540 and the pitman 536, rocks the bell crank 534 also clockwise, causing said bell crank in turn to rock the pawl 531 counter-clockwise to engage the tooth 530 with the notch 529 to move an upward stop projection 541 on said pawl directly beneath and into the path of a square stud 542 secured in the return tabulating control link 388. Subsequent downward movement of the link 388 (FIGS. 13 and 16) to initate return tabulating movement of the traveling carriage, as explained previously, causes the square stud 542 to engage the stop projection 541, to adjust the stop projection of the stop arm 378 (FIG. 16) at the proper height to be in the path of a #2 stop 407, and to simultaneously disengage the escapement mechanism to free the traveling carriage for return tabulating movement, as explained before. Engagement of the No. 2 stop 407 (FIG. 16) with the stop projection on the stop arm 378 terminates return movement of the traveling carriage and locates it in a preselected columnar position, corresponding to the position of said No. 2 stop.

It should be remembered that downward movement of the link 388 and consequent clockwise movement of the lever 384, in addition to moving the stop arm 378 into the path of the No. 2 stop, as explained above, also frees the lever 373 for left-hand movement to close the switch 395 to activate the carriage-reversing solenoid 329 (FIGS. 10 and 11) to cause the traveling carriage to be driven in a return tabulating direction, in the manner explained earlier herein.

The link 388 (FIGS. 13 and 16) is moved downwardly, to engage the stud 542 with the stop projection 541 of the pawl 531, by a sensing lever 543, pivotally mounted on the stud 495 and having in a forward extension thereof a stud 544, which coacts with a rearward extension 545 of said link 388. A spring 546 urges the lever 543 counter-clockwise (FIG. 13) to normally maintain a shoulder, formed on a downward extension thereof, in yielding engagement with the stud 509 in the upper end of the cam lever 510. Initial movement clockwise of the lever 510 (FIGS. 12 and 13) withdraws the stud 509 from the shoulder formed on the downward extension of the lever 543, to free said lever to the action of the spring 546, which carries said lever counter-clockwise, causing the stud 544 to engage the extension 545 and carry the link 388 downwardly in unison therewith, against the action of a spring 547, tensioned between the stud 542 and a stationary stud (not shown), until such downward movement of the link 388 is terminated, in the manner explained above, by the stud 542 coming into contact with the projection 541 of the pawl 531.

A hook-shaped nose, formed on the forward end of the lever 543 (FIG. 13), is arranged to coact with a series of graduated steps formed on the rear end of a control slide 548, which slide may be positioned in various ways—for example, under control of the motor bars 77, 78, or 79 or the traveling carriage 53 (FIGS. 1 and 2A)—to align the selected one of said graduated steps with said nose on the lever 543, to control the return tabulating movement of the traveling carriage, in the manner fully explained in the Christian et al. United States Patent No. 2,626,749.

It is to be understood that the extent of downward movement of the link 388, under influence of the sensing lever 543 (FIG. 13), in cooperation with the graduated steps on the slide 548, or by the stud 542 in cooperation with the projection 541, determines the extent of clockwise movement of the lever 384 (FIG. 16) and consequently the extent of upward movement of the return stop arm 378 in relation to the return stops 407, and thus determines which length of said stop 407 will coact with said arm 378 to control the columnar positioning of the traveling carriage during its return movement. After return tabulating movement of the traveling carriage has been completed, return movement counter-clockwise of the lever 510 (FIGS. 12 and 13) restores the sensing lever 543 clockwise to normal position, thus permitting the link 388 and connected mechanism to be spring-restored upwardly to normal positions, as shown here.

To select and condition the traveling carriage for return tabulating movement to a columnar position controlled by a No. 1 return stop requires full downward movement of the link 388 (FIGS. 13 and 16) in order to elevate the return stop arm 378 into the path of said No. 1 return stop. As the result of the existence of a close timing condition between the links 388 and 527 (FIG. 13) in their vertical shifting movement to control the automatic return feature of the traveling carriage, there was a possibility that the tooth of the pawl 531 might engage the notch 529 and position the projection 541 in the path of the stud 542 before said link 388 had completed its downward movement to its lowermost position.

The link 527 (FIG. 13) completes its downward movement and starts its return movement upward at about the same time that the link 388 starts its downward movement. If in this case a NA control plate 506 (FIG. 29) were in position to coact with the plunger 520, the link 527 would move to its lowermost position, where the notch 529 would be beneath the tooth of the pawl 531. Operation of the pitman 536 by the lever 539 would cause the tooth of the pawl 531 to yieldingly engage the surface of the link 527 above the notch 529, and return movement upwardly of said link 527 would permit the tooth of the pawl 531 to enter the notch 529 and move the projection 541 into the path of the stud 542 in time to position the link 388 and the stop arm 378, as explained before, so that said stop arm would be positioned to coact with a No. 2 return stop 407 instead of a No. 1 return stop, thus resulting in return of the traveling carriage to the wrong columnar position.

However, this condition has been remedied by the provision of means to retain the pawl 531 against movement into the notch 529 while the link 527 is being restored upwardly and the link 388 is moving downwardly.

When the link 527 is positioned as explained above, with the notch 529 beneath the tooth 530 of the pawl 531, counter-clockwise movement of said pawl, under influence of the lever 539 and the cam lever 510 (FIG. 13), causes the tooth of said pawl to come into yielding engagement with the surface above said notch 529. This terminates movement of the pawl 531, the bell crank 534, and the pitman 536; however, the levers 539 and 510 continue their movement, tensioning the spring 540 and simultaneously moving the stud 538 out of the narrow forward portion of the opening 537 and into the enlarged rear portion of said opening, whereupon the spring 540 shifts said pitman 536 upwardly, or counter-clockwise, to engage a shoulder, formed in said opening, with the stud 538, thus having the effect of lengthening the pitman 536, so that it will hold the tooth 530 of the pawl 531 out of the notch 529 when the link 527 is restored upwardly and thus prevent improper return tabulating movement of the traveling carriage under this condition. Restoring movement clockwise of the lever 539 (FIG. 13), through the pitman 536 and the bell crank 534, rocks the pawl 531 also clockwise until said pawl engages a stop stud 549, secured in the machine framework. This terminates movement of the pawl 531 and the pitman 536, whereupon the stud 538 cams said pitman downwardly, or clockwise, against the action of the spring 540, until said stud 538 comes to rest in the narrow forward portion of the pitman 536, as shown here.

*Total-Controlled Tabulation*

The present machine is provided with what is termed total-controlled tabulation, often referred to as TCT, to control the automatic forward tabulation of the traveling carriage to a preselected columnar position under control of a particular totalizer when it is in a certain algebraic condition. Selective means is provided for determining whether the plus or minus algebraic condition of the totalizer will render the tabulating mechanism effective to forward-tabulate the traveling carriage to a preselected columnar position.

In the present embodiment, the A totalizer 174 (FIG. 2B) is associated with the total-controlled tabulating, or TCT, mechanism, and this totalizer has an overdraft shaft 552 (FIG. 25) having secured thereon a stop arm 553, to which is pivotally connected one end of a link 554, the other end of which link is slotted to receive a stud 555 in an operating slide 556 mounted for horizontal shifting movement by means of slots therein in cooperation with studs 557 (only one shown) secured in the totalizer framework. The slide 556 carries a stud 559, which coacts with a rounded cam surface on the bottom edge of a switch-operating arm 558 free on the stud 557, said arm having a rounded upper extension which coacts with a long central switch blade 560 secured between companion upper and lower blades 561 and 562 mounted on a bracket 563 secured to the totalizer framework. During the period of 30 to 60 degrees of machine operation, the slide 556 is shifted toward the right (FIG. 25), against the tension of a spring 564, and, through the link 554 and the stop arm 553, rocks the overdraft shaft 552 clockwise, against the action of a spring 565, to move a blocking surface, formed on the periphery of said stop arm 553, into the path of the stud 555.

Initial movement of the slide 556 toward the right causes the stud 559, in cooperation with the rounded surface on the bottom of the arm 558, to rock said arm clockwise, causing the extension on its upper surface to engage the long central blade 560 and move it upwardly out of contact with the lower blade 562 and into contact with the upper blade 561. The slide 556 dwells in its right-hand position from 60 to 290 degrees of machine operation, during which time the A totalizer 174 is actuated, and if during this actuation said totalizer remains in a plus condition (not overdrawn), return movement toward the left of the slide 556 by the spring 564, during 290 to 299 degrees of machine operation, permits the arm 553 and the shaft 552 to be restored counter-clockwise to normal position by the spring 565. This withdraws the stud 559 from the arm 558, to permit said arm to return counter-clockwise to normal position to free the central blade 560, which springs down into contact with the lower blade 562, to assist in completing a circuit which is indicative of the plus condition of the A totalizer.

If during the time that the slide 556 (FIG. 25) dwells in its right-hand position and the stop arm 553, the overdraft shaft 552, and the switch-operating arm 558 remain operated, as explained above, the A totalizer, while being actuated, changes from a plus condition to a minus, or overdrawn, condition, an overdraft cam (not shown), associated therewith, will be actuated one step to place a high portion of its periphery in the path of an overdraft sensing pawl (not shown), secured on the overdraft shaft 552, and thus obstruct return movement counter-clockwise of said overdraft shaft and said arm 553. This obstruction of counter-clockwise return movement of the stop arm 553 returns the stop surface on the periphery thereof in the path of the stud 555 to block the return movement of the slide 556 under influence of its spring 564, and, as a result, the stud 559 retains the switch-operating arm 558 in its clockwise operated condition to maintain the central blade 560 in contact with the upper or minus blade 561, to assist in completing a circuit indicative of the minus or overdrawn condition of the A totalizer. The parts described above remain in their overdraft positions until the A totalizer 174 changes from a minus condition to a plus condition, upon which occurrence a low portion of the overdraft cam is moved opposite the sensing pawl on the overdraft shaft 552, thus permitting said pawl, the shaft 552, and the arm 553 to return counter-clockwise, as the slide 556 returns toward the left, during the latter part of machine operation. This withdraws the stud 559 from the arm 553 to permit said arm to be restored counter-clockwise, thus freeing the blade 560 for return into contact with the plus blade 562, to complete a circuit which is indicative of a plus condition of the A totalizer 174.

The switch 560 (FIG. 25) is connected in series with the switch 104 (FIG. 1), which is positionable to determine whether a plus condition or a minus condition of the balance totalizer will be effective to control automatic forward tabulation of the traveling carriage, and is also connected in series with a switch 566 (FIG. 22), which is actuated by the forward tabulating mechanism, and a switch 567, which is actuated by the traveling carriage in preselected columnar positions. In addition to the above switches, the TCT mechanism, in some cases, includes a switch (not shown) connected in series with said above switches and operated by the main cam line to prevent operation of the TCT mechanism during a certain phase of machine operation.

The switch 566 (FIG. 22) is normally open; however, when the traveling carriage is released for forward tabulation by upward or counter-clockwise movement of the lever 343, as explained earlier herein, a stud 569 in the left-hand extension of said lever 343, in cooperation with a slot in an arm 570 free on a stud 571 secured in the plate 347, rocks said arm counter-clockwise, causing a block 572 of insulating material, secured to the bent-down left-hand end of said arm 570, to engage the upper blade of the switch 566 and move said blade downwardly into contact with the lower blade of said switch to assist in completing a circuit to a tabulating stop arm control solenoid 573 (FIG. 22) mounted on a bracket 574 secured to the plate 350. The tabulating stop arm 363 moves upwardly, or counter-clockwise, in unison with the lever 343 into the path of the selected one of the forward tabulating stops mounted on the stop bar 56. Counter-clockwise movement of the lever 343 disengages the escapement mechanism and thus frees the traveling carriage for tabulating movement in a forward, or left-hand, direction (FIG. 22). During forward tabulating movement of the traveling carriage, a roller 575, carried by one of the program blocks 57 located in a particular columnar position on the program bar 56, moves onto a camming extension 576 formed on a lever 577 pivoted on a stud 578 in the plate 347, and rocks said lever clockwise, against the tension of a spring 579. Clockwise movement of the lever 577 withdraws the heel of an insulating block 580, secured on its left-hand end, from the lower blade of the switch 567 to permit said blade to contact the upper blade to assist in completing a circuit to the solenoid 573.

The rotary switch 104, which controls the total control tabulating, or TCT, mechanism, is shown in "Off" position in FIG. 1, in which position the circuit through the switch 560 is broken, and consequently said solenoid 573 cannot be energized during this time. Moving the switch 104 to plus (+) position completes a circuit through the blades 560 and 562 (FIG. 25), so that a plus condition in the A totalizer 174 will cause the solenoid 573 to be energized. Turning the switch 104 to minus (—) position completes a circuit through the blades 560 and 561 (FIG. 25), so that a minus, or overdrawn, condition of the A totalizer 174 will become effective upon operation of the arm 558 to assist in completing the circuit to the solenoid 573.

If the conditions which cause all the switches connected with the TCT mechanism to be closed have been fulfilled, as explained above, the solenoid 573 (FIG. 22) will be activated to pull its armature 582 downwardly, causing a stud 586 in its upper end, in cooperation with a slot in a downward extension of a lever 583 pivoted on a stud 584 in the plate 350, to rock said lever counter-clockwise, against the action of a spring 585. Counter-clockwise movement of the lever 583 causes a bent-over ear on a left-hand extension thereof to engage a surface 588, formed on a hook-shaped extension of the forward tabulating stop arm 363, and rock said arm clockwise, against the tension of a spring 587, to lower the upward extension 362 of said arm beneath all of the forward tabulating stops. This causes the traveling carriage to skip-tabulate to a particular columnar position, which is determined by the roller 575 moving off of the raised cam surface 576 on the lever 577, which frees said lever to the action of its spring 579. This causes the lever 577 to open the switch 567 to break the circuit to the solenoid 573, whereupon the spring 585 restores the lever 583 and the armature 582 to normal positions, thus freeing the stop arm 363 to the action of the spring 587, which immediately restores said arm upwardly into the path of a certain one of the forward tabulating stop lugs 333 to terminate tabulating movement of the traveling carriage in said particular columnar position.

To recapitulate the conditions necessary for the automatic total-controlled tabulating, or TCT, mechanism to function, it is necessary that the rotary switch 104 (FIG. 1) be turned from "Off" position to either plus (+) or minus (—) position, depending upon which condition of the A totalizer 174 is desired for the control of the TCT mechanism. Likewise, it is necessary that the traveling carriage be released for forward tabulating movement in order to close the tabulating switch 566 (FIG. 22) and to simultaneously move the tabulating stop arm 363 into the path of the forward tabulating stop lugs 333 mounted on the program bar 56, and it is necessary that the roller 575 (FIG. 22) engage and depress the lever 577 to close the switch 567 to complete the circuit to the solenoid 573, which, as previously explained, depresses the tabulating stop arm 363 beneath the tabulating stop lugs 333 to cause the traveling carriage to skip-tabulate. Forward skip-tabulation continues until the roller 575 moves beyond the cam surface 576 on the lever 577, whereupon said lever is restored counter-clockwise to open the switch 567, to de-energize the solenoid 573 (FIG. 22), which permits the arm 363 to be spring-returned to its original position into the path of a certain tabulating stop lug 333 to terminate tabulating movement of the traveling carriage in a preselected columnar position where it is desired to record the condition of the A totalizer 174.

*Total-Controlled Return Mechanism*

Mechanism similar to the total-controlled tabulating, or TCT, mechanism, described above, is provided for automatically controlling the tabulating movement of the traveling carriage in a return direction, depending upon the condition of a particular totalizer, in this case the No. 1 totalizer on the B totalizer line 176 (FIG. 2B).

In the present adaptation, the total-controlled return mechanism, often referred to as the TCR mechanism, functions only when the No. 1 totalizer on the B line 176 is not in a cleared, or zeroized, condition. However, this is a matter of choice, and the TCR mechanism could just as readily be arranged to function only when the No. 1 totalizer on the B line is in a cleared, or zeroized, condition. Also, the TCR mechanism could readily be arranged to function when the No. 1 totalizer on the B totalizer line is either in a plus condition or in a minus condition (overdrawn). Moreover, the TCR mechanism is not confined to operation in connection with the No. 1 totalizer on the B line, but can readily be arranged to operate in connection with the A totalizer or any totalizer on the B, C, or D lines, and this is likewise true of the TCT mechanism.

As previously explained, the TCR mechanism operates under control of the rotary switch 105 (FIG. 1), mounted on the typewriter keyboard, and, when this switch is in its central, or "OFF", position, as shown here, the TCR mechanism is rendered inoperative. When the switch 105 is turned counter-clockwise to FT position, the TCR mechanism functions only when the traveling carriage is tabulating in a forward direction, and, when said switch is turned clockwise to RT position, said mechanism functions only while the traveling carriage is tabulating in a return direction.

Each of the wheels 179 (FIGS. 2B and 33) of the No. 1 totalizer on the B line 176 has integral therewith a cam 589, having a low spot corresponding to the zero position of said wheel, which coats with a tooth 590 formed on a corresponding pawl 591 free on a shaft 592 journaled in the totalizer framework, all of said pawls 591 being connected at their forward ends by a bail 593 for unitary movement. Also integral with the pawls 591 is an arm 594, having a stud 595 (FIG. 24), coacting with a spring blade 596, which, with a companion blade 597, forms a switch which is connected in series with other switches, as will be explained presently, to the carriage-reversing solenoid 329 (FIGS. 10 and 11) and to a carriage return solenoid 598 (FIG. 26) secured to a plate 599 in turn secured to a bracket 600 depending from the base 51. The switch blades 596 and 597 are mounted on a bracket 581, secured to the machine framework.

Figures 23, 24, 25:
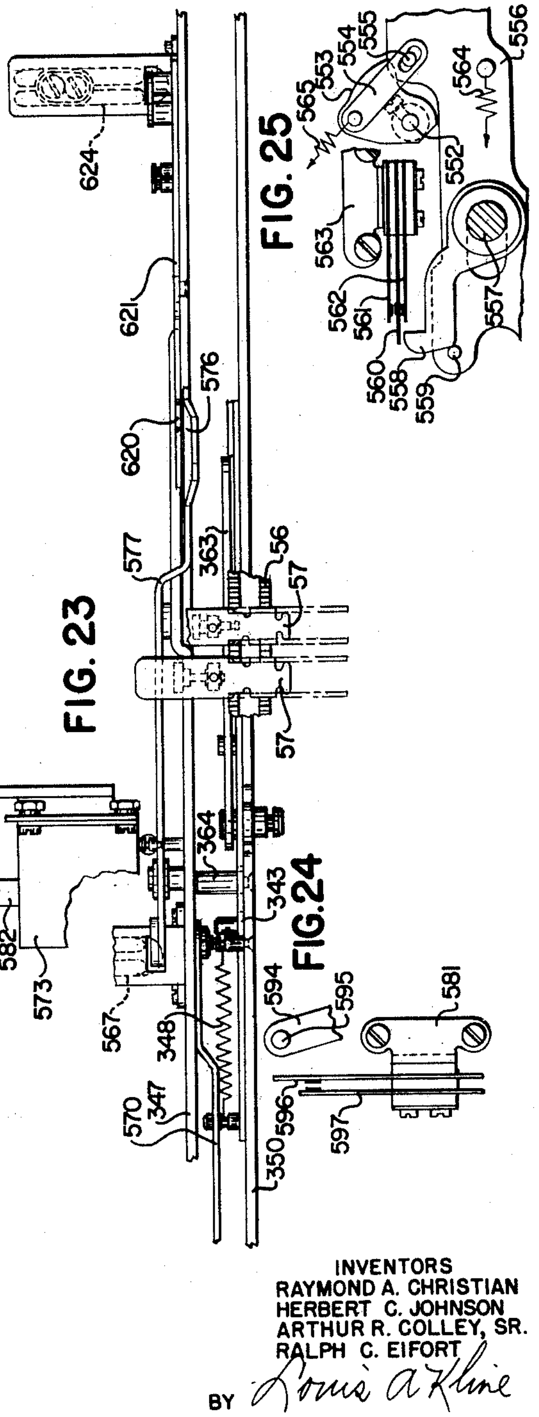
FIG. 23 is a side-spacing view, as observed from above, of a portion of the mechanism shown in FIG. 22.
FIG. 24 is a detail view of the switch, controlled by a certain totalizer, which operates in conjunction with the mechanism disclosed in FIGS. 16 and 22 for controlling the tabulating movement of the traveling carriage.
FIG. 25 is a detail view of a switch, controlled by a certain totalizer, which operates in conjunction with a portion of the mechanism shown in FIG. 22, for controlling the forward tabulating movement of the traveling carriage to a particular columnar position.

As each of the No. 1 totalizer wheels 179 on the B line 176 has a zero cam 589 and a corresponding pawl 591, it is necessary that all of said wheels be at zero position for the arm 594 to remain ineffective, as shown in FIG. 24. Consequently, the switch 597 will remain open, and therefore under this condition the TCR mechanism will remain inoperative. However, when any one wheel 179 of the No. 1 totalizer on the B line is out of zero position, the cam 589, coacting with the corresponding pawl 591, will rock said pawl, the bail 593, and the arm 594 counter-clockwise, causing the stud 595 (FIGS. 2B and 24) to engage the switch blade 596 and rock said blade forwardly into contact with its companion blade 597 to complete a circuit to the carriage-reversing solenoid and the carriage return solenoid, when the other switches connected in series with said switch 597 are closed, as will be explained presently, to render the TCR mechanism effective.

Figure 27:
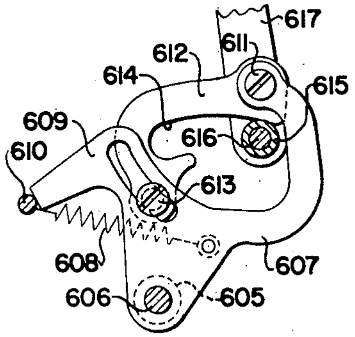
FIGS. 27 and 28 are detail views of portions of the mechanism shown in FIG. 26.
Figure 28:
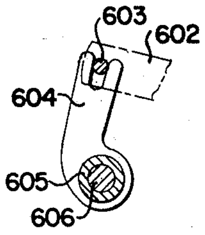

The solenoid 598 (FIGS. 26, 27 and 28) has an armature 602 slidably supported therein and carrying a stud 603, which engages the bifurcated upper end of an arm 604 integral with a hub 605 free on a stud 606 secured in the plate 599. Also integral with the hub 605 is an arm 607 urged counter-clockwise by a spring 608 to normally maintain a finger 609 thereof in yielding engagement with a stop stud 610 secured in the plate 599. A cam plate 612 is adjustably connected to the arm 607 by means of a screw 611, which rotatably engages a hole in an upward extension of said arm 607 and is threaded into said cam 612, and by a clamp screw 613, which coacts with a curved slot in said arm 607 and is threaded into said cam 612. An inner cam surface 614, formed on the cam 612, coats with a roller 615, free on a stud 616 secured in the lower end of a link 617, the upper end of which link is pivotally connected to a downward extension of the reverse tabulating link 388 (FIGS. 13, 16, and 26), downward movement of which link 388 frees the traveling carriage for tabulation in a return direction, in the manner explained earlier herein. The stud 616 freely engages a hole in the forward end of a crank 618, having a stud 619, which rotatably engages a bushing secured in the plate 599, to shiftably support the lower end of said link 617, so that the roller 615 will coact properly with the cam 612.

When the solenoid 598 (FIG. 26) is energized, as will be explained presently, the armature 602 is drawn rearwardly to rock the arms 604 and 607 clockwise, against the action of the spring 608. Clockwise movement of the arm 607 carries the cam 612 clockwise in unison therewith, causing the surface 614, coacting with the roller 615, to shift the link 617 and the reverse tabulating link 388 downwardly, to rock the levers 384 and 373 (FIG. 16) clockwise to free the traveling carriage for tabulation in a return direction and to simultaneously move the return stop arm 378 into the path of the selected tabulating stop lug 407, which in this case will be referred to as a No. 1 return stop. In the present adaptation, the cam 612 is adjusted to raise the return stop arm 378 into the patch of a No. 1 stop lug 407 (FIG. 16). However, this is a matter of choice, as the cam 612 may be adjusted to raise the return stop arm into the path of any length of carriage return stop.

Figure 26:
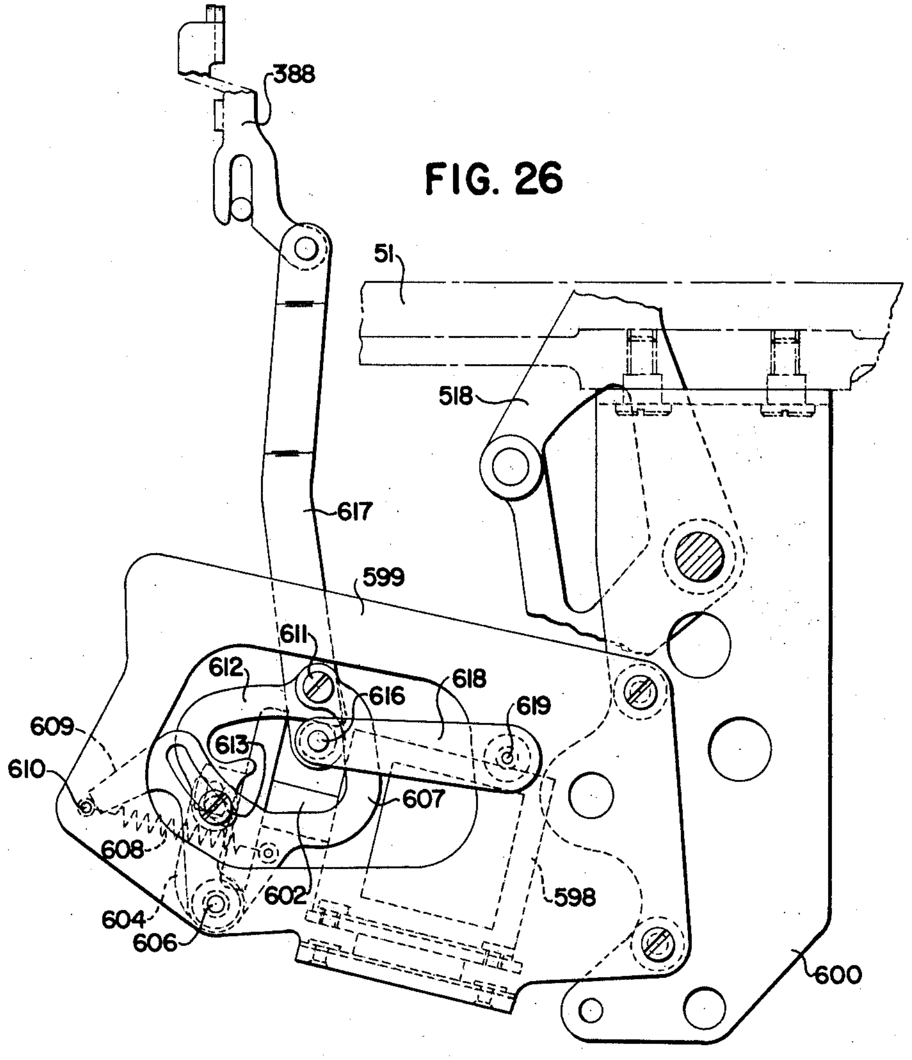
FIG. 26 is a right side elevation of the solenoid, controlled by the switches shown in FIGS. 16, 22, and 24, for causing the traveling carriage to be tabulated to a particular columnar position.

As previously explained, the operation of the total-controlled return, or TCR, mechanism is under control of the switch 105 (FIG. 1), and, when said switch is in "OFF" position, as shown here, and the TCR mechanism is ineffective, rotation of the switch 105 to forward tabulating (FT) position connects the forward tabulating switch 566 (FIG. 22) into the circuit of the TCR solenoid 598 (FIG. 26). Consequently, operation of the forward tabulating lever 343 closes said switch 566 to complete a circuit to said solenoid. During forward tabulating movement of the traveling carriage, one of the rollers 575 (FIG. 22), mounted in a stop 57 on the program bar 56, engages a cam surface 620 on a lever 621 free on a stud 622 in the plate 347 and rocks said lever counter-clockwise, against the action of a spring 625, which spring urges said lever clockwise into normal engagement with a stop stud 626 in the plate 347. Counter-clockwise movement of the lever 621 withdraws an insulated downward extension 623 thereof from one of the spring blades of a switch 624 to close said switch, to complete the circuit to the TCR solenoid 598 (FIG. 26). This causes the solenoid 598 to be energized and rock the arm 607 and the cam 612 clockwise, as explained before, to shift the links 617 and 388 downwardly, which in turn rocks the return lever 384 clockwise (FIG. 16) to rock the lever 373 clockwise out of engagement with the stud 376 to free said lever for left-hand shifting movement and to simultaneously move the return stop arm 378 into the path of a No. 1 return stop 407 located in a preselected columnar position on the program bar 56. Left-hand shifting movement of the lever 373 closes the switch 395, as explained before, to complete a circuit to the carriage-reversing solenoid 329 (FIGS. 10 and 11) to cause the direction of movement of the traveling carriage to be immediately changed from forward to return direction. Return tabulating movement of the traveling carriage is terminated by the No. 1 stop 407 (FIG. 16) coming into contact with the return stop arm 378 to terminate the return movement of the traveling carriage in a preselected columnar position, when the No. 1 totalizer on the B totalizer line is not in a zeroized condition.

Unlike the TCT mechanism, the movement of the roller 575 (FIG. 22) off of the cam surface 620 of the lever 621, during return movement of the traveling carriage, does not terminate such movement, as the return solenoid 329 (FIGS. 10 and 11) remains effective to cause the traveling carriage to move in return direction, and the opening of the switch 624 (FIG. 22) and the consequent de-energization of the TCR solenoid 598 (FIG. 26) do not interfere with the former positioning of the stop arm 378 (FIG. 16) by said solenoid 598, as the engagement of the retaining pawl (not shown) with the teeth 389 in the arm 379, which, as previously explained, is flexibly connected to said arm 378, retains said arm 378 in the position in which it was placed by the operation of the TCR solenoid 598. As a result, the traveling carriage continues to tabulate in a return direction until a No. 1 stop 407 comes into contact with the stop arm 378, which restores the return tabulating mechanism to normal position, in the manner explained before, to terminate tabulating movement of the traveling carriage in a predetermined columnar position, when the No. 1 totalizer on the B totalizer line is not in a cleared condition. When the No. 1 totalizer on the B line is in a cleared, or zeroized, condition, the switch-operating arm 594 (FIGS. 2B and 23) remains in the position shown here, and, as a result, the switch 596 remains open. In this case, the TCR mechanism is rendered inoperative.

If it is desired to have the TCR mechanism function only while the traveling carriage is moving in a return direction, the TCR switch 105 (FIG. 1) is moved to return tabulating or RT position to disconnect the forward tabulating switch 566 (FIG. 22) from the other TCR switches, and to simultaneously connect a return tabulating control switch 628 (FIGS. 8, 16, and 22) in the circuit with said other TCR control switches. The outer blade of the return tabulating control switch 628 (FIG. 8) has an insulating stud 629 secured to its upper end, which is in contact with the similar stud 394 in the carriage-reversing switch 395, which, as previously explained, is held open by the screw 393 in the slide 391 (FIG. 16) when the carriage return mechanism is inoperative.

Operation of the lever 384 (FIG. 16) to render the carriage return mechanism effective, as explained before, permits left-hand shifting movement of the lever 373 and the slide 391 to withdraw the screw 393 from the insulating stud 394, to permit the carriage-reversing switch 395 and the switch 628 to be closed, to reverse the direction of travel of the carriage. During return movement of the traveling carriage, engagement of the roller 575, located to the left (FIG. 22) of the TCR control lever 621, with the cam surface 620 of said lever, closes the switch 624 to complete a circuit to the TCR solenoid 598 (FIG. 26), in the manner explained before, to cause the lever 384 (FIG. 16) to again be rocked clockwise to raise the return stop arm 378 into the path of a No. 1 return stop 407, whereupon engagement of said No. 1 stop with said stop arm terminates the movement of the traveling carriage in a preselected column, as explained before, when the No. 1 totalizer on the B totalizer line is not in a cleared condition.

As explained before, if all the wheels of the No. 1 totalizer on the B line are in zero position, the switch arm 594 remains ineffective, as shown in FIGS. 2B and 24, and, as a result, the switch 596 remains open. In this case, the TCR mechanism does not function. It is to be understood that the rollers 575 in the control stops 57 (FIG. 22), which coact with the TCT lever 577, do not coact with the TCR lever 621, and, likewise, the rollers 575, which coact with the TCR lever 621, do not coact with the TCT lever 577.

*Interspersed Totalizers*

By referring to FIGS. 2A and 2B, it will be recalled that the present machine is provided with three lines of interspersed totalizers, B line 176, C line 177, and D line 178. The B line 176 has thereon four sets of interspersed totalizer wheels 179, which coact with the extension racks 269 for entering values into said wheels and for taking values out of said wheels. The C line 177 is provided with eight sets of interspersed totalizer wheels 180, which also coact with the corresponding actuator racks 269, and the D line, which is a substantial duplicate of the C line 177, has thereon eight sets of interspersed totalizer wheels 181, which coact with the extension racks 269, in the usual manner, to enter values into said wheels and take values out of said wheels.

The totalizers 176, 177, and 178 are of the same general design and construction as the totalizers disclosed principally in FIGS. 16, 17, 18, and 19 of the co-pending application for Letters Patent of the United States, Serial No. 466,292, Raymond A. Christian et al., inventors, which issued March 29, 1960, into United States Patent No. 2,930,523, and, as explained in said application, many of the features of the totalizers disclosed therein are similar in many respects to those of the totalizers shown and described in United States Letters Patent No. 2,503,865, issued April 11, 1950, to Raymond A. Christian, to which patents reference may be had for details of construction which are not pertinent to the present invention and which, for that reason, will not be explained in detail herein.

The manner in which the totalizers of the present application differ in design, structure, and operation from the totalizers disclosed in the above-referred-to patent and application will be fully explained in the ensuing pages.

The three lines of totalizers 176, 177, 178 (FIG. 2B) are substantially alike in construction and operation, and, therefore, it is believed that the explanation of the B totalizer line 176, and the manner in which it differs from the totalizers disclosed in the application and patent referred to hereinbefore, will suffice.

Directing attention to FIGS. 2B, 33, 34, and 35, the B totalizer 176 comprises four sets of totalizer wheels 179, rotatably supported on a hollow shaft 633, which is shiftable horizontally in bushings 634 mounted in a frame comprising end plates 636 (only one shown in FIG. 32) and a similar center plate 635, to align any selected one of the four sets of totalizer wheels 179 with the single set of amount actuators or racks 269. While in the present instance the B totalizer line 176 comprises only four sets of totalizer wheels 179, this is a matter of choice, as the totalizer may comprise more or fewer sets of wheels up to a maximum of eight sets of wheels. The C and D lines 177 and 178 (FIG. 2B) each comprise eight sets of totalizer wheels 180 and 181, this being the chief difference between the C and D totalizer lines and the B totalizer line, as the three totalizer lines are substantially alike in every other respect.

The mechanism for selectively shifting the totalizer shaft 633 to align the selected set of totalizer wheels with the amount actuators is similar in every respect to the selecting or shifting mechanism disclosed in the Christian et al. Patent No. 2,930,523, to which reference may be had for a description of this mechanism, if such is required. However, as the selecting or shifting mechanism forms no part of the present application, it is believed unnecessary to describe this mechanism further herein.

Figures 31, 32, 33:
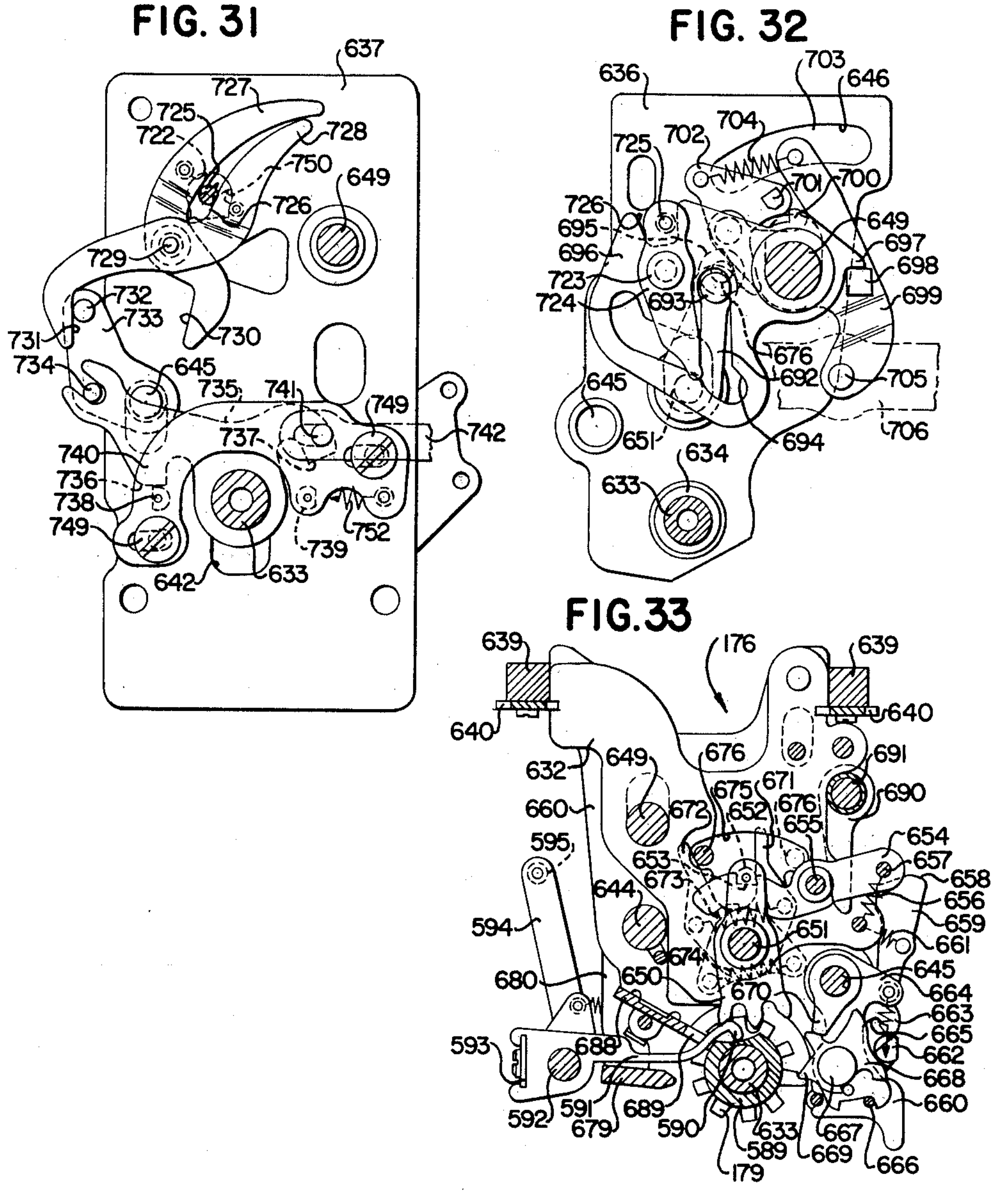
FIG. 31 is a left-hand view of a portion of the tens transfer controlling mechanism.
FIG. 32 is a left-hand view of the tens transfer operating and restoring mechanism.
FIG. 33 is a cross-sectional view, as observed from the right, of one of the interspersed totalizers.
Figure 34:
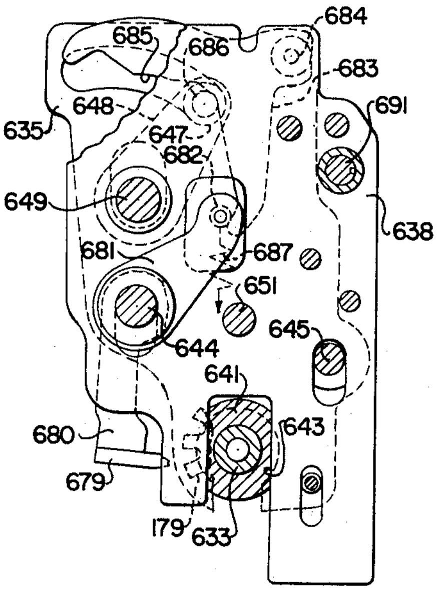
FIG. 34 is a detail view, as observed from the right, of the alining mechanism for the wheels of one of the interspersed totalizers.

The plates 635 and 636, which form the shiftable framework for the totalizer shaft 633, are mounted for vertical shifting movement to engage and disengage the selected set of totalizer wheels with and from the amount actuators, in a stationary framework, comprising right and left end plates 637 (FIGS. 2B and 31) and a similar central plate 638 (FIG. 34), said plates being secured to upward extensions of the machine base 51. The upper ends of the plates 635 and 636 have thereon finished edges, which slide between the faces of square spacing bars 639, supported by the plates 637 and 638, and said plates 635 and 636 are maintained in proper side-spaced relationship to each other by slots formed in comb 640 (FIG. 36) secured to the bottom surfaces of the bars 639, which slots engage the finished upper ends of said plates 635 and 636. The plates 635 and 636, constituting the totalizer framework, carry bushings 641, which freely engage the shaft 633 and are flattened to slidably engage vertical slots 642 and 643, formed, respectively, in the plates 637 and 638 (FIGS. 31 and 34). The plates 635 and 636 (FIGS. 32 and 35) of shiftable totalizer framework support a totalizer aligner shaft 644 and a transfer pawl shifting shaft 645, which shafts move up and down with the totalizer framework in order to maintain the parts which they carry in proper relationship with the totalizer wheels 179, which likewise shift up and down with said plates.

The shiftable totalizer framework, comprising the plates 635 and 636, is shifted up and down for the purpose of engaging and disengaging the selected totalizer wheels 179 and the actuator racks 269, by means of cam slots 646 (FIGS. 32, 34, and 35), which are engaged by rollers 647 carried by cranks 648 secured on an engaging and disengaging shaft 649 journaled in the plates 637 and 638. By referring to FIGS. 35 and 36, it will be noted that clearance slots are provided in the plates 635 and 636 for the shaft 649, so that said plates, which make up the shiftable totalizer framework, may shift up and down independently of said shaft 649.

The mechanism for operating the engaging and disengaging shaft 649 is similar in every respect to that disclosed in FIG. 10 for the Christian et al. Patent No. 2,930,523, for operating the engaging shafts 231 and 498, to engage and disengage the selected totalizer wheels and the actuators in proper timing for the type of operation being performed, to which reference may be had for a full disclosure of this mechanism, if it is required.

The totalizer being described is provided with a tens transfer mechanism for transferring tens digits from lower to higher denominations in adding and subtracting operations, said transfer mechanism being similar in may respects to the transfer mechanism disclosed in the Christian application referred to hereinbefore and, therefore, will be but briefly described.

There is a tens transfer mechanism for each denominational order of the totalizer 176, and the lateral shifting of the totalizer shaft 633 to align the selected set of totalizer wheels 179 with the amount actuator 269 (FIGS. 2B and 33) simultaneously aligns said selected set of totalizer wheels with the transfer mechanism for coaction therewith in exactly the same manner as explained for the totalizer disclosed in the Christian application. Inasmuch as the transfer mechanism is substantially duplicated for each denominational order, it is believed that the description of the transfer mechanism for one such denomenational order of the B totalizer 176, as representative of the transfer mechanisms for all of the denominational orders, will suffice.

Each denominational order wheel 179 (FIG. 33) of the B totalizer 176, with the exception of the lowest order wheel, has associated therewith a transfer segment 650, rotatably mounted on a shaft 651, rotatably supported in borings in denominational order plates 632, having near their upper ends slots which engage the combs 640 to secure said plates in proper positions between the bar 639. It is to be understood that there is an order plate 632 for each denominational order, with the exception of the lowest order, and that said plates, in addition to rotatably supporting the shaft 651, also assist in supporting the engaging shaft 649 (FIGS. 2B and 33). The transfer segment 650 has three teeth arranged to be engaged by the teeth of the selected totalizer wheel 179, to rotate said wheel one tooth space in an additive or subtractive direction, depending upon which function is being carried on in the totalizer, to transfer tens digits from lower to higher denominations.

An upward extension of the segment 650 (FIG. 33) carries a stud 652, having a downward flat surface which engages a notch 653 in a trip arm 654 pivoted on a stud 655 secured in the plate 632. A spring 656, tensioned between a stud 657 in a rearward extension of the arm 654 and a stationary stud in the plate 632, urges said arm 654 clockwise to normally maintain the notch 653 in yielding engagement with the stud 652. The stud 657 is arranged to coact with a cam surface 658 formed on the upper end of a transfer trip arm 659 pivoted on a stud (not shown) in a plate 660 (FIG. 3) supported between the bars 639 and the combs 640, for up-and-down shifting movement in unison with the totalizer shaft 633 and the framework which supports said shaft. Like the order plates 632, there is a transfer arm supporting plate 660 for each denominational order, said plates assisting in supporting the shafts 644 and 645 for up-and-down shifting movement in unison with the totalizer framework, and said plates 660 having therein clearance slots for the stationary shaft 649.

A spring 661 (FIG. 33) urges the trip arm 659 counter-clockwise to normally maintain a flat surface formed on a stud 662, carried thereby, in yielding engagement with the rear end of a trip pawl 663, being secured in fixed relationship to a companion arm 664 by a bushing (not shown) which rotatably engages the shaft 645. A spring 665 urges the arm 664 and the pawl 663 clockwise, to normally maintain the right-hand wall of a notch formed in the lower end of said arm in yielding engagement with a stop stud 666 secured in the plate 660. The arm 664 (FIG. 33) carries a stud 667, which pivotally supports a transfer trip plate 668, having a tripping tooth 669, which coacts with a long tooth of the totalizer wheel 179, which long tooth is located in the zero position of said wheel. A shifting surface formed on the upper edge of the plate 668 coacts with the end of a finger 670 (FIG. 33) secured on the transfer shifting shaft 645, said finger 670 being shown here in plus, or add, position, in which it retains the plate 668 in its counter-clockwise position, as determined by a notch in the downward edge of said plate, in cooperation with a stop stud in the arm 664, where the tooth 669 is in proper position for tripping the transfer mechanism in adding operations.

If the adjacent lower order wheel to the wheel 179 shown in FIG. 33 passes through zero while being rotated in an additive or clockwise direction by the rack 269 (FIG. 2B), the long tooth on said wheel wipes the tooth 669 to rock the plate 668, the arm 664, and the pawl 663 counter-clockwise, against the action of the spring 665, to disengage said pawl from the flat surface of the stud 662 to free the arm 659 to the action of the spring 661, which immediately rocks said arm 659 counter-clockwise to move the cam surface 658, which at this time is beneath the stud 657 and out of coacting relationship therewith, to set up a condition which will cause the transfer segment 650 for the adjacent higher order wheel 179 to receive transferring movement in an additive direction, upon disengaging movement upwardly of the totalizer shaft 633. After the rack 269 has completed its return movement forwardly, the totalizer framework is shifted upwardly to disengage the wheels 179 from the racks 269 and to simultaneously restore the arm 659 and associated mechanism upwardly. Upward movement of the arm 659 causes the surface 658 to engage the stud 657 and rock the lever 654 counter-clockwise, against the action of the spring 656, to disengage the notch in said lever from the stud 652 to free the transfer segment, for the adjacent higher order, for transfer movement. It should be remembered that, when the selected set of totalizer wheels 179 are engaged with the actuator racks 269, they are simultaneously disengaged from the corresponding transfer segments 650, and, after being actuated by said racks, said wheels are shifted upwardly, out of engagement therewith and into engagement with the corresponding segments 650, prior to transfer movement of said segments.

The stud 652 (FIG. 33) extends through an opening 675 in the corresponding order plate 632 and between the opposed faces of a pair of spring-actuated scissors arms 671 and 672, free on the shaft 651 and urged toward each other by springs 673 and 674. The opposed faces of the scissors arms 671 and 672 likewise coact with a bail 676, supported by cranks 677 (FIG. 36) secured on the shaft 651, said bail being actuated either toward the left to adding position, as shown in FIG. 33, or toward the right to subtracting position, to tension the scissors arms 671 and 672 in a manner to be explained presently.

In adding operations, the bail 676 (FIG. 33) is in its left-hand position, as shown here, and carries the arms 672 therewith to tension the springs 673 and 674, while the arm 671 is retained in its central position, as shown here, by the stud 652 in the transfer segment 650. Disengagement of the notch in the arm 654 from the stud 652, as explained above, frees the segment 650, which is now engaged with the corresponding totalizer wheel 179, to the action of the spring 671, which immediately rocks said segment counter-clockwise until the upward extension of said arm 671 contacts the bail 676 and the stud 652 moves into engagement with the arm 672. Counter-clockwise movement of the segment 650 rotates the totalizer wheel 179 the equivalent of one tooth space or one digit to transfer a tens digit into said wheel, when the adjacent lower order wheel 179 passes through zero.

In subtract operations, the bail 676 is in its right-hand position, as shown in dot-and-dash lines in FIG. 33, and carries the arms 671 therewith to tension the springs 673 and 674 while the arm 672 is retained in its central position by the stud 652 in the transfer segment 650. In subtract operations, the wheels 179 of the selected totalizer are engaged with the racks 269 prior to their initial movement, which movement rotates said wheels counter-clockwise (FIG. 33) to subtract therefrom the value of the amount set up on the amout keys. If, during rotation of the adjacent lower order wheel 179 in a subtractive direction, said wheel passes through zero, the long tooth thereon engages the tooth 669 and rocks the pawl 663 out of engagement with the stud 662 to free the arm 659 to the action of the spring 661, which, as before, moves said arm counter-clockwise, or inwardly, so that the surface 658 is in the path of the stud 657. Upward disengaging movement of the totalizer line 633 and the arm 659 re-engages the adjacent higher order wheel 179 with its transfer segment 650, and simultaneously causes the surface 658 on the arm 659 to engage the stud 657 and rock the arm 654 counter-clockwise to disengage the notch in said arm from the stud 652 to free the transfer segment 650 to the action of the arm 672. The arm 672 immediately rocks the segment 650 clockwise until the upper end of said arm 672 comes into contact with the bail 676, which at this time is in its right-hand, or subtract, position, as shown in dot-and-dash lines in FIG. 33. Clockwise movement of the segment 650 rotates the corresponding totalizer wheel 179 the equivalent of one tooth space or one digit in a subtractive or counter-clockwise direction to subtractively enter a tens digit therein when the adjacent lower order wheel turns through zero while moving in a subtractive direction. The operated transfer segments 650 remain in operated condition at the end of machine operation and are restored to their central, or normal, positions the next time the totalizer line 633 receives engaging and disengaging movement in a subsequent machine operation, as will be explained presently.

One of the chief and most important differences between the totalizer mechanism disclosed in the present application and that disclosed in the Christian et al. Patent No. 2,930,523 is that the transfer segments 650 remain stationary and do not move with the totalizer line 633 during its engaging and disengaging movement, as in the mechanism of the co-pending application. In the copending application, the transfer segments are mounted in a shiftable framework, which shifts in relation to the totalizer framework, and said segments remain in mesh with the totalizer wheels as they are moved downwardly into engagement with the amount actuator racks, after which said segments are returned upwardly, out of engagement with said wheels. In the present application, an aligning bar 679 (FIGS. 33 and 34), which moves up and down in unison with the totalizer framework, performs the function formerly performed by the transfer segments; that is, retaining the selected set of totalizer wheels against movement while they were being moved into engagement with the amount actuator racks 269 and while they were being disengaged therefrom, therefore doing away with the added load of the shiftable framework for the transfer segments, thus reducing to a marked degree the power required to engage and disengage the selected totalizer wheels and the actuators, and extensively simplifying and improving the totalizer-engaging and -disengaging mechanism.

The aligner bar 679 is supported by a plurality of arms 680 (FIGS. 33 and 34) secured on the shaft 644, said shaft also having secured thereon a crank 681 carrying a stud 682, which coacts with a downward extension of a Y-shaped lever 683 (FIG. 34) free on a stud 684 in the plate 635. A cam surface 685, formed on the downward edge of a forwardly-extending arm of the lever 683, coacts with a stud 686 in the crank 648, which stud also supports the roller 647. A spring 687, one end of which is connected to the stud 682 (FIG. 34), urges the crank 681, the shaft 644, the arms 680, and the aligning bar 679 clockwise to normally maintain said bar in disengaged position, as shown here. Initial engaging movement counter-clockwise of the shaft 649, the crank 648, and the stud 686 causes said stud, in cooperation with the camming surface 685, to rock the lever 683 clockwise, said lever in turn rocking the crank 681, the shaft 644, and the aligner bar 679 counter-clockwise to engage said aligner bar with the teeth of the totalizer wheels 179 prior to the time that said teeth move out of engagement with the teeth in the corresponding transfer segments 650. After the wheels 179 of the selected totalizer are disengaged from the corresponding transfer segments 650 and engaged with the actuator racks 269, the stud 686, coacting with the declining surface of the cam surface 685, permits the spring 687 to rock the aligner bar 679 out of engagement with the teeth of the totalizer wheels 179.

The aligner bar 679 likewise functions during disengaging movement of the totalizer line to retain the totalizer wheels 179 in position while they are being disengaged from the actuator racks 269 and re-engaged with the corresponding totalizer segments 650. Return movement clockwise of the totalizer-engaging shaft 649, the crank 648, and the stud 686 causes said stud, in cooperation with the cam surface 685, to engage the aligner bar 679 with the teeth of the totalizer wheels 179 prior to disengagement of said teeth from the actuators 269, and said aligner bar remains in engagement with said teeth until they are re-engaged with corresponding transfer segments 650, after which the spring 687 restores said aligner bar and connected mechanism to disengaged position, as shown here.

All of the totalizer wheels 179 on the totalizer line 633, with the exception of the selected set of totalizer wheels which are in alignment with the actuators 269 and the corresponding transfer segments 650, are retained against displacement by means of an aligning bar 688 (FIG. 33), which is secured to angular surfaces formed on the transfer arm plates 660, which move up and down in unison with the totalizer framework and the totalizer wheels 179. Shifting the wheels 179 of the selected totalizer into alignment with the actuators 269 and the transfer segments 650 simultaneously shifts said totalizer wheels into alignment with corresponding clearance notches 689 cut in the aligner bar 688, thus permitting said wheels to be rotated by the racks 269 and by the corresponding transfer segments 650. With the exception of the selected set of totalizer wheels, all of the other totalizer wheels 179 on the line 633 are retained against rotation by the aligner bar 688, which is necessary in connection with the interspersed type of totalizer.

Figure 36:
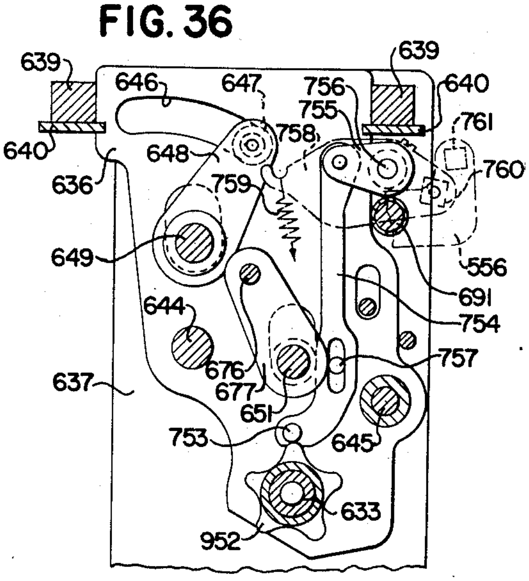
FIG. 36 is a detail view, as observed from the right, of one type of overdraft control mechanism for one of the interspersed totalizers.

Associated with each of the transfer segment trip arms 659 (FIG. 33) is a restoring finger 690 secured on a shaft 691 journaled in the plates 637 and 638 (FIGS. 34 and 36). Near the beginning of machine operation, the shaft 691 and the fingers 690 are rocked first counter-clockwise, during which movement said fingers engage the trip arms 659 and restore them clockwise, against the action of the spring 661, until the studs 662 by-pass the ends of the pawls 663, whereupon the springs 665 return said pawls into the path of said studs to retain the arms in restored position. After the arms 659 have been restored, the fingers 690 and the shaft 691 are returned counter-clockwise to normal position, as shown here.

The units or lowest order wheel 179 (FIG. 33) does not have a rockable transfer segment 650, as do all the other order wheels, but instead has a stationary segment (not shown), similar to the segments 650, for retaining said lowest order wheel against displacement when it is disengaged from the rack 269 and the aligner 679.

The operated transfer segments 650 remain in operated position at the end of machine operation and are restored to their central position, where the stud 652 is again engaged with the notch 653 in the arm 654 by the bail 676, which at this time receives movement from either its add or its subtract position to a central position, to restore said segments to their central, or unoperated, position, as shown here. The mechanism for operating the bail 676 is shown principally in FIGS. 30 and 32 and will now be explained.

It will be recalled that the bail 676 is supported by a plurality of cranks 677 (FIG. 36) secured to the shaft 651. Also secured to the shaft 651 is a crank 692 (FIG. 32) carrying a stud 693, which is in axial alignment with the bail 676. The stud 693 extends within and coacts with a Y-shaped slot 694 in an enlarged portion of an arm 696 free on the shaft 649. The arm 696 (FIG. 32) has a projection 697, which coacts with a square stud 698 secured in an arm 699 free on the shaft 649. The arm 696 has another projection 700, which coacts with a square stud 701 carried by a feed pawl 702 pivoted on a stud 703 in the arm 699. A spring 704, tensioned between the arm 699 and the pawl 702, urges said pawl clockwise (FIG. 32) to normally maintain a downwardly-extending finger thereof in yielding engagement with a disengaging stud 695 secured in the plate 636. Downward engaging movement of the plate 636 (FIG. 32) and the totalizer shaft 633 withdraws the stud 695 from the finger of the pawl 702, whereupon the spring 704 rocks said pawl clockwise to move the stud 701 into the path of the projection 700, for the purpose of forming a driving connection between the arms 696 and 699.

A downward extension of the arm 699 (FIGS. 30 and 32) pivotally engages a stud 705 secured in a pitman 706 connected by a link 707 to a lever 708 rotatable on a stud 709 secured in the machine framework. A link 710 pivotally connects the lever 708 to a cam lever 711 pivoted on a stud 712 secured in the machine framework. The lever 711 carries rollers 713 and 714, which cooperate, respectively, with the peripheries of companion plate cams 715 and 716, secured to an auxiliary cam shaft 717 journaled in brackets (not shown) depending from the machine base. Also secured on the shaft 717 is a gear 718, which meshes with an idler gear 719, rotatably supported on a stationary stud 720 and in turn meshing with a gear 721, secured on the main cam shaft 195. As previously explained, the main cam shaft 195 makes one counter-clockwise revolution, as observed from the left of the machine (FIG. 30) each machine operation and, through the gears 721, 719, and 718, drives the auxiliary cam shaft also one counter-clockwise revolution each machine operation. Rotation of the cams 715 and 716 rocks the lever 711 through two complete excursions of movement, first clockwise and then back to normal position, at the time that the wheels of the selected totalizer are disengaged from the corresponding transfer segments 650 (FIGS. 30, 32, and 33) in either subtracting time or adding time. The lever 711, through the link 710, the lever 708, and the link 707, shifts the pitman 706 also through two complete excursions of movement, first toward the left, as viewed in FIGS. 30 and 32, and then back to normal position, to in turn rock the arm 699 through two complete excursions of movement each machine operation, first clockwise and then back to normal position (FIG. 32) during the time that the wheels 179 of the selected totalizer are out of engagement with the transfer segments 650 and in engagement with the amount actuators 269. In operations where no engaging movement is imparted to the totalizer framework, including the plate 636 (FIG. 32) and the totalizer shaft 633, the stud 695 remains in position to retain the pawl 702 in its counter-clockwise position, against the action of the spring 704, in which position the stud 701 is above and out of coacting relationship with the projection 700, and consequently, when no totalizer is selected for engagement, the arm 699 rocks first clockwise and then back to normal position, independently of the arm 696. Consequently, the operated segments 650 are not restored.

In an operation where one of the totalizers on the B line 633 is selected for actuation, initial movement downwardly of the plate 636 and said line 633 withdraws the stud 695 (FIG. 32) from the downward extension of the pawl 702, permitting the spring 704 to rock said pawl clockwise to move the stud 701 into the path of the projection 700 prior to initial movement of the arm 699, which movement carries the arm 696 clockwise in unison therewith, causing the right-hand branch of the slot 694 in said arm, in cooperation with the stud 693, to rock the crank 692 and the shaft 651 counter-clockwise, as shown in FIG. 32, and clockwise, as shown in FIG. 33. This rocks the transfer bail 676 exactly the same extent from its plus position to central position, causing said bail to carry the arms 671 and 672 clockwise (FIG. 33) in unison therewith, said arms in turn restoring the stud 652 and the operated transfer segment 650 clockwise until said stud 652 moves into register with the notch 653. The spring 656 then restores the arm 654 clockwise to engage the notch 653 with the stud 652 to retain the segment 650 in restored, or central, position.

When a totalizer on the line 633 is selected for a subtract operation, the bail 676 (FIG. 33) is rocked from its plus, or left-hand, position, as shown here, to its minus, or right-hand, position, as indicated in dot-and-dash lines, by the mechanisms shown in FIGS. 30 and 31, and in the following manner:

As shown in FIG. 32, the stud 693 is in the plus branch of the Y-shaped slot 694 in the arm 696, and said stud is guided either into the plus branch, as shown here, or into the minus branch by a guide finger 724 free on a stud 723 secured in said arm 696. The finger 724 (FIGS. 31 and 32) carries, at its upper end, a stud 725, which extends through a notch 726 in the arm 696, said notch serving to limit the rocking movement of said finger 724, as will be explained presently. The stud 725 also extends between opposed surfaces formed on upward extensions of scissors levers 727 and 728 (FIG. 31) pivotally mounted on a stud 729 secured in the plate 637. Downward extensions or handles of the scissors levers 727 and 728 have facing surfaces 730 and 731, which coact with a stud 732 in the upper end of an arm 733, secured on the shaft 645, which, it will be recalled by referring to FIG. 33, also has secured thereon the transfer shifting finger 670. The arm 733 carries a stud 734 engaged by a slot formed in a left-hand extension (FIG. 31) of a rocker arm 735 pivotally supported on the totalizer shaft 633. The rocker arm 735 has downward extensions 736 and 737, which cooperate, respectively, with studs 738 and 739, carried by a slide 740, mounted for horizontal sliding movement by means of slots therein, in cooperation with shouldered screws 749 threaded into the plate 637.

The slide 740 carries a stud 741 engaged by a slot in the rear end of a link 742, the forward end of which is slotted to embrace a stud 743 (FIG. 30) secured in the machine framework. The forward end of the link 742 is pivotally connected to the rear end of a pitman 744, having in its forward end a slot which engages a stud 745 secured in the machine framework, to assist in supporting said pitman for horizontal shifting movement. A spring 751 urges the pitman 744 forwardly to normally maintain an ear 746, formed on a forward extension thereof, in yielding engagement with the rear end of a control slide 747, which is shiftably mounted in the machine framework, as shown and explained in the Christian et al. patent and application referred to hereinbefore. The rear end of the control slide 747 has a slot which engages a stud in the downward extension of an arm 748, which is operatively connected to the traveling carriage selecting lever mechanism (not shown), which lever mechanism in turn coacts with control plates mounted in preselected columnar positions on the traveling carriage, to control the functions in the selected totalizer on the B line 176 being described. In addition to being controlled by the traveling carriage, the control slide 747 may be controlled by the Total B key 68 (FIG. 1) for causing the selected totalizer to be zeroized, and may be further controlled by the Sub-Total key 70, when used in conjunction with the Total B key 68, to cause the selected totalizer on the B line to be conditioned for a sub-total operation.

Figures 29, 30:
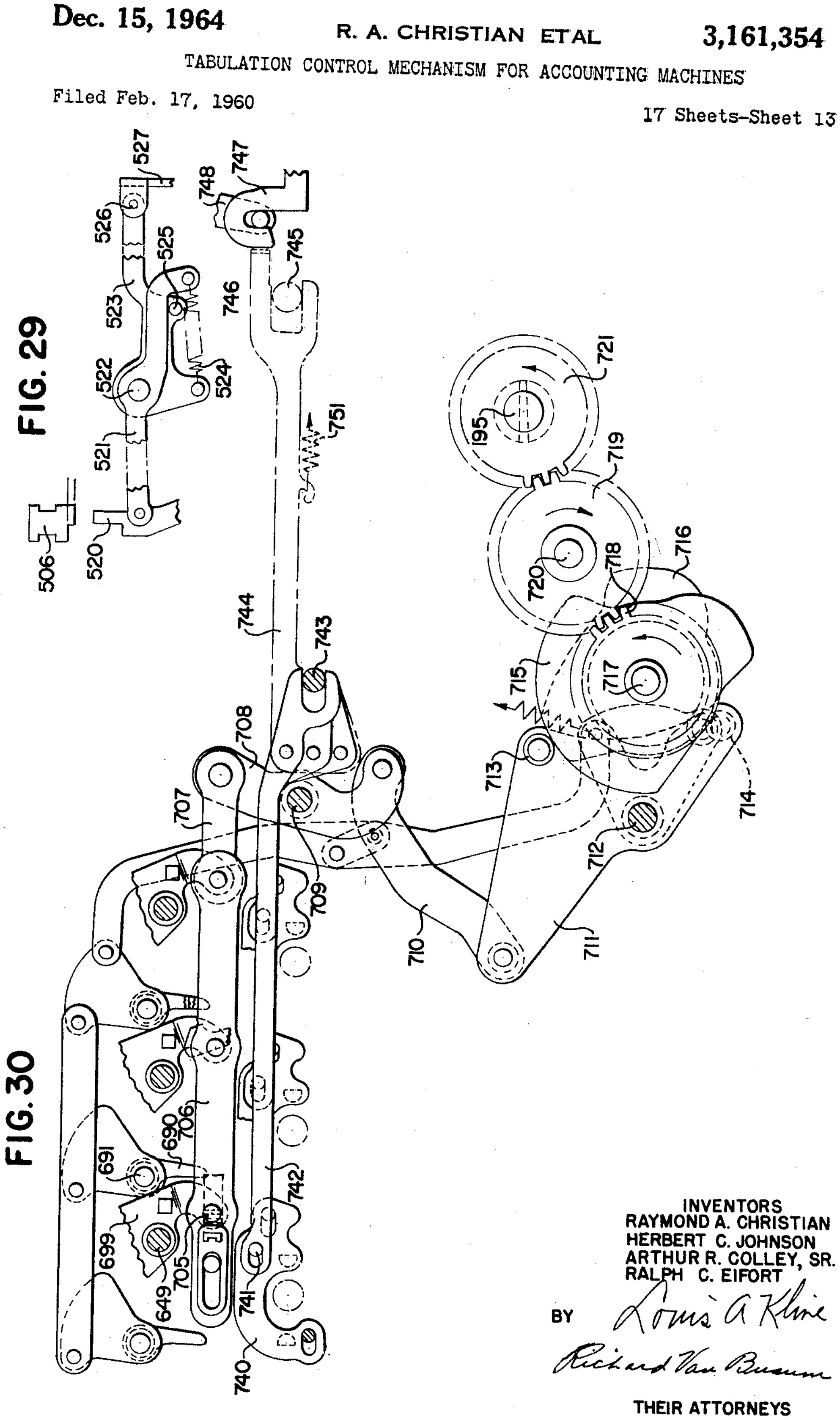
FIG. 29 is a detail view of a portion of the mechanism shown in FIG. 13.
FIG. 30 is a left side elevation of the tens transfer operating and restoring mechanism for the three lines of interspersed totalizers.

As shown in FIG. 30, the control slide 747 is in its normal or home position, which is substantially the same as the subtract position, and in which position the pitman 744 and the link 742 position the slide 740 in its left-hand position, as shown in FIG. 31, in which the stud 738 is in the path of the extension 736 of the rocker arm 735.

Near the beginning of machine operation and prior to initial movement of the actuator racks 269, the control slide 747 is positioned according to the type of operation, add, subtract, or total-taking, being performed in the selected totalizer. In subtract operations, said slide is positioned substantially as shown in FIG. 30, and in adding operations said slide is positioned toward the right and, through the pitman 744 and the link 742, positions the slide 740 (FIG. 31) so that the stud 739 is in the path of the extension 737 of the rocker arm 735, and the stud 738 is moved opposite a clearance notch in said rocker arm 735. A comparatively weak spring 752 (FIG. 31) urges the slide 740 rearwardly, or toward the left, to normally maintain the right-hand ends of the slots therein in yielding engagement with the screws 749, as shown here, which is the normal subtract position of said slide, in which the stud 738 is in the path of the extension 736 of the arm 735. The spring 751 (FIG. 30), which urges the pitman forwardly, or toward the right, in order to position said pitman in accordance with the positioning of the control slide 747, is substantially stronger than the spring 752 and consequently overcomes the action of said spring in order to position the slide 740 in its right-hand, or adding, position, in which the stud 739 is in the path of the extension 737 of the arm 735.

In FIG. 31, the rocker arm 735, the arm 733, and the shaft 645 are shown in their adding, or counter-clockwise, position, which is the clockwise position as shown in FIG. 33, in which the finger 670 positions the transfer tripping plate 668 in adding position as shown here. When the arm 733 is in adding position (FIG. 31), the stud 732 retains the scissors lever 728 in its clockwise position and, through a spring 750, tensioned between said lever 728 and its companion lever 727, also retains said companion lever 727 in its clockwise position, which in turn, through the stud 725, retains the finger 724 (FIG. 32) also in its clockwise position, in which the stud 693 is directed into the add, or right-hand, branch of the Y-haped slot 694 in the arm 696. This, as previously explained, positions the bail 676 in its left-hand position, as shown in FIG. 33, and right-hand position, as shown in FIG. 32, to urge the transfer segments 650 in an add transferring direction upon release of the arm 654. As previously explained, all operated transfer segments 650 remain in operated condition at the end of machine operation and are restored to their central position at the beginning of a succeeding machine operation in which the corresponding totalizer line 633 receives engaging movement. This, as explained in connection with FIG. 32, causes the arm 696 to be rocked clockwise, whereupon the slot 694 restores the operated transfer segments 650 to their central positions, where they are again engaged by the lever 654 and retained in said central position until they are later released for transferring movement, in the manner explained before.

If, through positioning of the control slide 747 in subtract position, as shown in FIG. 30, the slide 740 (FIG. 31) is allowed to remain in its left-hand, or subtract, position, as shown here, engaging movement of the totalizer line 633 and incidental downward engaging movement of the rocker arm 735 cause the extension 736 to engage the stud 738 and rock said arm clockwise, which, through the stud 734, also rocks the arm 733 and the shaft 645 clockwise, as shown in FIG. 31, and counter-clockwise, as shown in FIG. 33. Clockwise movement of the arm 733 (FIG. 31) causes the stud 732 to engage the surface 730 of the scissors lever 727 and rock said lever counter-clockwise, which, through the spring 750, urges the companion lever 728 clockwise. The lever 728 moves in unison with the lever 727, under the influence of the spring 750, and, through the stud 725, carries the finger 724 counter-clockwise (FIG. 32) in unison therewith, until said finger comes into yielding contact with the stud 693. Clockwise restoring movement of the arm 696, at the beginning of a subtract operation and prior to initial movement of the actuator racks 269, carries the finger 724 in unison therewith. When the lower end of the finger 724 by-passes the stud 693, the tensioned scissors lever 728 completes counter-clockwise movement of said finger, determined by the stud 725 engaging the left wall of the notch 726, to obstruct the right-hand branch of the slot 694, and to guide the stud 693 into the left-hand branch of said slot, to position the bail 676 in its subtract, or left-hand, position, as shown in FIG. 32, and right-hand position, as shown in dot-and-dash lines in FIG. 33, so that the transfer segments 650 will be urged in a subtract, or clockwise, direction upon being released for transferring movement. Counter-clockwise movement of the shaft 645 (FIG. 33) and the finger 670, from add position to subtract position, causes said finger, in cooperation with the right-hand surface on the plate 668, to rock said plate clockwise, from the position shown here to subtract position, in which the tooth 669 is located in proper relation to the long tooth of the totalizer wheel 179, whereby rotation of said wheel in a counter-clockwise, or subtractive, direction through zero position will cause said long tooth, in cooperation with the tripping tooth 669, to rock the plate 668, the arm 664, and the pawl 663 counter-clockwise. This disengages the pawl 663 from the stud 662, to free the arm 659 for counter-clockwise movement, to cause the corresponding arm 654 to be rocked also counter-clockwise, upon upward disengaging movement of the totalizer line 633 and said arm 659, to free the transfer segment 650 for the adjacent higher order for counter-clockwise transferring movement under influence of the tensioned scissors arm 672, to subtractively transfer a tens digit from the adjacent lower order to said higher order.

As in adding operations, the operated transfer segments 650 remain in operated condition at the end of subtract operations, and, when the totalizer framework receives engaging movement in a later operation, the arm 699 (FIG. 32) and the pitman 706 are operatively connected to the arm 696 and rock said arm clockwise, causing the left-hand branch of the slot 694, in cooperation with the stud 693, to restore the operated transfer segments 650 from operated position to their central, or normal, position, where they are again engaged by the corresponding arms 654 and retained in said restored condition.

In total-taking and sub-total-taking operations, often referred to as reset and read operations, respectively, the wheel 179 (FIG. 33) of the selected totalizer is rotated in a counter-clockwise, or zeroizing, direction by the corresponding rack 269, until the long tooth of said wheel comes into engagement with the tooth 669 of the plate 668, to locate said wheel at zero and to position said rack 269 and the corresponding printing sector in accordance with the amount standing on said wheel. In total-taking operations, the wheel 179 is disengaged from the rack 269 while said wheel is in a zeroized condition, and, consequently, it remains thus at the end of machine operation. In sub-total operations, the selected wheel 179 remains in engagement with the rack 269 during its return movement, and is restored to its original condition thereby.

As previously explained, one of the sets of wheels, in this case the No. 1 set of wheels 179 on the B totalizer line 176, are each provided with a zero cam 589 (FIGS. 2B and 33), having a low spot corresponding to zero position of said cam and the corresponding wheel 179, which low spot cooperates with a hook-shaped tooth formed on the rear end of a corresponding zero pawl 591, to control the positioning of the arm 594 and the switch 596 (FIG. 24) in the manner explained before, to provide what is termed a zero proof feature for the No. 1 totalizer on the B line 176, to insure that said totalizer is in a completely zeroized condition before certain transactions may be carried on in connection with said B1 totalizer.

In addition to the zero proof mechanism explained above, the No. 1 totalizer on the B line 176 may be provided with mechanism which functions when said totalizer is in an overdrawn condition, to control the operation of a switch similar to the switch shown in FIG. 25, to condition the machine for a TCT transaction.

The highest order wheel, which in this case is an overflow wheel for the No. 1 totalizer on the B line 176, has intregral therewith a five-pointed star wheel 952 (FIG. 36), which coacts with a stud 753 in the lower end of a pitman 754 pivotally connected at its upper end to a crank 755 secured on an overdraft shaft 756 journaled in the plates 637 and 638, said stud 753 being maintained in proper relationship with the teeth of the star wheel 952 by a slot in said pitman 754, which engages a stud 757 in the plate 636. Also secured on the shaft 756 is an arm 758, urged counter-clockwise by a spring 759, to normally maintain the stud 753 in yielding engagement with one of the five teeth formed on the star wheel 952. The arm 758 carries a square stud 760, which coacts with a similar square stud 761 (FIGS. 25 and 36) secured in a forward extension of the slide 556, which, as previously explained, controls the operation of the switch 560.

When the No. 1 totalizer on the B line 176 is in a plus condition, the star wheel 952 is positioned as shown in FIG. 36, so that one of the teeth thereon engages the stud 753 to retain the pitman 754, the crank 755, the shaft 756, and the arm 758 in their clockwise positions against the tension of the spring 759. This retains the stud 760 out of the path of the stud 761, and, consequently, the slide 556 (FIG. 25) is free to operate back and forth without effectively operating the switch 560. The occurrence of an overdraft in the No. 1 totalizer on the B line 176 revolves the highest order overflow wheel 179 and the star wheel 952 (FIG. 36), integral therewith, one step to move the tooth of said star wheel out of register with the stud 753, and to move a low portion of said star wheel opposite said stud, so that the spring 759 is free to shift the pitman 754 downwardly to rock the shaft 756 and the arm 758 counter-clockwise to move the stud 760 into yielding engagement with the stud 761, whereupon initial movement forwardly of the slide 556 permits the stud 761 to by-pass said stud 760, whereby return movement rearwardly of said slide 556 is obstructed, and, through mechanism similar to that disclosed in FIG. 25, including the stud 559 and the arm 558, the switch 560 is closed and remains closed to control the tabulating movement of the traveling carriage, in accordance with the overdrawn condition of the B1 totalizer, as explained in connection with the balance totalizer 174.

The zero proof control mechanism shown in FIG. 33 and the Credit Balance or Overdraft Control mechanism shown in FIG. 36, both of which mechanisms function in connection with the No. 1 totalizer on the B line 176, are not usually incorporated in the same machine, but may be used alternatively, in order to obtain the desired control between the B1 totalizer and other functions of the machine, including the tabulating movement of the traveling carriage.

Figure 35:
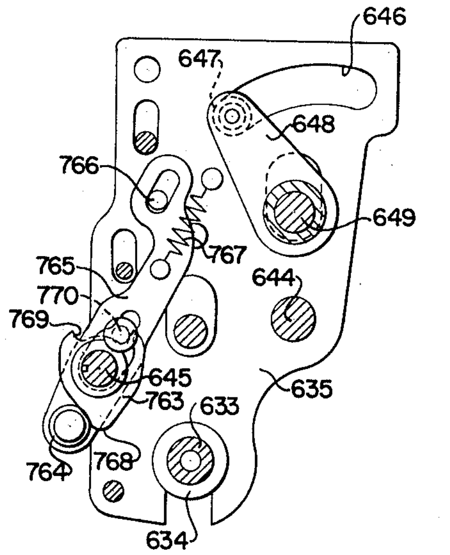
FIG. 35 is a left-hand detail view of the tens transfer shaft and the totalizer-engaging shaft.

A spring-actuated over-center mechanism is provided, as shown in FIG. 35, for retaining the add-subtract control shaft 645 in either its plus or its minus position. Secured on the shaft 645 (FIG. 35) is an over-center cam 763, which coacts with a roller 764 secured on the downward end of a slide 765 shiftably supported for angular movement by means of a slot in its lower end, in cooperation with the shaft 645, and by means of a slot in its upper end, in cooperation with a stud 766 secured in the plate 635. A spring 767 urges the slide 765 upwardly to maintain the roller 764 in yielding engagement with the periphery of the over-center cam 763, and said roller coacts with a node 768, formed on said cam 763, to yieldingly retain the shaft 645 in its counter-clockwise, or add, position, as shown in FIG. 35, or in its clockwise, or subtract, position, in which the node 768 moves clockwise beyond the center of the roller 764 and the slide 765, as said slide is shifted downwardly against the tension of the spring 767, whereupon the roller 764, in cooperation with the node 768, assists the shaft 645 to its subtract position and yieldingly retains it there, as long as subtract operations are being performed in the selected totalizer. The over-center cam 763 (FIG. 35) has, in its upper edge, a notch 769, the opposite shoulders of which coact with a stud 770, secured in the plate 635 and extending through a clearance portion of the slot for the shaft 645, to limit movement of said cam 763 and said add-subtract control shaft 645, and thus to locate said parts and the finger 670 (FIG. 33) accurately in either add or subtract position.

*Overdraft Mechanism*

The present machine is provided with an overdraft device, often referred to as an X totalizer, which works in conjunction with all of the totalizers, including the totalizers on the B, C, and D lines, and also including the Balance of A totalizer.

The overdraft device (FIG. 2B) has a wheel for each denominational order, which engages the corresponding rack 260 and normally rides back and forth with said rack during its initial and return movements without any effect, and does not become operative until a selected totalizer, which is in an overdrawn condition, is selected for a sub-total or sub-credit-balance or total or credit-balance operation. The selection of a totalizer for a sub-credit balance or credit balance operation, often referred to as an overdraft operation, renders the overdraft mechanism effective to control the engagement and disengagement of the wheels of the X or overdraft totalizer and the amount actuators 260, and simultaneously conditions the machine for an overdraft operation, which consists of two cycles of operation of the main cam shaft and one cycle of operation of the overdraft cam shaft, which is coupled to the main cam shaft for operation thereby in overdraft operations.

During the first cycle of an overdraft operation, the selected totalizer is zeroized, and the amount therein, which in this case is a negative amount, is simultaneously entered in the wheels of the X or overdraft totalizer, after which said overdraft totalizer is disengaged from the actuator racks, so that the amount of the overdraft remains therein. During the second cycle of an overdraft operation, the X totalizer is engaged with the actuators and zeroized thereby. During the second cycle of an overdraft operation, the wheels of the X totalizer and the wheels of any other selected totalizer, including the previously-overdrawn totalizer, are selected for engagement with the amount actuators, and, during this second cycle of operation, the wheels of the X totalizer are zeroized, and the amount therein, which in this case is the true negative balance or the true amount of the overdraft, is simultaneously entered in the wheels of the selected totalizer. Also during this second cycle, the corresponding printing sectors are positioned to the true negative amount of the overdraft, so that this amount, rather than the complement of the overdraft, will be printed.

The wheels of the X totalizer or overdraft device are always turned in the same direction; that is, in a clockwise direction (FIG. 2B). In other words, in the first cycle of an overdraft operation, the wheels of the X totalizer are in engagement with the amount actuator racks and are rotated thereby from zero position to the complementary amount of the overdraft being cleared from the selected totalizer, and, after the complement of the overdraft is entered in said X totalizer wheels, they are disengaged from the actuators and remain thus disengaged during forward return movement of said actuators. In the second cycle of an overdraft operation, the wheels of the X totalizer are again engaged with the actuator racks, prior to their intial movement, which initial movement rotates said wheels clockwise from their preset position on to zero position, said wheels in turn controlling the operation of the racks, so that the difference between the complement of the overdraft and zero, which is the true negative amount of the overdraft, is entered in the wheels of the selected totalizer and on the printing sectors 275 during the second cycle of an overdraft operation. The revolving of the wheels of the overdraft device in one single direction only, in order to obtain the true negative balance of an overdraft, creates an erroneous condition in all higher order wheels when the adjacent lower order wheel has moved out of zero position, that must be corrected by the introduction of a digit in each of these higher orders. This is accomplished by a transfer mechanism which functions when a lower order wheel moves out of zero position to advance the adjacent higher order wheel one digit, and this transferring of a digit progresses on through the higher order wheels in order to correct the overdraft device.

For example, let it be assumed that the overdraft in the selected totalizer on the B, C, or D lines is 120, the complement of which is 880, which is the amount standing on the wheels of the totalizer, and which amount is entered into the overdraft device during the first cycle of an overdraft operation. If this amount is not corrected, the turning of the wheels of the overdraft device from 880 to zero position, in the second cycle of an overdraft operation, would result in the actuator racks being positioned at 220, and, consequently, this erroneous amount of 220 would be entered in the selected totalizer and simultaneously set up on the printing sectors. However, the entering of the corrective digits corrects this erroneous condition in the following manner:

When the tens wheel of the overdraft device moves from zero to 8, the transfer mechanism of the adjacent higher order is tripped, and a corrective digit is entered into this adjacent higher order, which is the hundreds order. Thus, instead of the wheels of the X totalizer having the amount 880 thereon, they now contain the corrected amount of 980, and rotation of said wheels on from their complementary positions to zero results in the amount of 120 being entered in the selected totalizer and set up on the printing sectors, which is the correct true negative amount of the overdraft.

Figure 38:
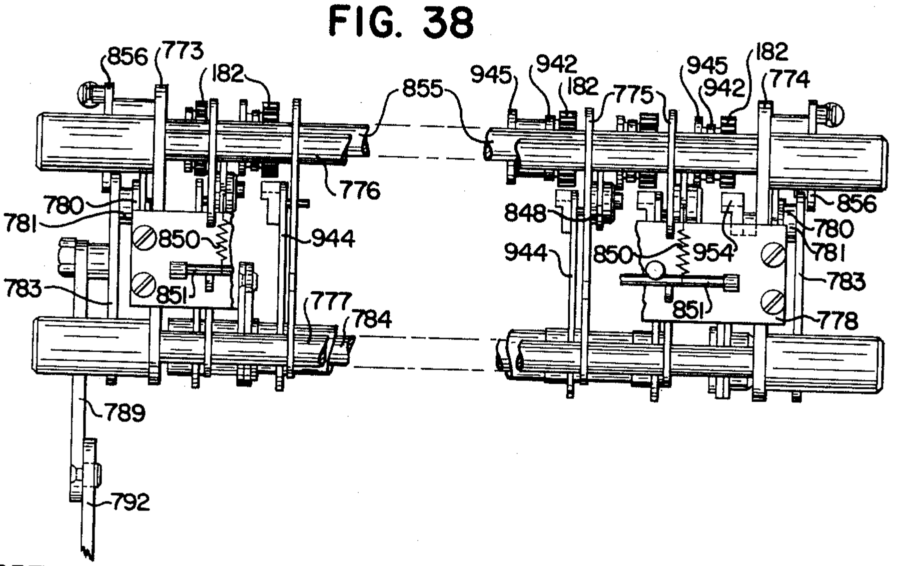
FIG. 38 is a front side-spacing view of a portion of the overdraft device.

The X totalizer comprises a wheel 182 for each denominational order (FIGS. 2B, 38, and 41) rotatably supported on a shaft 772, mounted for vertical engaging and disengaging movement in slots formed in an overdraft totalizer framework comprising a left end plate 773 (FIGS. 38, 40, and 41), a right end plate 774, and an intermediate or order plate 775, for each denominational order, with the exception of the lowest order, said plates being connected into a framework unit by tie rods 776 and 777 and brace plates 778 and 779. The framework thus formed for the overdraft or X totalizer is secured in place within the machine framework by brackets (not shown) which extend upwardly from the machine base 51.

Secured on each end of the totalizer shaft 772 is an arm 780 (only one shown here), carrying a stud (not shown) which engages a slot in the corresponding plates 773 and 774 to assist in guiding the shaft 772 in its engaging and disengaging movement and to maintain said arms against side displacement during such movement of said shaft. Each of the arms 780 carries a roller 781, which engages a cam slot 782 formed in the upper end of a corresponding cam 783 (only one shown here) secured on a shaft 784 journaled in the X totalizer framework. In addition to the end arm 780, the shaft 772 (FIG. 43) supports a central arm 785, having a stud which engages a slot in the corresponding plate 775 to guide said arm and the shaft 772 in their engaging and disengaging movement. The arm 785 carries a roller 786, which cooperates with the periphery of a segmental cam 787, secured on the shaft 784, the face of said cam 787, which coacts with the roller 786, being identical in outline to the lower edge of the cam slot 782 in the cams 783. Free on the shaft 784 (FIG. 40) is a lever 789, the upper end of which is bifurcated to embrace an eccentric adjustment bolt 790, carried by the cam 783 for forming an adjustable operating connection between said lever 789 and said cam 783. A downward extension of the lever 789 has a stud 791, which engages a slot in the upper end of a lever 792 free on a shaft 793 supported in hangers 794 secured to the lower surface of the base 51. A link 795 pivotally connects the lever 792 to a cam lever 796 free on a stud 797 carried by a hanger 798 secured to the machine base 51. The lever 796 carries rollers 799 and 800, which cooperate, respectively, with the peripheries of companion plate cams 801 and 802 secured to an overdraft cam shaft 803 journaled in the hanger 798 and a companion hanger (not shown). The overdraft cam shaft 803 operates only in overdraft operations, during which it makes one revolution in a clockwise direction, as viewed in FIG. 40, to operate the overdraft mechanism.

The overdraft shaft 803 is connected to the main cam shaft 195 (FIG. 37) for operation thereby by a clutch mechanism, which is rendered effective only in overdraft operations. The clutch mechanism comprises a disk 804 secured to the shaft 803, said disk carrying a stud 805, which pivotally supports a clutch dog 806 having a tooth 807 adapted to engage either of two diametrically-opposed clutch notches 808 and 809 cut in the periphery of a clutch collar 810 free on the shaft 803. The collar 810 (FIG. 37) is integral with a large gear 811, which meshes with a smaller gear 812, secured on the main cam shaft 195. A spring 813 urges the clutch dog 806 clockwise (FIG. 37) to normally maintain a tail 814 thereof in yielding contact with a stud 815 in an arm 816, secured on a shaft 817, journaled in brackets( not shown) depending from the machine base. Also fast on the shaft 817 is an arm 818 carrying a stud 819, which engages the bifurcated upper end of an arm 820 free on the shaft 803. The left-hand edge of a downward extension of the arm 820 (FIG. 37) is normally engaged by a stud 821 in a crank 822 secured on a shaft 823 journaled in brackets (not shown) depending from the machine base. Also fast on the shaft 823 is a bell crank 824 urged counter-clockwise by a spring 825 to normally maintain the stud 821 in yielding engagement with the edge of the downward extension of the arm 820, as shown here. The upward arm of the bell crank 824 (FIG. 37) is bifurcated to receive a stud 826 in a downward extension of a lever 827 free on the shaft 817, the upper end of said lever 827 being slotted to receive a stud 828, carried by an overdraft actuator rack 829, similar in every respect to the amount racks 260 (FIGS. 2A and 2B), mounted to the left of said racks 260, beyond the highest order overdraft wheel 182 and the A totalizer wheel 175. The upper overdraft rack 829 (FIG. 37) is geared to and drives a lower overdraft rack 830 (FIG. 45), which is similar in every respect to the lower amount racks 269. The rack 830 has teeth which cooperate with the teeth of an overdraft wheel 831 free on the B totalizer line 633, said wheel being similar in every respect to the regular totalizer wheels 179 with the exception that, instead of one long tooth thereon for the zero position of said wheel, every other tooth is a long tooth. The teeth of the wheel 831 coact with a corresponding transfer segment 840, which is tripped by the highest order wheel 179 of the B totalizer, when said wheel moves the equivalent of one digit or one tooth space out of zero position, while being rotated in a subtractive direction, thus indicating that an overdraft has occurred in the selected set of totalizer wheels.

As previously explained, the overdraft racks 829 and 830 (FIGS. 37 and 45) remain in zero position normally, and are released for movement only when an overdrawn totalizer is selected and conditioned for an overdraft total operation. In the first part of the first overdraft cycle, rearward movement of said racks 829 and 830 is permitted in this instance because the overdraft wheel 831 has been moved one step out of zero position and consequently, in being moved back to said position, will permit the equivalent of one tooth space of movement of said racks 829 and 830. Rearward movement of the rack 829, which is toward the left (FIG. 37), rocks the level 827 counter-clockwise. Counter-clockwise movement of the lever 827 rocks the bell crank 824, the shaft 823, and the crank 822 clockwise, causing the stud 821, in cooperation with the left-hand edge of the arm 820, to rock said arm counter-clockwise. The arm 820, through the stud 819, rocks the arms 818 and 816 clockwise to disengage the stud 815 from the tail of the clutch dog 806, to free said dog to the action of the spring 813, which immediately moves the tooth 807 into engagement with the periphery of the collar 810. After rotation of the main cam shaft 195, the gear 812, and the gear 811 has rotated the collar 810 about 50 degrees of movement in a clockwise direction (FIG. 37), the notch 808 is moved opposite the tooth, and said tooth falls into said notch, thus connecting the disk 804 and the overdraft cam shaft 803 to said collar 810 for operation thereby.

As previously explained, the main cam shaft 195 (FIG. 37) makes one counter-clockwise revolution in normal machine operations, including adding, subtracting, total-taking, and sub-total-taking operations, but in overdraft operations said cam shaft makes two counter-clockwise revolutions under control of the overdraft mechanism, to in turn drive the gear 811 and, through the clutch mechanism explained above, the overdraft shaft 803, one clockwise revolution in such operations. It is, therefore, obvious that in overdraft operations the actuators, including the overdraft actuators 829 and 830, make two excursions of movement rearwardly and then back to normal position in each overdraft operation.

Figures 37, 39:
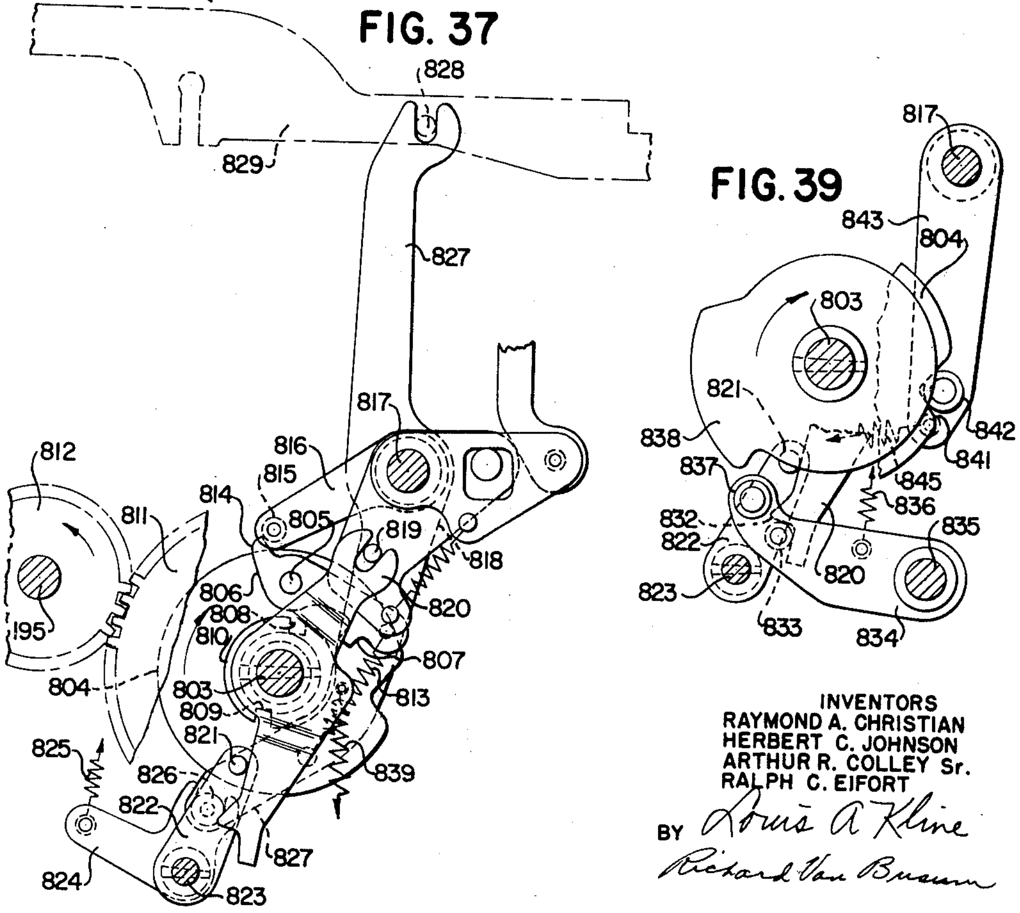
FIG. 37 is a left-hand elevation of the overdraft clutch mechanism.
FIG. 39 is a detail view of a portion of the overdraft clutch mechanism.

Ordinarily, return movement forwardly of the overdraft actuator 829, at the end of the first cycle of an overdraft operation, would restore the stud 815 into the path of the tail 814 of the clutch dog 806, to disengage said clutch dog from the notch in the collar 810, were it not for the mechanism disclosed in FIG. 39, which prevents such restoration of the stud 815, as will now be described.

Counter-clockwise disengaging movement of the arm 820 (FIGS. 37 and 39), as explained above, disengages a tooth 832, formed on the downward portion of said arm, from a stud 833 in an arm 834 free on a stud 835 secured in a bracket (not shown) depending from the machine base. This frees the arm 834 to the action of a spring 836, which immediately rocks said arm clockwise to engage a roller 837, carried thereby, with the low portion of the periphery of a cam 838 secured on the overdraft shaft 803. The arm 834, in its clockwise movement, moves the stud 833 therein into the path of the lower end of the arm 820, to obstruct return movement clockwise of said arm, and thus to hold the stud 805 out of the path of the tail 814 of the clutch dog 806, until near the end of the second cycle of an overdraft operation, whereupon a high portion of the cam 838 engages the roller 837 to rock the arm 834 counter-clockwise against the action of the spring 836 to move the stud 833 beyond the tooth 832, to free the arm 820 and connected parts for restoring movement, under the influence of a spring 839 (FIG. 37), which is tensioned to urge said arm 820 in a clockwise, or restoring, direction. Clockwise movement of the arm 820, as explained above, rocks the arms 818 and 816 to move the stud 815 into the path of the tail 814. However, due to the notch 808 in the collar 810 being 50 degrees out of the home position of the overdraft cam shaft and connected parts, the dog 806 is not disconnected therefrom until about 50 degrees in the next cycle of machine operation, whereupon the tail 814 of said dog engages the stud 815 and rocks said pawl counter-clockwise to disengage the tooth 807 from the notch 808 to disconnect the overdraft cam shaft mechanism from the collar 810. Inasmuch as the main cam shaft 195 makes two revolutions in overdraft operations, to one revolution of the overdraft cam shaft 803, the two notches 808 and 809 are necessary in order that one will be in proper position to engage the tooth 807 of the dog 806 after approximately 50 degrees of rotation of the collar 810.

The overdraft clutch mechanism (FIG. 37) is urged to and yieldingly retained in home position through the medium of a V-shaped notch 841 in the disk 804, in cooperation with a roller 842 on a spring arm 843 pivoted on the shaft 817 and urged counter-clockwise by a comparatively strong spring 845. As the disk 804 and connected parts near home position, the roller 842, in cooperation with the notch 841, and through the medium of the spring 845, assists said disk and the overdraft clutch mechanism to home position and yieldingly retains them in home position after the clutch dog 806 is disengaged from the notch in the collar 810.

As previously explained, the wheels 182 of the overdraft device (FIGS. 2B and 43) are normally in engagement with the upper racks 260 and ride back and forth with said racks during other than overdraft operations without being disengaged therefrom. In the first cycle of an overdraft operation, the wheels 182 are in mesh with the racks 260 during their initial movement, during which time the selected totalizer on the B line, which is an overdrawn condition, is zeroized, and the wheels 182 of the overdraft device are consequently positioned by said wheels as they are being zeroized to the complement of the overdraft. After the rack 260 has completed its initial movement in the first cycle of an overdraft operation, the wheels 182 are disengaged therefrom by counter-clockwise rotation of the cams 801 and 802 (FIGS. 40 and 43), which, through the lever 796, the link 795, and the lever 792, rock the arm 798 and the cams 783 and 787 clockwise, causing the slots 782 and the cam surface on the cam 787, in cooperation with the rollers 781 and 786, to shift the overdraft totalizer shaft 772 downwardly to disengage the wheels 182 of the overdraft device from the racks 260, prior to return movement forwardly of said racks, at the end of the first cycle of an overdraft operation. Likewise, the selected totalizer wheels 179 on the B line 176 are disengaged from the actuators 269, after said wheels have been zeroized in the first cycle of an overdraft operation, and prior to return movement forwardly of said racks 269; consequently, said selected totalizer wheels remain in a zeroized condition.

Figures 40, 41:
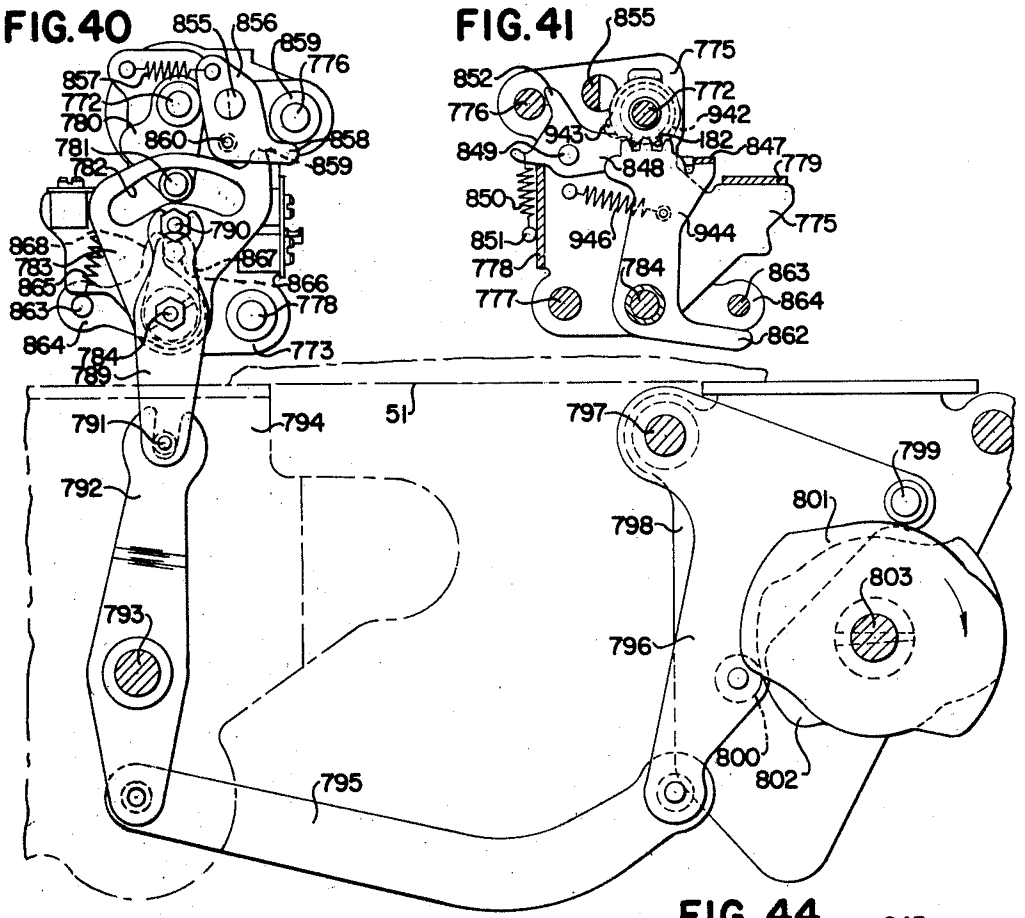
FIG. 40 is a left side elevation of the engaging and disengaging mechanism for the overdraft device.
FIG. 41 is a right-hand detail view of the transfer mechanism for the overdraft device.

At the beginning of the second cycle of an overdraft operation, and prior to initial movement rearwardly of the racks 260 and 269 in such second cycle, the mechanism shown in FIGS. 40 and 43 returns the engaging and disengaging cams 783 and 787 counter-clockwise to engage the wheels 182 of the overdraft device or X totalizer with said racks 260, prior to their initial movement rearward. Initial movement rearwardly of the racks 260, in the second cycle of an overdraft operation, rotates the wheels 182 of the overdraft device from their preset position, which occurred in the first cycle of an overdraft operation, to zero, to position said racks and the companion racks 269 to the true negative amount of the overdraft.

If the true negative amount of the overdraft is to be entered additively into a selected totalizer on the B line 176, the wheels of said totalizer are engaged with the corresponding racks 269, after they have been positioned by the overdraft device and prior to their return movements forwardly in the latter part of the second cycle of an overdraft operation, and return movement of said racks enters the true negative amount of the overdraft additively in the wheels of the selected totalizer. If the amount is to be entered subtractively into the wheels of the selected totalizer, said totalizer is engaged with the actuators 269 prior to their initial movements rearwardly, during the second cycle of an overdraft operation, and in this case the true negative amount of the overdraft is entered subtractively into said selected totalizer.

After the wheels 182 have been zeroized in the second cycle of an overdraft operation, as explained above, and prior to return movement forwardly of the racks 260, said wheels are disengaged from said racks and remain thus disengaged until said racks have been restored forwardly to their zero positions, after which the mechanism shown in FIG. 40 functions to again engage said wheels 182 of the overdraft device with the actuators 260, at the end of the last cycle of overdraft operation.

Inasmuch as the wheels of the overdraft device are turned in one direction—that is, clockwise—to enter the complementary amount of the overdraft therein, and also in the second cycle of an overdraft operation are turned clockwise the remaining distance from the complement to zero, to obtain the true negative amount of the overdraft, an error of one digit is involved in all orders of the overdraft device, with the exception of the units order, and it is necessary to correct this condition by providing a transfer mechanism which enters this digit in all higher orders when an adjacent lower order wheel moves out of zero position. The transfer mechanism for entering the corrective digits in the higher order wheels 182 and the zero stop mechanism for said wheels will now be described.

Each of the X totalizer wheels 182 has integral therewith a disk 942 (FIGS. 38, 41, 43, and 44), having thereon a tooth 943, located in the zero position of said wheel, and also has integral therewith a tripping drum 945 for tripping the transfer segment of the adjacent higher order. Associated with each overdraft wheel 182, with the exception of the lowest order wheel, is a transfer segment 944 (FIGS. 38 and 41) free on the shaft 784 and urged counter-clockwise by a spring 946 to normally maintain a bent-over ear 847 on said segment 944 in yielding engagement with the end of a finger 848, free on a stud 849 in the corresponding order plate 775. A spring 850, tensioned between a hook formed on the finger 848 and a spring bail 851, removably attached to the plate 778, urges said finger counter-clockwise to normally maintain an extension 852 thereof in yielding engagement with the rod 776. The transfer tripping finger 848 (FIG. 44) carries a stud 853, which is in alignment with a cut portion 854 of the drum 945, when said drum and the corresponding overdraft wheel 182 are in zero position. This provides clearance for the stud 853 upon disengaging movement of the overdraft totalizer, so that the corresponding finger 848 will not be tripped if the corresponding wheel 182 is in zero position.

If, during the first cycle of an overdraft operation, any overdraft wheel 182 is rotated one or more steps out of zero position, the notch 854 is moved out of register with the stud 853, and the high portion of the drum 945 is moved into the path of said stud, whereupon disengaging movement of the overdraft totalizer, after the racks have completed their initial movement in the first cycle of an overdraft operation and have entered the complement of the overdraft in said wheels 182, causes the high portion on the periphery of the drum 945 to engage the stud 853 and rock the finger 848 clockwise (FIG. 44), against the tension of the spring 850, to move the finger out of the path of and beneath the ear 847 in the transfer segment 944 for the adjacent higher order. This permits the released segments 944 to operate immediately, as the wheels 182 of the overdraft device are arranged to be disengaged from the racks and engaged with the teeth of said segments, to advance said wheels the equivalent of one digit to correct said higher order wheels 182, so that in the second cycle of an overdraft operation they will position the racks to the true negative amount of the overdraft. The units or lowest order overdraft wheel 182 (FIG. 42) does not require a transfer segment 944, as do all the other orders, but is provided with a toothed sector 954, secured to the right plate 774, which is engaged by the teeth of the lowest order overdraft wheel 182 when said wheel is disengaged from its corresponding actuator 260, as shown here.

In the first part of the second cycle of an overdraft operation, the overdraft wheels 182 with the corrected amount of the overdraft therein are engaged with their corresponding actuators 260 prior to initial movement rearwardly of said actuators, which movement rotates said wheels to zero, which is determined by the long tooth 943 (FIGS. 38 and 41) on the disks 942 coming into contact with a stop surface formed by an undercut portion of a stop rod 855 journaled in the overdraft framework. During the first cycle of an overdraft operation, while the overdraft wheels 182 are being positioned by the racks 260, as explained above, the zero stop rod 855 is positioned as shown here (FIGS. 40 and 41), so that its undercut portion provides clearance for the stop teeth 943 on the disks 942, and this is acomplished through the medium of an arm 856, secured near the end of said rod 855, which is urged counter-clockwise by a spring 857, to normally maintain an extending finger 858 thereof in yielding engagement with a hub 959 on the rod 776. In the second cycle of an overdraft operation, full counter-clockwise movement of the cam 783 (FIG. 40), under influence of the cams 801 and 802, to engage the overdraft totalizer wheels 182 with the actuators 260, causes an extension 859 on said cam 783 to engage a stud 860, carried by the arm 856, and rock said arm and the rod 855 clockwise, against the action of the spring 857, as shown in FIG. 40, and counter-clockwise, as shown in FIGS. 41 and 44, to move the lower stopping edge, formed on said shaft by its undercut portion, into the path of the teeth 943 on the stop disks 942. Initial movement of the racks 260, in the second cycle of an overdraft operation, rotates the wheels 182 of the overdraft device until the corresponding teeth 943 contact the lower stopping edge of the rod 855 to position said wheels at zero, and to in turn position the corresponding racks 260 to the true negative amount of the overdraft. After the racks have completed their initial movement in the second cycle of an overdraft operation, to be positioned by the overdraft wheels 182, the cam 783 (FIG. 40) is again rocked clockwise to disengage the wheels 182 from the amount actuators 260 before said actuators are returned forwardly to normal positions, so that the zero position of said wheels 182 will not be disturbed. Return movement clockwise (FIG. 40) of the cams 783 and 787, in the second cycle of an overdraft operation, permits the spring 857 to restore the stop rod 855 to normal position, as shown here, where it is out of the path of the stop teeth 943 on the disks 942, so as not to interfere with the turning of the overdraft wheels 182. After the racks have completed their return movements forwardly, in the second cycle of an overdraft operation, the cam 783 is restored counter-clockwise to its normal or central position, as shown in FIG. 40, to re-engage the wheels 182 of the overdraft device with the corresponding racks 260, after said racks have returned to normal or zero positions.

The extent of transferring movement counter-clockwise (FIG. 41) of the transfer segments 944, as explained above, is determined by an extending finger 862 thereof coming into contact with a stop and restoring rod 863, supported by two cranks 864, secured on opposite ends of the shaft 784. See also FIGS. 40 and 44. A spring 865 (FIG. 40) urges the rod 863 and the crank 864 clockwise, as viewed here, and counter-clockwise, as viewed in FIG. 44, to normally maintain said rod 863 in yielding engagement with a downward surface formed on the end plates 773 and 774 (FIG. 42). Full disengaging movement of the cam 783 (FIG. 40) near the end of the first cycle of an overdraft operation, under control of the cams 801 and 802, causes studs 866, carried by two cranks 867 secured on the shaft 784 adjacent the cranks 864, to engage upward extensions 868 of said cranks and carry them and the restoring rod 863 counter-clockwise, as viewed in FIG.

40, and clockwise, as viewed in FIG. 44. This causes the studs 866 in the cranks 867, in cooperation with the extensions 868, to restore the cranks 864 and the rod 863 clockwise, as viewed in FIG. 41, said rods, in cooperation with the fingers 862 of the segments 944, restoring said segments clockwise, against the action of the spring 946, from operated position to unoperated, or normal, position, as shown here. The restoration of the transfer segments 944 to untripped position moves their ears 847 beyond the corresponding fingers 848, whereupon the springs 850 return said fingers counter-clockwise into the path of said ears 847 to retain the segments 944 in normal, or untripped, positions.

As explained before, the overdraft device functions in connection with all of the totalizers, including all the sets of totalizers on the B, C, and D lines 176, 177, and 178, and also with the A totalizer 174, for transposing the complementary amount of overdrafts therein to true negative amounts, and to this end the highest order wheel 175 (FIG. 2B) of the A totalizer is provided with a tripping cam (not shown) having ten teeth for coacting with a corresponding transfer mechanism, to permit one step of movement of the overdraft actuator rack 829 (FIG. 37) in exactly the same manner as explained in connection with FIG. 45 for the totalizers on the B line 176.

Therefore, if any one of the above totalizers which is selected for a sub-total-taking operation or for a total-taking operation is in an overdrawn condition (and this need not be known to the operator), the highest order wheel thereof, coacting with the overdraft rack 829 (FIG. 37), will permit said rack and its companion rack 830 (FIG. 45) to move one step out of zero position, during the sub-total-taking or total-taking operation, to render the automatic overdraft mechanism effective to transpose the complement of the overdraft to a true negative amount and to re-enter this true negative amount either into the originally-selected totalizer or into any other selected totalizer during the ensuing overdraft operation.

Again, it is emphasized that, with the overdraft mechanism disclosed herein, it is not necessary for the operator to be cognizant that an overdraft exists in any selected totalizer, as the overdraft mechanism functions automatically in total-taking and sub-total-taking operations, when the selected totalizer is in an overdrawn condition, to transpose the complementary amount of the overdraft to a true negative amount and register and record this true negative amount.

MODE OF OPERATION

It is believed that a full understanding of the operation of the machine of this invention will have been obtained from a perusal of the preceding specification. However, a brief description of operation will be given, using as an example the posting of individual checking accounts. It is not the desire nor the intention to limit this machine to the system mentioned above, as said machine is extremely versatile in nature and is applicable to practically any type of business system where previous balances are picked up and intered in the balance, or A, totalizer, and amounts are added to and subtracted from this previous balance, to arrive at a new balance, which, if desired, may be entered in one or more of the totalizers on the B, C, and D lines. Likewise, certain ones of the plus and minus amounts which are added to and subtracted from the previous balance may be simultaneously entered either positively or negatively in selected ones of the totalizers on the B, C, and D lines to maintain a separate total of these different items. A system of the nature outlined above may well be adapted for use by department stores, for example, and other retail businesses of a similar nature.

Following is a brief description of the use of the machine in connection with the periodical posting of individual checking accounts by banking establishments.

As a rule, all active checking accounts are posted periodically—for example, daily or weekly—and, in the posting of such accounts, the previous balance is obtained from the customer's ledger card, then set up on the amount keyboard and entered in the A or balance totalizer. This previous balance may also be simultaneously entered in one or more of the group totalizers on the B, C, and D lines, where a running total of the new abalances may be kept. Next, the checks issued by the customer against his account are subtracted from the previous balance, and likewise the deposits made by said customer are added thereto. As before, the checks, or subtract items, may be simultaneously entered in one or more of the group totalizers, to keep a running total of all debit items, and, also, the deposits may be simultaneously entered in one of the group totalizers to keep a running total of all credit items. After all the check and deposit items have been entered in the balance or A totalizer, a total-taking operation is performed in said totalizer to obtain a new balance, which is simultaneously printed on the customer's ledger card and, if desired, may be entered in one or more of the group totalizers on the B, C, and D lines, to maintain a running total of all new balances.

If, during the computation of the customer's checking account, the checks or debit items exceed the deposits or credit items, an overdraft is created in the A totalizer, and, as is usual with machines of this type, this fact may be made apparent to the operator by the disabling of the automatic machine-releasing mechanism. However, if desired, the operator may continue the posting of the particular checking account by using the manual release bar for initiating machine operations. If, at the end of the posting of the customer's account, the account remains in an overdrawn condition, the performing of a total-taking or sub-total-taking operation in the balance or A totalizer will cause the overdraft device to function automatically to transpose the complementary amount in said A totalizer to a true negative amount and print this true negative amount in a distinctive color upon the customer's ledger card, and, simultaneously, mechanism functioning automatically may be used to select a particular one of the group totalizers on the B, C, and D lines to receive the amount of the overdraft to maintain a running total of the overdraft items. In case a sub-total operation is performed in the A totalizer when it is in an overdrawn condition, the complementary amount of the overdraft will be re-entered in said totalizer during return movement forwardly of the actuator racks near the end of the first cycle of an overdraft operation. However, the overdraft device functions automatically to transpose the complementary amount of the overdraft to a true negative amount and to record this true negative amount and enter it, if desired, into any selected totalizer on the B, C, and D lines. Likewise, the true negative amount of the overdraft may be entered in the cleared A totalizer at the end of the overdraft operation, if this is desirable.

The use of the balance or A totalizer in connection with the overdraft device in the above explanation was intended as an example only, as it is to be understood that all of the totalizers on the B, C, and D lines function in connection with the automatic overdraft device in exactly the same manner as explained above for the A or balance totalizer.

From the foregoing limited description of the operation of the machine, it should be readily understood that said machine is very flexible in nature and may be adapted to almost any type of business system where debits are subtracted from a previous balance, credits added thereto, and a new balance arrived at. Likewise, the different items involved in the computation of various individual accounts may be distributed in any manner desired, either manually or automatically, in the different sets of group totalizers on the B, C, and D lines, to provide a group or running total of all such items.

While the form of mechanism shown and described is admirably adapted to fullfill the objects primarily stated, it is to be understood that it is not intended to confine the invention to the one form or embodiment disclosed herein, for it is susceptible of embodiment in various forms, all coming within the scope and the spirit of the invention.

What is claimed is:

1. In a machine of the class described, having a traveling carriage, non-positive means to drive said traveling carriage in forward and return tabulating directions, and releasable means to hold said traveling carriage against movement by the non-positive driving means, the combination of stop means located in columnar positions on the traveling carriage; abutment means engageable with the stop means to terminate tabulating movement of the traveling carriage and to locate said traveling carriage in columnar positions; means operating under control of the traveling carriage in predetermined columnar positions to move the abutment means into the path of the stop means and to simultaneously release the holding means to cause the traveling carriage to tabulate; means including a shiftable member to release the machine for operation; initiating means coacting with the shiftable member, said initiating means rendered effective by the traveling carriage in preselected columnar positions and operable by the abutment means when engaged by the stop means, to initiate automatic operation of the machine; manually-controlled means to operate the moving means for the abutment means; means including a rockable element operated by the manually-controlled means to move the shiftable member out of coacting relationship with the initiating means to prevent automatic operation of the machine; means to latch the rockable element in operated condition to retain the shiftable member in ineffective position; and means effective upon subsequent operation of the machine to release the latching means.

2. In a machine of the class described, having a traveling carriage, non-positive means to drive said traveling carriage in forward and return tabulating directions, and releasable means to hold said traveling carriage against movement by said non-positive driving means, the combination of stops located in columnar positions on the traveling carriage; abutment means movable into engaging relationship with the stops to terminate tabulating movement of the traveling carriage, said abutment means normally out of engaging relationship with said stops; means operable under control of the traveling carriage in preselected columnar positions to move the abutment means into engaging relationship with the stops and to simultaneously release the holding means, to cause the traveling carriage to tabulate; manually controlled means to operate the moving means for the abutment means; means to release the machine for operation; initiating means rendered effective by the traveling carriage in preselected columnar positions, and operable by the abutment means when engaged by a stop to operate the releasing means; a shiftable element connected to the releasing means and movable into and out of coacting relationship with the initiating means to connect said releasing means to and to disconnect said releasing means from the initiating means to control automatic operation of the machine; a rockable element connected to the manually controlled means and operable thereby to move the shiftable member out of coacting relationship with the initiating means to prevent automatic machine operation; means to latch the rockable element in rocked condition to retain the releasing means disconnected from the initiating means; and means effective upon operation of the machine to disengage the latch, to free the shiftable element for return into coacting relationship with the initiating means.

3. In a machine of the class described, having a totalizer, a traveling carriage, non-positive means to drive said traveling carriage in forward and return tabulating directions, and releasable means to hold said traveling carriage against tabulating movement, the combination of stops located in columnar positions on the traveling carriage; yieldable abutment means engageable with the stops to terminate tabulating movement of the traveling carriage, said abutment means normally out of coacting relationship with said stops; means to move the abutment means into the path of the stops and to simultaneously release the holding means to cause the traveling carriage to tabulate; a solenoid; means operated by the solenoid when energized to move the yieldable abutment means out of coacting relationship with the stops to cause the traveling carriage to skip-tabulate; means for selecting either a plus or minus algebraic condition of said totalizer as a prerequisite to carriage skip-tabulation; switches operated by the first moving means and the totalizer, when said totalizer is in that algebraic condition selected through said selecting means, to assist in completing a circuit to the solenoid; a normally open carriage-controlled switch in the circuit of the solenoid; and means operated by the traveling carriage at a particular stage of its tabulating movement to momentarily close the carriage-controlled switch to complete a circuit to the solenoid, to cause the traveling carriage to skip-tabulate until said switch opens, to break the circuit to the solenoid to free the yieldable abutment means for return into coacting relationship with the stops, to terminate tabulating movement of the traveling carriage in a preselected columnar position when the totalizer is in the selected algebraic condition.

4. In a machine of the class described, having a totalizer, a traveling carriage, non-positive means to drive said traveling carriage in forward and return tabulating directions, and releasable means to hold said traveling carriage against tabulating movement, the combination of stops located in columnar positions on the traveling carriage; abutment means including a yieldable stop arm engageable with the stops to terminate tabulating movement of the traveling carriage, said stop arm normally out of coacting relationship with said stops; means to move the yieldable stop arm into the path of the stops, and to simultaneously release the holding means, to cause the traveling carriage to tabulate; a solenoid; means operated by the solenoid when energized to move the yieldable stop arm out of coacting relationship with the stops to cause the traveling carriage to skip-tabulate; means to select either a plus or minus algebraic condition of said totalizer as a condition precedent to carriage skip-tabulation; switches in the circuit of the solenoid, including a normally open switch closed by the first moving means, a normally open switch closed by the totalizer when in the algebraic condition selected by said selecting means, and a carriage-controlled switch; a spring-urged lever coacting with the carriage-controlled switch to normally hold it open; and means on the traveling carriage coacting with the lever during a particular stage of the tabulating movement of said carriage to momentarily close the carriage-controlled switch to complete the circuit to the solenoid to cause the traveling carriage to skip-tabulate until said carriage moves beyond said particular stage, whereupon the spring-urged lever opens the carriage-controlled switch to break the circuit to the solenoid to free the yieldable stop arm for return into coacting relationship with the stops, to terminate the skip tabulating movement of the traveling carriage in a certain columnar position when the totalizer is in the selected alegbraic condition.

5. In a machine of the class described, having a totalizer, a traveling carriage, non-positive means to drive, said carriage in forward and return tabulating directions, said non-positive means normally effective to drive said carriage in forward tabulating direction, and releasable means to hold said carriage against tabulating movement, the combination of stops located in columnar positions on the traveling carriage; yieldable abutment means engageable with the stops to terminate return tabulating movement of the traveling carriage, said abutment means normally out of coacting relationship with said stops; means to move the yieldable abutment means into the path of the stops, to release the holding means, and to reverse the action of the driving means to cause the traveling carriage to tabulate in a return direction; a solenoid; connections between the solenoid and the moving means so that energization of said solenoid will cause said moving means to move the yieldable abutment means into the path of a particular stop to terminate return tabulating movement of the traveling carriage in a certain columnar positon; switches in the circuit of the solenoid, including a normally open switch closed by the first moving means, a normally open switch closed by the totalizer when in a certain algebraic condition, and normally open carriage-controlled switch; a spring-urged lever coacting with the carriage-controlled switch to normally hold said switch open; and means on the traveling carriage coacting with the lever during a certain part of return tabulating movement of said carriage to depress said lever to close the carriage-controlled switch to complete the circuit to the solenoid to cause the yieldable abutment means to be moved into the path of said particular stop to terminate return tabulating movement of the traveling carriage in said certain columnar position when the totalizer is in a certain algebraic condition.

6. In a machine of the class described, having a totalizer, a traveling carriage, non-positive means to drive said traveling carriage in forward and return tabulating directions, reversible means to connect the non-positive driving means to said traveling carriage, said reversible means normally effective to drive said carriage in forward tabulating direction, and releasable means to hold said traveling carriage against tabulating movement, the combination of forward tabulating stops located in columnar positions on the traveling carriage yieldable abutment means engageable with the forward tabulating stops to terminate forward tabulating movement of the traveling carriage in selected columnar positions, said abutment means normally out of coacting relationship with said stops; means to move the abutment means into coacting relationship with the forward tabulating stops and to simultaneously release the holding means to free the traveling carriage for forward tabulating movement; return tabulating stops located in columnar positions on the traveling carriage; a second yieldable abutment means engageable by the return stops to terminate return tabulating movement of the traveling carriage and to locate said carriage in predetermined columnar positions, said abutment means normally out of coacting realtionship with said return stops; a solenoid; means operated by the solenoid to move the second yieldable abutment means into engaging relationship with a certain one of the return stops, release the holding means, and operate the reversible connecting means to initiate return tabulating movement of the traveling carriage; switches in the circuit of the solenoid, including a normally open switch, closed by operation of the first moving means, a normally open switch closed by the totalizer when in a certain algebraic condition, and a carriage-controlled switch; a spring-urged lever normally effective to hold the carriage-controlled switch open; and means mounted on the traveling carriage in a certain location and arranged to operate the lever when the traveling carriage arrives in a certain position while tabulating in a forward direction to close the carriage-controlled switch to complete the circuit to the solenoid to cause said solenoid to operate the moving means for the second yieldable abutment means to immediately reverse the direction of travel of the carriage from forward to return direction, and to move said second abutment means into the path of said certain one of the return stops to terminate return tabulating movement of the traveling carriage in a particular colmunar position when the totalizer is in a certain algebraic condition.

References Cited in the file of this patent

UNITED STATES PATENTS

| | | |
|---|---|---|
| 2,229,834 | Anderson | Jan. 28, 1941 |
| 2,626,749 | Christian | Jan. 27, 1953 |
| 2,629,549 | Butler | Feb. 24, 1953 |
| 2,666,517 | Christian | Jan. 19, 1954 |
| 2,701,685 | Parker | Feb. 8, 1955 |
| 2,780,407 | Dodsworth | Feb. 5, 1957 |
| 2,849,179 | Capellaro | Aug. 26, 1958 |
| 2,856,125 | Hildebrant | Oct. 14, 1958 |
| 2,930,523 | Christian et al. | Mar. 29, 1960 |
| 2,981,467 | Jones | Apr. 25, 1961 |
| 3,023,951 | Runde | Mar. 6, 1962 |
| 3,106,341 | Maier et al. | Oct. 8, 1963 |

UNITED STATES PATENT OFFICE

CERTIFICATE OF CORRECTION

Patent No. 3,161,354 December 15, 1964

Raymond A. Christian et al.

It is hereby certified that error appears in the above numbered patent requiring correction and that the said Letters Patent should read as corrected below.

Column 2, line 68, for "righ" read -- right --; column 10, line 20, for "is", second occurrence, read -- its --; column 11, line 47, for "barrs" read -- bars --; line 64, after "153" insert -- free --; column 16, line 60, for "of" read -- or --; column 18, line 35, for "least" read -- lease --; line 68, for "slid," read -- slide --; column 20, line 4, for "shaft", first occurrence, read -- short --; column 22, line 3, for "layer" read -- lever --; column 25, line 56, for "travelling" read -- traveling --; column 32, line 3, for "initate" read -- initiate --; column 34, line 54, for "returns" read -- retains --; column 36, line 75, for "coats" read -- coacts --; column 40, line 42, for "comb" read -- combs --; column 41, line 4, for "may" read -- many --; line 7, for "brieflly" read -- briefly --; line 19, for "denomenational" read -- denominational --; column 47, line 45, for "Y-haped" read -- Y-shaped --; column 50, line 25, for "of" read -- or --; column 51, line 2, for "intial" read -- initial --; column 58, line 8, for "abalances" read -- balances --; column 60, line 63, for "skip tabulating" read -- skip-tabulating --; line 68, after "drive" strike out the comma; column 61, line 12, for "positon" read -- position --; line 36, after "carriage" insert a semicolon; column 62, line 5, for "realtionship" read -- relationship --.

Signed and sealed this 4th day of May 1965.

(SEAL)
Attest:

ERNEST W. SWIDER
Attesting Officer

EDWARD J. BRENNER
Commissioner of Patents